United States Patent
Ingargiola

(10) Patent No.: US 12,056,766 B2
(45) Date of Patent: Aug. 6, 2024

(54) SYSTEM AND METHOD OF PROVIDING A BLOCK CHAIN-BASED RECORDATION PROCESS

(71) Applicant: Bosonic, Inc., San Francisco, CA (US)

(72) Inventor: Rosario M. Ingargiola, Novato, CA (US)

(73) Assignee: BOSONIC, INC., San Francisco, CA (US)

( * ) Notice: Subject to any disclaimer, the term of this patent is extended or adjusted under 35 U.S.C. 154(b) by 135 days.

(21) Appl. No.: 17/013,594

(22) Filed: Sep. 5, 2020

(65) Prior Publication Data

US 2021/0073913 A1 Mar. 11, 2021

Related U.S. Application Data

(60) Provisional application No. 62/897,030, filed on Sep. 6, 2019.

(51) Int. Cl.
*G06Q 40/04* (2012.01)
*G06F 16/23* (2019.01)
(Continued)

(52) U.S. Cl.
CPC ......... *G06Q 40/04* (2013.01); *G06F 16/2379* (2019.01); *G06F 16/27* (2019.01);
(Continued)

(58) Field of Classification Search
CPC ...................................................... G06Q 40/04
(Continued)

(56) References Cited

U.S. PATENT DOCUMENTS 10,373,129 B1 8/2019 Halley et al.
11,310,060 B1 * 4/2022 Poelstra ................ H04L 9/3066
(Continued)

FOREIGN PATENT DOCUMENTS

WO WO-2023073103 A1 * 5/2023

OTHER PUBLICATIONS

Authors: Vasilios A Siris et al: Title: Interledger Approaches : Publisher: IEEE: Date of Publication: Jul. 4, 2019: IEEE: (Year: 2019).*

(Continued)

*Primary Examiner* — Bruce I Ebersman
*Assistant Examiner* — Hatem M Ali

(57) ABSTRACT

Disclosed are systems and methods that utilize multiple single asset types and blockchain-based ledgers utilized by a custodian to issue a digital representation of assets held by the custodian. Trading entities place, with the custodian, respective assets that are represented on the ledgers. Genesis blocks on each blockchain-based ledger are signed by the exchange network which provides the initial trust and acts as a barricade against a rogue node from entering the network. Trading entities use the exchange network to agree on a price and enter into trades. The trades can include one asset type for another asset type. An atomic exchange is performed, and a trade is complete. Changes to token ownership are recorded on respective custodian ledgers automatically and redemption occurs upon request by a trading entity such that the ledger can be updated in actual currency and moved from the custodian to a trading entity account.

18 Claims, 47 Drawing Sheets

(51) Int. Cl.
| | |
|---|---|
| *G06F 16/27* | (2019.01) |
| *G06Q 10/10* | (2023.01) |
| *G06Q 20/02* | (2012.01) |
| *G06Q 20/36* | (2012.01) |
| *G06Q 20/38* | (2012.01) |
| *G06Q 20/40* | (2012.01) |
| *G06Q 30/08* | (2012.01) |
| *G06Q 40/03* | (2023.01) |
| *G06Q 40/12* | (2023.01) |
| *H04L 9/14* | (2006.01) |
| *H04L 9/32* | (2006.01) |
| *H04L 67/104* | (2022.01) |

(52) U.S. Cl.
CPC ............. *G06Q 10/10* (2013.01); *G06Q 20/02* (2013.01); *G06Q 20/3672* (2013.01); *G06Q 20/3676* (2013.01); *G06Q 20/3678* (2013.01); *G06Q 20/3825* (2013.01); *G06Q 20/3829* (2013.01); *G06Q 20/4016* (2013.01); *G06Q 20/4037* (2013.01); *G06Q 20/405* (2013.01); *G06Q 30/08* (2013.01); *G06Q 40/03* (2023.01); *G06Q 40/12* (2013.12); *H04L 9/14* (2013.01); *H04L 9/3213* (2013.01); *H04L 67/104* (2013.01); *G06Q 2220/00* (2013.01)

(58) Field of Classification Search
USPC .......................................................... 705/40
See application file for complete search history.

(56) References Cited

U.S. PATENT DOCUMENTS

| | | |
|---|---|---|
| 2015/0287026 A1 | 10/2015 | Yang et al. |
| 2017/0083907 A1 | 3/2017 | McDonough et al. |
| 2017/0103391 A1* | 4/2017 | Wilson, Jr. ........... G06Q 20/401 |
| 2017/0232300 A1* | 8/2017 | Tran ..................... H04L 67/535 434/247 |
| 2018/0137512 A1* | 5/2018 | Georgiadis ............. H04L 63/08 |

OTHER PUBLICATIONS

Authors: Haihui Huang et al : Title: Implementing an Asset Trading System Based on Blockchain and Game Theory: Publisher: IEEE: Date of Conference: Oct. 17-19, 2019 (Year: 2019).*
Authors: Vasilios A Siris et al: Title: Interledger Approaches : Publisher: IEEE: Date of Publication: Jul. 4, 2019: IEEE: (Year: 2019) (Year: 2019).*
Authors: Haihui Huang etal : Title: Implementing an Asset Trading System Based on Blockchain and Game Theory: Publisher: IEEE: Date of Conference: Oct. 17-19, 2019 (Year: 2019) (Year: 2019).*
Authors: Sachiko Yashihama et al; Title: Study on Integrity and Privacy Requirements of Distributed Ledger Technologies; Publisher: IEEE; Date Added to IEEE Xplore: Jun. 3, 2019 (Year: 2019).*
Authors: Ali Dorri et al; Title: SPB: A Secure Private Blockchain-Based Solution for Distributed Energy Trading; IEEE Xplore; Publication Date: Jul. 1, 2019 (Year: 2019).*

* cited by examiner

| CREDIT | DEBIT | TOTAL | |
|--------|-------|-------|-----|
| T2 | T1 | 6 | APP *|
| T4 | T1 | 2 | APP |
| T3 | T2 | 14 | APP |

*MARK = T2 − T1 − USD | B3

| CREDIT | DEBIT | TOTAL |
|--------|-------|-------|
| T1 | T2 | ②  |
| T4 | T1 | 2 |
| T3 | T2 | 14 |
| T4 | T3 | 6 |

3102

CUST1-CUST2 NET SETTLEMENT DUE REPORT

| CUSTODIAN | CPTY CUSTODIAN | DEBIT CUSTODIAN | ASSET | CUSTODIAN NET SETTLEMENT QUANTITY | | | | | |
|---|---|---|---|---|---|---|---|---|---|
| CUST2 | CUST1 | CUST2 | BTC | 2 | | | | | |
| | CUSTODIAN LEDGER | TOTAL LEDGER SETTLEMENT QUANTITY | | | | | | | |
| | CUST1_BTC | 3 | | | | | | | |
| | EARMARKED ALLOCATIONS → | TRADER | AMOUNT | PRICE (USD) | UTXOS | | | | |
| | | TM3(CUST2) | 3 | 4200 | 1+2 | | | | |
| | TRANSACTIONS → | DEBIT TRADERS | CREDIT TRADERS | ASSET | PRICE | QUANTITY | DATE | TIME | TRANSACTION HASH | BLOCK HASH |
| | | TM1(CUST1) | TM3(CUST2) | BTC | 4000 | 2 | 2/19/2019 | 9:00 AM | F318BE9FB3F73E53B29868 | 1HQ2ULUD7T5YKAUCZ3KM |
| | | TM3(CUST2) | TM4(CUST1) | BTC | 4500 | 2 | 2/19/2019 | 9:10 AM | HADL36208790218BF51017 | 1E182JRUBAB21PIXDJMXPF |
| | | TM4(CUST2) | TM5(CUST3) | BTC | 5000 | 2 | 2/19/2019 | 9:10 AM | DAB0362087902188BF5101 | 1E182JRUBAB21PIXDJMXPF |
| | | TM2(CUST1) | TM3(CUST2) | BTC | 4100 | 2 | 2/19/2019 | 9:10 AM | DAB0362087902188BF5101 | 1E182JRUBAB21PIXDJMXPF |
| | | TM1(CUST1) | TM3(CUST2) | BTC | 4400 | 2 | 2/19/2019 | 9:10 AM | DAB0362087902188BF5101 | 1E182JRUBAB21PIXDJMXPF |
| | CUSTODIAN LEDGER | TOTAL LEDGER SETTLEMENT QUANTITY | | | | | | | |
| | CUST2_BTC | | | | | | | | |
| | EARMARKED ALLOCATIONS → | TRADER | AMOUNT | PRICE | UTXOS | | | | |
| | | TM1(CUST1) | 4 | 4000 | 1+1+2 | | | | |
| | | TM2(CUST1) | 1 | 4500 | 1 | | | | |
| | TRANSACTIONS → | DEBIT TRADERS | CREDIT TRADERS | ASSET | PRICE | QUANTITY | DATE | TIME | TRANSACTION HASH | BLOCK HASH |
| | | TM4(CUST2) | TM2(CUST1) | BTC | 4500 | 1 | 2/19/2019 | 9:15 AM | GHE18E9FB3F73E53B27986 | 1HQ2ULUD7T5YKAUCZ3KM |
| | | TM3(CUST2) | TM1(CUST1) | BTC | 4000 | 4 | 2/19/2019 | 9:10 AM | DAB0362087902188BF5101 | 1E182JRUBAB21PIXDJMXPF |

STEP 3 - SPECIAL EXCHANGE NETWORK BLOCKCHAIN TRANSACTIONS

CUST1_BTC:
- TM3:: 3 BTC UTXO → CUST2 SETTLEMENT ADDRESS
- COINBASE → TM1:: 4 BTC UTXO
- COINBASE → TM2:: 1 BTC UTXO
- TM1:: 4 BTC UTXO → CUST1 SETTLEMENT ADDRESS

CUST2_BTC:
- TM2:: 1 BTC UTXO → CUST1 SETTLEMENT ADDRESS
- COINBASE → TM3:: 3 BTC UTXO

CUST1-CUST3 NET SETTLEMENT DUE REPORT

| CUSTODIAN | CPTY CUSTODIAN | DEBIT CUSTODIAN | ASSET | CUSTODIAN NET SETTLEMENT QUANTITY | EARMARKED TRADERS | | | | |
|---|---|---|---|---|---|---|---|---|---|
| CUST1 | CUST3 | CUST1 | BTC | 0 | TM5 | | | | |
| | CUSTODIAN LEDGER | TOTAL LEDGER SETTLEMENT QUANTITY | | | | | | | |
| | CUST1_BTC | | | 2 | | | | | |
| | EARMARKED ALLOCATIONS → | TRADER | AMOUNT | PRICE | UTXOS | | | | |
| | | TM5(CUST3) | 2 | 4100 | 1+1 | | | | |
| | TRANSACTIONS → | DEBIT TRADERS | CREDIT TRADERS | ASSET | PRICE | QUANTITY | DATE | TIME | TRANSACTION HASH | BLOCK HASH |
| | | TM1(CUST1) | TM3(CUST2) | BTC | 4000 | 2 | 2/19/2019 | 9:00 AM | E3188E9FB3F73E53B | 1HQ2ULJD7T5YKAU |
| | | TM4(CUST2) | TM5(CUST3) | BTC | 4100 | 2 | 2/19/2019 | 9:15 AM | GHE188E9FB3F73E53 | 1E182JRUBAB21PIX |
| | CUSTODIAN LEDGER | TOTAL LEDGER SETTLEMENT QUANTITY | | | | | | | |
| | CUST3_BTC | | | 0 | | | | | |
| | TRANSACTIONS → | DEBIT TRADERS | CREDIT TRADERS | ASSET | QUANTITY | DATE | TIME | TRANSACTION HASH | BLOCK HASH |

STEP 3 – SPECIAL EXCHANGE NETWORK BLOCKCHAIN TRANSACTIONS

| | CUST1_BTC TM5: 2 BTC UTXO → | CUST3 SETTLEMENT ADDRESS |
|---|---|---|
| CUST1_BTC | | |
| CUST3_BTC | COINBASE → TM5: 2 BTC UTXO | |

FIG. 31C

| CUSTODIAN 1 LEDGERS | FUND OWED TO CUSTODIAN 2 |
|---|---|
| CUST1_USD | 500 |
| CUST1_BTC | 5 |
| CUST1_ETH | 2 |

3106

| CUSTODIAN 2 LEDGERS | FUND OWED TO CUSTODIAN 1 |
|---|---|
| CUST2_USD | 1000 |
| CUST2_BTC | 10 |

3108

NET SETTLEMENT AMOUNT:

| CURRENCY OWED | SETTLEMENT AMOUNT |
|---|---|
| CUST2 TO CUST1 (USD) | 500 |
| CUST2 TO CUST1 (BTC) | 5 |
| CUST1 TO CUST2 (ETH) | 2 |

SYSTEM AND METHOD OF PROVIDING A BLOCK CHAIN-BASED RECORDATION PROCESS

PRIORITY CLAIM TO RELATED APPLICATION

This application claims priority to U.S. Provisional Patent Application No. 62/897,030, filed Sep. 6, 2019, the content of which is incorporated herein by reference in its entirety.

FIELD OF THE INVENTION

The present technology pertains to operating a network of computers to generate an authorized blockchain-based recordation of a transaction in addition to a separate recordation of data. The disclosed approach provides a more secure, faster system for creating, executing transactions and delivery of digital assets or cryptographic data records.

BACKGROUND

The present disclosure addresses issues in the financial exchange markets and specifically resolves technical issues with respect to the current market computer infrastructure for running the capital markets. FIG. 1A illustrates a market infrastructure that currently exchanges securities or funds for clients. In the financial exchange market 100, companies like Citadel (a well-known hedge fund) and The Tudor Group, an investment company, generally represent investment managers and end clients 102. Assume that these two companies want to trade with each other. The mechanism by which they trade with each other is through the use of an executing or prime broker 104. A prime broker or prime brokerage is a term used for a bundled package of services offered by investment banks and securities firms that enables clients to transact on foreign exchanges across an array of dealers like Citadel and the Tudor Group.

Within the market infrastructure 100, a number of different entities will communicate with each other in order to facilitate the basic trading operation and to maintain trust. The investment managers and clients 102 will communicate with the executing broker 104 as well as a clearing broker 106. The clearing broker 106 can be a member of an exchange and acts as a liaison between an investor in a clearing corporation and helps to ensure that the trade is settled appropriately and that the transaction is successful. The executing broker 104 can communicate in real time via an API 108 with an exchange 116. Batch data associated with exchange transactions can also be communicated via a secure FTP communication 110. A custodian 118 holds customer securities for safekeeping in order to minimize the risk of theft or loss. Typically, securities are held in electronic form in a traditional database.

A central counterparty (CCP) 122 is another financial institution that takes on counterparty credit risk between the parties to a transaction and provides clearing and settlement services for trades in foreign exchanges, securities, options, and derivative contracts. The clearing broker 106 will communicate with the CCP 122 via a secure FTP protocol 112 and in real time via Message Queues (MQ) 114. A central securities depository (CSD) 120 is a special financial organization that holds securities such as shares either in a certificated or an uncertificated form so that ownership can easily be transferred through a book entry rather than the transfer of physical certificates. The CSD 120 communicates with the custodian 118 as well as the CCP 122 to allow brokers and financial companies to hold their securities of one location where they can be available for clearing and settlement.

There are a number of issues with the traditional market infrastructure 100 described above. First, there is a lack of timely access to critical data to separate databases being maintained by the different entities within the overall market infrastructure. The use of separate databases can be referred to as independent silos of data. Multiple copies of data are employed in this market infrastructure 100 which leads to the need for redundant reconciliations. These reconciliations take time and computer resources to achieve. Furthermore, complex workflows exist due to non-standard data formats and due to differences in the regulatory environment across different countries. Ownership changes are not final or even provable until settlement is completed in traditional systems. These challenges at least in part can be attributable to the old computer infrastructure and mechanisms of storing data in traditional databases.

The financial market infrastructure 100 is also costly due to fees being charged by the various entities that each play a role in ensuring proper clearing and settlement of trades. For example, there is a custodian fee, an exchange fee, a CSD fee, and so forth. This leads to a high cost for the market infrastructure. In addition, many of the entities must provide excess capital buffers to handle exceptions. A capital buffer is mandatory capital that financial institutions must hold in addition to other minimal capital requirements.

Indeed, the internal infrastructure or even one of these entities for trade management can include a large number of various components to manage issues related to such features as payments, product control, regulatory and reporting requirements, risk management, collateral management, trade repositories, external firms, trade capture, and so forth.

Having identified some of the problems with the market infrastructure 100, this disclosure now turns to a more specific issue within the market infrastructure 100. Clients 102 need the ability to borrow securities and cash in order to be able to invest on a netted basis and achieve an absolute return. Prime brokers 104 will most often require a margin deposit and potentially a fully collateralized credit line and, as a result, the assets of the hedge funds are held by the prime broker 104 in a role as a custodian 118.

An issue in the financial exchange markets is that only a small number of major players (Tier 1 banks) operate as prime brokerages 104. These prime brokerages typically will not work with smaller clients, but only work with large hedge funds with major collateral. Because prime brokerages 104 operate as custodians 118 and require full collateralization, government regulations have certain requirements with respect to clients and their credit lines. Accordingly, smaller clients or traders with less than perfect credit lines or not enough collateral have been cut off from the Tier 1 banks for receiving prime brokerage services 104. This makes the use of the financial services costlier for small traders who must rely on Tier 2 credit intermediaries.

In other cases, it may not just be smaller entities that are not able to access prime brokerage 104 services. Large entities with billions of dollars in collateral may also not be able to access prime brokerage 104 services. One basic benefit of being able to trade securities or other assets between entities using a prime brokerage 104 is an improved cost to clients for prime brokering 104 services, such as securities lending, leveraged trade executions, cash management, and so forth. In other words, large entities that qualify under certain regulations, or by choice, have the ability to get a reduced cost for the brokerage services than the average client. Thus, there is a wholesale market of prime brokerage 104 services that is only available to a small group of large clients. Because of the challenges in the technical infrastructure described above, there is a need for methods and apparatus that provide cost effective brokerage services to all types of clients that meet or exceed services provided by prime brokers today.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 31A-31D illustrate reporting data for net settlements;

DESCRIPTION

Figure 1A:
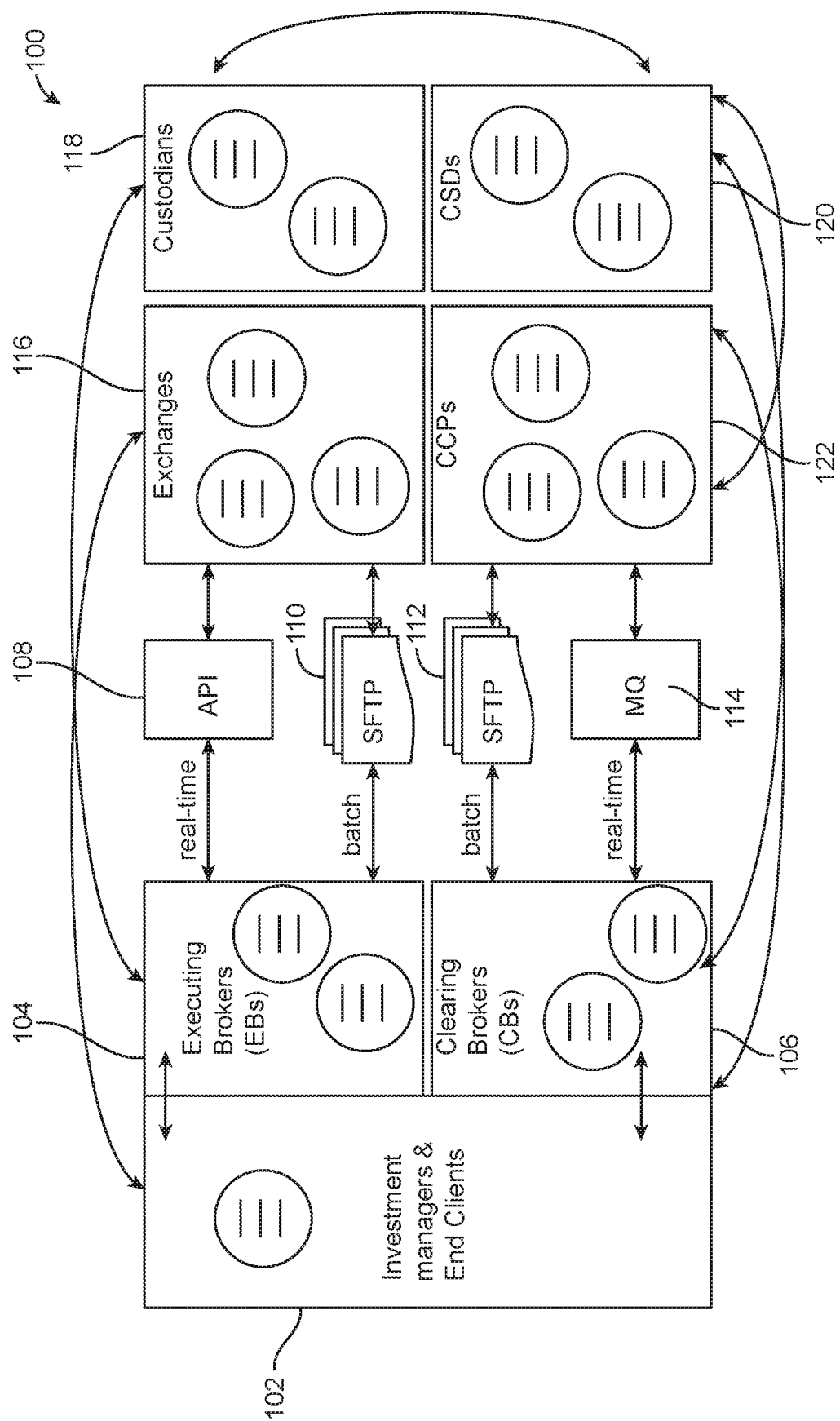
FIG. 1A illustrates a market infrastructure that currently exchanges securities or funds for clients.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, known details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Brief Overview

In some aspects, the present disclosure addresses the issues outlined above with respect to the problems in the market infrastructure particularly with respect to the lack of timely access to critical data due to siloing of data, requirements for storing multiple copies of data leading to redundant reconciliations, and complex workflows due to nonstandard data formats. Implementations of the present disclosure also address mitigating costs or fees that are associated with high infrastructure investments required to process transactions. Disclosed is a trading, prime brokerage or credit intermediation implemented via a number of different modules across a blockchain network. The structure is new and using the blockchain network in the manner disclosed improves the manner in which transactions can occur, including enabling the ability to perform cross-custodian net settlement transactions. One benefit of the technical improvements disclosed herein is that implementing a new blockchain-based approach can open up the wholesale market of prime brokerage services that is currently only available to a small group of clients. It is noted that the technology disclosed herein does not represent the implementation of an existing business model on a generic computer. Rather, the present disclosure represents new technology, which has a blockchain-based component that introduces new solutions to the issues raised above with respect to the problems within the market infrastructure and can lead to an ability of prime brokerage services being made available to more than a small group of clients in a manner that enables an increased amount of trust in the collateral available for trading. The processes disclosed herein, when implemented, represent a specialized computer system or a special-purpose computer system which includes the blockchain-based approach of applying a plurality of distributed network nodes operating a distributed consensus algorithm for approving transactions and recording transactions across a distributed ledger. A consensus algorithm can be a procedure through which all the peers of a blockchain network reach a common agreement about the present state of the distributed ledger. In this way, consensus algorithms achieve reliability in the blockchain network and establish trust between unknown peers in a distributed computing environment. Essentially, the consensus protocol makes sure that every new block that is added to the blockchain is the one and only version of the truth that is agreed upon by all the nodes in the blockchain. A peer-to-peer or other messaging component can be used to communicate between nodes in the blockchain or to other modules in the overall exchange network. Part of the infrastructure disclosed herein is the placement of blockchain network nodes at particular participants in the trading process and the use of the blockchain ledgers. For example, a blockchain node will be associated with custodians as well as a governance entity or exchange network.

The present disclosure introduces new technical components, including a new way of creating a blockchain ledger, that solve a number of problems in a number of industries. For example, the present technologies enable safely reserving central bank or commercial bank currency, cryptocurrency or any other asset to prevent double spending/over commitment. The disclosed technologies create a digital representation of the assets (e.g., US dollars (USD) or bitcoins (BTC)) instead of requiring exchange of value for an underlying native token that has market risk and/or even if pegged to the value exchanged has potentially different legal treatment and underlying guarantor and liquidation waterfall.

In one embodiment disclosed herein, a new platform enables parties to a trade to directly face each other and trade assets without counterparty risk, as the assets being traded are collateralized by each participant's respective sponsoring firm that is also registered to use the platform. At a high level, the platform can include three main components: a custodian module, trader module, and a core system or governing node. The custodian module can be hosted directly by the sponsoring firm and communicate with the core system through application programming interface ("API") calls. The custodian module can also be hosted by the same entity operating the core system, thus enabling the sponsoring firm to perform all applicable functions through a web portal accessed through a multi-factor authentication process. Blockchain nodes can be configured as part of the custodian module and the governing node or core system.

The digital representation of assets is disclosed without a native cryptocurrency that can minimize an attack vector and reduce risks from hacks, etc. For example, even if one gets tokenized BTC, they need a custodian to redeem the tokens and process a transaction on the public ledger on their behalf from the BTC in their control.

Digital representation of assets can stay on the network indefinitely without increasing risk. The ability to maintain the digital representation of assets on the network (without increased risk) can allow for optimization of actual movement of underlying assets, which can be performed independent of other actors in the system. One benefit of this capability is the increase in the velocity and utility in the use of capital. The movement of the underlying assets is generally limited to public ledger constraints and other solutions that do not maintain provability of transactions. However, the benefit described above to the disclosed technology can include the movement of assets on slower single ledger systems.

Adding cryptographic provability of all transactions and assets in a transaction system that is not a public ledger containing a full transaction history is an illustrative improvement over transaction recordation in omnibus account structures at current exchanges where only transactions on the public ledger are provable.

Consensus over proofs of transactions on a custodian ledger represents an improvement to prevent owners/operators of private ledgers from changing the history of ledgers in their control. Applying a blockchain consensus approach increases speed and optimizes the timing and utility of consensus. Deploying a network-access-control, based on a signed genesis block, is implemented to prevent unauthorized ledger creation on a semi-public network but without control over ledgers in question. In one aspect, the blockchain-based network for handling cryptocurrency transactions includes a plurality of distributed nodes on which runs a distributed consensus protocol algorithm that records transactions on a distributed ledger across the distributed nodes. Such a configuration represents a special-purpose computer for handling the recordation of cryptocurrency transactions in a manner that solves the double-spend problem and which could not be achieved on a general-purpose computer or general-purpose database of transactions being recorded. In other words, the previous infrastructure could not achieve the ability to solve the double-spend problem and had to employ time and computer resources, as well as human resources, to confirm transactions.

Various proofs for blockchain networks can be used herein. Proof of elapsed time, proof of capacity, proof of work, proof of stake, proof of burn, practical Byzantine fault tolerance, and so forth are example consensus algorithms that can be applied herein.

A multi-ledger approach allows different custodians to own and operate their own ledgers without ownership/data/privacy/confidentiality issues and provides improvements in scaling. An enforcement of checks for value without exposing amounts or transaction details to the entire network and without total anonymity (which is bad from regulatory point of view) or using slower cryptographic methods (which is bad from a transaction throughput/scalability point of view) are also disclosed.

In one example, a method is disclosed of operating a custodian server for facilitating an asset transfer. The method includes creating, via a custodian module operating on behalf of a custodian entity, a plurality of blockchain-based ledgers. The plurality of blockchain-based ledgers can include a blockchain-based ledger associated with the custodial entity and associated with an asset type. The blockchain-based ledger can be generated with an asset genesis block that includes a signature of a hash digest of raw data for the asset genesis block. The signature can be generated by a central administration module (e.g., an exchange network or XN network) separate from the custodian module. In another aspect, the system can employ a consensus driven decentralized governance approach, such as are used in blockchain networks, rather than a centralized approach. The method can also include receiving, at the custodian entity operating the custodian module, collateral from a client, the collateral being of the asset type, and maintaining the collateral in a custodial ledger of the custodian entity.

The method can further include receiving, from the client and at the custodian module, a request for a reservation of assets representing at least a portion of the collateral, and verifying, by the custodian module, an authenticity of the client and the request by mapping personal details received with the request against the custodial ledger. The custodial ledger can identify the asset as available for reservation to yield a verification. The solution disclosed herein can also interface with any other wallet solution, smart contract, blockchain system and so forth, that includes the appropriate features.

In one alternate approach, the exchange network also operates or is affiliated with an entity that operates the custodial module.

When the verification indicates that the asset is available for the reservation, the method includes approving the request by issuing a token to the client and generating a new block on the blockchain-based ledger that identifies the client and the collateral associated with the token. The new block can be considered an unmined issuance or "coinbase" transaction to the public key address of the client on the custodial distributed blockchain ledger. In one aspect, the asset can be issued onto the distributed blockchain ledger by a custodian.

Another method example of this disclosure includes generating a first custodian blockchain-based ledger for a first asset type in which the genesis block is signed by an exchange network entity, generating a first token associated with an amount of the first asset type held by a custodian, the first token associated with a block on the first custodian blockchain-based ledger identifying the amount of the first asset type for a first client, generating a second custodian blockchain-based ledger for a second asset type (also having a genesis block signed by the exchange network), generating a second token associated with an amount of the second asset type held by a custodian for a second client, the second token associated with a block on the second custodian blockchain-based ledger identifying the amount of the second asset type for a second client, and receiving, at the exchange network, data that the first client and the second client agree to trade at least a portion of the first asset for at least a portion of the second asset. These features can also be described as an asset and an additional asset or a client and an additional client, or a blockchain-based ledger and an additional blockchain-based ledger, and so forth.

The exchange network disclosed herein can consist of the one or more components operated by the governor of the network. The governance can involve a group of token holders for an as of yet unissued governance token. The exchange network then performs an atomic exchange (or a concurrent exchange) including a current transaction of the portion of the first asset for the portion of the second asset and the system records a change in token of ownership at the first custodian blockchain-based ledger and the second custodian blockchain-based ledger. In one aspect, this process involves a cryptographically provable change of ownership on the two respective ledgers by moving assets from one or more public key address to another one or more public key address. The method can further include a redemption process in which the first client (who now owns the second asset type) or the second client (who now owns the first asset type) can receive actual dollars or bitcoin (or other instrument of value), which can be moved from an account or wallet held by the custodian to the new owner after the trade. At the time of redemption, a respective token can be transferred to a burn account or burn wallet to update the respective ledger appropriately. The burn account can also be to the custodian's public key address.

An example method from the standpoint of the custodial entity can include the following steps. The custodial entity (i.e., the servers/computer systems of the custodial entity) can perform steps including creating or causing to be created at least one blockchain-based ledger established for a respective asset type, wherein the at least one blockchain-based ledger has a genesis block that is signed by an exchange network through which clients of the custodial entity can trade assets. The custodial entity can receive assets from clients and store those assets in custodial accounts. Having genesis blocks on each respective blockchain-based ledger signed by the exchange network can provide a foundational level of trust, which can act as a barricade against a rogue node entering the network.

Upon tokens being created based on at least one blockchain-based ledger, which can represent (the tokens) client assets held by the custodial entity, the custodial entity can broadcast to the exchange network data regarding the availability of client assets for trading. The broadcast of the data can be performed using any type of notification or communication of the availability of the client assets for trading. After clients trade assets (such as paying dollars to buy bitcoin), the custodial entity can receive a redemption request from a client for an asset and transfer the redeemed asset from the custodial entity to a client account. Tokens that represent assets held on the ledger for a respective client can be burned upon a redemption request or after the request is fulfilled. Any cryptographically secure burn approach can be implemented. In one aspect, a digitized token issued by one custodian for a given currency, whether a fiat currency or a cryptocurrency, is the same in every aspect as the digitized token issued by another custodian for the same currency. This feature can emphasize the fungibility aspect of the digitized tokens and support the fundamental soundness and liquidity of the entire system. In another aspect, the digitized tokens issued by each individual custodian can be similar in a portion of its characteristics to digitized tokens issued by another custodian for the same currency, while having an individual or different portion or component that can be used to identify the custodian, a timing associated with the issuance of the digital token, or any other data. While the technology/benefits of the disclosure apply to a wide variety of contexts/applications, for explanation purposes, the disclosed technologies will be described in the context of market infrastructures and recordation. The present disclosure can also provide technical benefits in other applications or use cases that rely on time-critical data or cryptographic lineage or provability of data that may or may not be distributed across systems and/or disaggregated. For example, the approaches herein can be implemented to provide a new technical framework for timely access to time-critical data in robotic applications, autonomous driving applications, extended reality applications, Internet of things (IoT) applications, automation applications, supply-chain applications, disaster recovery applications, payments from one party to another, etc. To illustrate, in autonomous driving, extended reality, and numerous tracking and localization applications, timely access to data, which may originate from different users, devices, and networks, can help avoid numerous problems ranging from damage to property or human life (e.g., accidents involving autonomous vehicles or aircrafts) to poor computing performance (e.g., poor mapping and translation performance in extended reality applications). Other technical benefits include the ability to provide the concurrency of data changes, the protection of cryptographic assets, and so forth. These technical improvements were not possible given the previous hardware and software technologies used in exchanges. However, the approaches herein can provide timely access to the various types of data used by such systems to ensure safe and accurate operation and performance.

In one aspect, this disclosure introduces new features such as a system having one or more of a custodian module, a trader module, an order entry system, a matching engine, an atomic swap process which can operate via a smart contract, a cross-custodian net settlement process, a virtual custodian module, the ability to perform lending as an on-chain repo-transaction, an integration with a decentralized exchange, and a blockchain network which is integrated into various nodes such as governance nodes, custodian nodes and so forth. The new hardware framework introduces and enables new and improved processes to perform transactions in ways not traditionally performed. It is noted that claims or embodiments of this disclosure can include each module separately claimed as an example embodiment. For example, a claim can cover the structure and/or operations of the custodian module, the governance node, an atomic swap process or smart contract, the blockchain network, and so forth. The operations performed by each individual component described herein can be considered a separate invention and can be claimed as such. These operations can include the communication of data to other components and receiving data from other components, as well as the operations performed by each respective component.

An example system includes a custodian node having a processor and a computer-readable storage device storing instructions for operating a custodian module to perform operations. The operations can include one or more of creating a distributed blockchain ledger on a blockchain node of a blockchain network, the blockchain network including a plurality of distributed nodes operating a consensus algorithm to record transactions across a distributed ledger. These operations can also include receiving a request to tokenize assets, this tokenizing may be based on the request, and the assets can be added onto the distributed blockchain ledger to yield tokens. This may also include receiving a redemption request, burning, based on the redemption request, the tokens off the distributed blockchain ledger, performing atomic transaction commitment, and performing net settlement computations based on trading transactions in blocks. The net settlement computation further can include net settlement movements including instructions to outside services separate from the custodian node.

The system can include a trader module operating on a trader device. The trader module can be configured to interact with the custodian module and to perform operations including one or more of reading, via a wallet, unspent transaction outputs and sums for balances. Furthermore, the system can allow access to traders to an order entry system, initiate issuance and redemption requests to the custodian module, and manage public keys and private keys for the traders.

The system can also include an atomic swap module configured on a node, the atomic swap module can be configured to perform operations including one or more of: receiving transactions from a matching engine that matches traders, obtaining a signing of the transactions with the private key to yield signed transactions, adding the signed transactions to a mempool, ensuring that an atomic swap occurs that changes ownership of assets concurrently with two respective distributed blockchain ledgers to yield a trade execution, and notifying the matching engine or other systems of a successful or failed trade execution. Note that a mempool is a where all valid transactions wait to be confirmed by the blockchain network consensus algorithm. A mempool may include data stored in an organized structure at data repository.

The system can also include a cross-custodian net settlement module configured on a node, the cross-custodian net settlement module can be configured to perform operations including one or more of calculating net settlement amounts due for all users in each asset between any two custodian modules and their related blockchain ledgers, and generating, based on the net settlement amounts, a full allocation report for all users, all assets all related unspent outputs and proofs, the full allocation report including netted quantities and residual quantities. The system may also perform steps of loading the residual quantities into a blockchain-based smart contract or otherwise creating movement instructions over non-blockchain ledger rails, and creating an atomic transaction that burns and reallocates the netted quantities and invokes the blockchain-based smart contract or other traditional rail payments.

The custodian module further can further be configured to perform operations including performing arbitrary payment transactions between blockchain ledger addresses. The consensus algorithm can include a just-in-time consensus algorithm or other algorithms. The atomic swap module can further be configured to perform one or more of the following operations: performing a credit check against an unspent output set totals for users in question, and receiving as blockchain transactions or creating blockchain transactions that spend the unspent output associated with the users in question.

The operation of obtaining the signing of the transactions with a private key as performed by the atomic swap module can occur via (1) the trader module performing a delegated signing with a supplied private key from the trader; or (2) sending the transactions to the trader module for signing by the private key.

The operation of ensuring that the atomic swap changes ownership of the assets as performed by the atomic swap module further can include calling a governance blockchain node which validates transactions and changes status of mempool transactions and invoking a two-phase commit protocol with custodial distributed blockchain ledgers related to affected unspent output.

In one aspect, the order entry system can be configured to perform operations including performing a real-time pre-trade credit check, and entering bids and offers or requests for quotes or otherwise negotiating pricing. The order entry system may also submit orders to a matching engine. The order entry system can further be configured to perform operations including connecting to a credit engine and margin engine, performing calculations for determining a client buying power, and performing one-way payment orders.

The matching engine can be configured to perform operations including receiving quotes and orders from third parties, and executing order matches in a lit book or a dark book or both. The matching engine can be further configured to perform operations including maintaining and publishing an order book, and aggregating outside order books such as exchanges and smart order routings out to them for execution.

The system can further include a virtual custodian module configured to perform operations including interacting via a wallet with the blockchain-based smart contract for time-locked transactions related to an atomic swap, and facilitating the atomic swap between smart contract-held assets and the custodian module with assets on blockchain ledgers.

The system can be configured to perform operations including lending as an on-chain reposition transaction wherein the on-chain reposition transaction that is expected to be and can be forced to be unwound with a countervailing transaction based on collateral and risk and margin rules.

The system can be further configured to perform operations including performing programmatic intraday borrowing based on preset rules and preferences managed within the trader module.

The system is further configured to perform operations including executing on the blockchain network between assets on different blockchain ledgers at one or more custodian modules.

The system can be integrated with a decentralized exchange and both puts liquidity into the decentralized exchange and takes liquidity off of the decentralized exchange. The system can be further configured to perform operations including maintaining atomic swaps between the blockchain-based smart contract and the custodian distributed blockchain ledger.

The blockchain network can include one or more governance modules with a governance module blockchain node, a plurality of custodian modules with a custodial module blockchain node, a plurality of blockchain ledgers per custodian module, a plurality of trader modules, and a peer-to-peer messaging capability. In such an instance the blockchain network implements the consensus algorithm and uses a transaction broadcasting protocol and with various possible privacy levels.

Any of these features described in connection with any one example or embodiment can be mixed and matched with other features disclosed herein.

In one aspect, the present disclosure is directed to blockchain-based technologies that significantly reduce counterparty and settlement risk. The applicant readily recognizes that the *Alice* Supreme Court decision (*Alice Corp.* v. *CLS Bank International,* 573 U.S. 208, 134 S. Ct. 2347 (2014)) addresses claims that disclosed a scheme for mitigating "settlement risk." Accordingly, several comments are made directly in the application to address that decision and how the present technologies differ from the patent ineligible claims in the *Alice* case. The Court in *Alice* decided that the claims in that case were patent ineligible because they first were directed to an abstract idea of intermediated settlement, which is an idea that was taught in introductory financial classes and was a concept that is "a fundamental economic practice long prevalent in our system of commerce." Then, the Court held that the wholly generic computer implementation is not generally the sort of additional feature that provides any practical assurance that the process is more than a drafting effort designed to monopolize the abstract idea itself.

While the present technologies can reduce counterparty and settlement risk, the focus of various aspects of the present technologies is a blockchain-based solution which utilizes an interconnected network including a plurality of nodes that validate a transaction according to a transaction algorithm and includes the concept of the genesis block of each blockchain-based ledger created for a specific asset type being signed by an exchange network that will be used to trade assets contained within the ledger. In another aspect, the principles disclosed herein can eliminate counterparty credit and settlement risk through real-time on-chain blockchain-based payment-vs-payment transactions at the custodial level which completely replaces the infrastructure used by CLS Bank. The approach is different from other entities as well that use a delivery-vs-payment and post-trade-based system that requires that they custody the assets for settlement directly at the protocol layer. The disclosed system is decentralized and non-custodial.

The blockchain-based technology solves many of the problems outlined above relative to the current market infrastructure with respect to the siloing of data, the need for complex reporting schemes, the cost, and so forth. The issues with the existing infrastructure can be solved to some degree by the blockchain-based approach. Thus, the present disclosure introduces a special-purpose computer (not a generic computer simply implementing old and well-known ideas) that implements new processes to solve specific problems in the traditional networked-based approach to trades.

Blockchain technology in general has only been recently introduced into the marketplace in the past few years and is not "long-prevalent in our system of commerce". The focus of various aspects of the present disclosure includes the approach of digitizing assets in a particular way on a blockchain, and thus clearly does not involve a wholly generic computer simply implementing an old and long-prevalent process of reducing settlement risk.

Importantly, the disclosed blockchain-based technologies, rather than merely implementing a previous financial process on a generic computer, address the problems outlined above with respect to the various technical use cases and applications, such as current market infrastructure. As noted above, and with reference to FIG. 1A, the existing market infrastructure 100 has a number of problems including a lack of timely access to critical data, requirement of storing multiple copies of data which leads to redundant and expensive reconciliations which take time, and include, because of the complex nature of the infrastructure, complex workflows which are due to nonstandard data formats. Ultimately, because of the various players in the overall market infrastructure, the use of the trading infrastructure is expensive due to fees being charged by each entity within the market infrastructure 100.

One way that the focus of one or more aspects of the present technologies could be characterized is that they are directed to (at least in part) an approach of creating a first blockchain-based ledger limited to a single type of asset, which is used for asset digitization of that single type of asset, and creating a second blockchain-based ledger limited to a second type of asset, which is also used as a digitization of that second type of asset. Such a characterization may also include using the first and second blockchain-based ledgers to perform atomic or concurrent transactions without actually moving the assets. The architecture disclosed herein in one aspect includes a fully decentralized governance approach and autonomous software such as smart contracts that can be stored on and executed by blockchain systems. The first blockchain ledger and the second blockchain ledger are utilized by an exchange network (which signed each genesis block of each respective ledger) to perform the atomic or concurrent transactions such that trades can occur without actually moving any of the assets. The structure and use of the blockchain-based ledgers as described herein provide various technical improvements as described in this disclosure. The proposed blockchain-based technologies can eliminate, for example, the need for one or more of the custodian 118, the CCP 122, the CSD 120 or other entities within the market infrastructure 100.

By removing the need to actually move the asset being traded, the proposed blockchain-based solution can improve the ability to timely access critical data, can eliminate the need to maintain multiple copies of data and thus eliminate the need to maintain redundant reconciliations, and can simplify the workflow through the enablement of a more standard data format while providing a cryptographic lineage and evidence of provability. These improvement can improve and render more efficient the underlying hardware and software infrastructure for exchange networks and thus represents an improvement in computer technology directed at a problem specifically arising in the exiting computer infrastructure. In other applications, such as autonomous driving or flight control, the approaches herein can similarly provide significant improvements by improving timely access to time-critical data, reducing data redundancy or data disaggregation, etc. Of course, eliminating some of the entities involved in the current market infrastructure 100 can reduce the number of costly fees to the end client. Characterizing the claims as being "directed to" merely minimizing settlement risk without the technological component of the blockchain-based ledgers and the technical improvements, new processes applicable to the blockchain-based network, and techniques herein would be inaccurate.

Thus, according to the *Alice* decision, the claims would be patent eligible because they are not directed to a more generalized concept of settlement risk that was proven (using evidence like a document from 1896) in the *Alice* decision to be "a fundamental economic practice long prevalent in our system of commerce." In other words, reducing counterparty and settlement risk by the virtue of using multiple single assets type blockchain-based custodial ledgers, each ledger having a genesis block signed by an exchange network entity, is certainly not a fundamental economic practice long prevalent in our system of commerce. The technology introduced in the present disclosure is certainly not well-understood, routine or conventional, but rather represents an improvement in technological fields such as the technological field of financial market trading infrastructures. The technical improvements disclosed herein provide for, among other things, a new blockchain-based infrastructure for a trading platform that provides for the reduction in the timely access to data, such as critical data, that often is distributed in separate databases and not current, the reduction in redundant reconciliations of data, the reduction in complex workflows between various entities needed in a market environment, and a reduction in costly fees.

DETAILED DESCRIPTION

Figure 1B:
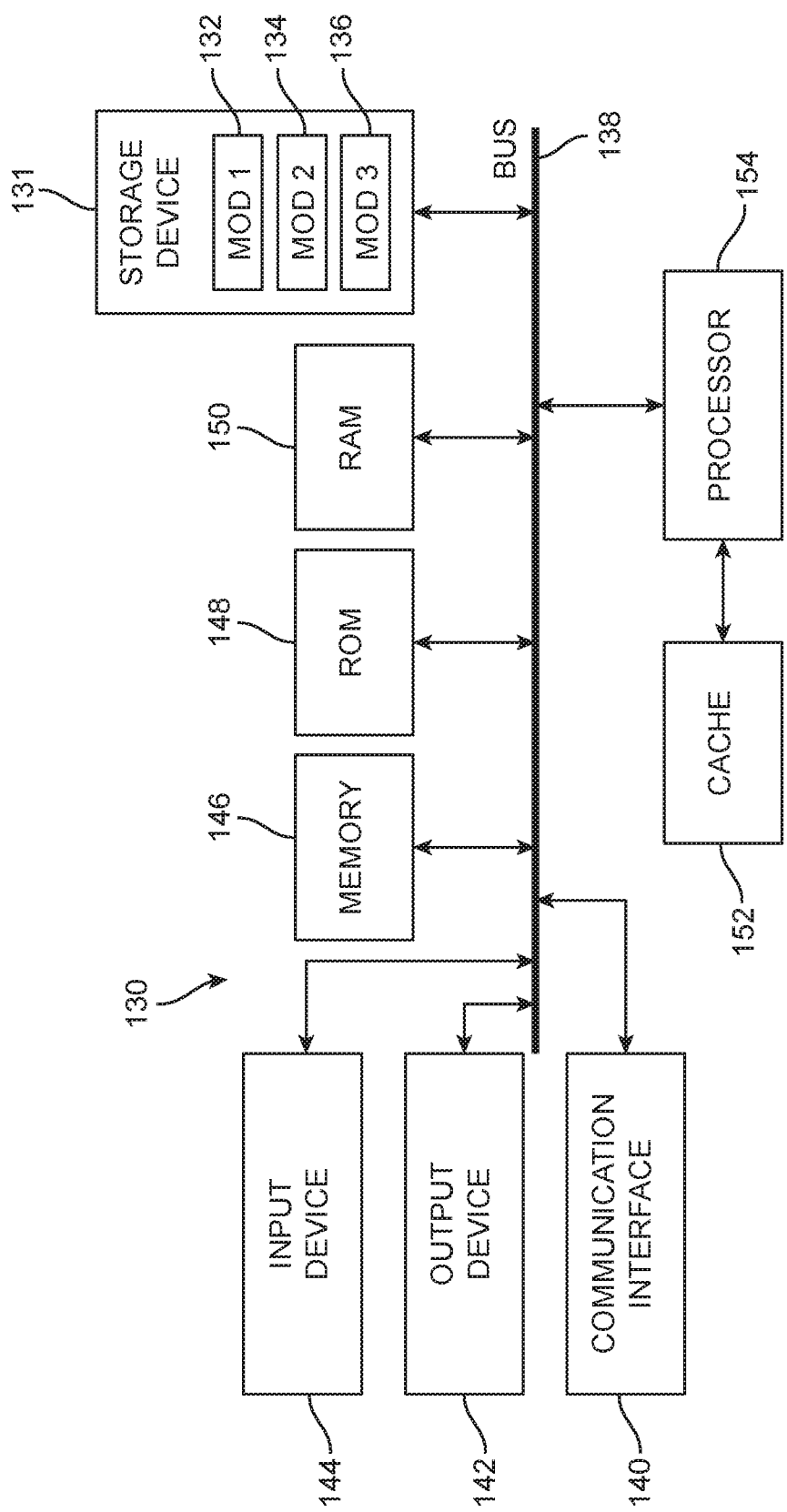
FIG. 1B illustrates an example computing device that can be used to implement the presently disclosed technology.

The disclosure now turns to FIG. 1B, which illustrates an example computing system that can be used to implement the presently disclosed technology. The computing device of FIG. 1B includes various hardware components, which can be used to implement functions associated with the system, server, communication device, or any other computing device disclosed herein.

In this example, FIG. 1B illustrates a computing system architecture 130 including components in electrical communication with each other using a connection 138, such as a bus. System 130 includes a processing unit (CPU or processor) 154 and a system connection 138 that couples various system components including the system memory 146, read only memory (ROM) 148, and random access memory (RAM) 150, to the processor 154. The system 130 can include a cache 152 of high-speed memory connected directly with, in close proximity to, or integrated as part of the processor 154. The system 130 can copy data from the memory 146 and/or the storage device 131 to the cache 152 for quick access by the processor 154. In this way, the cache 152 can provide a performance boost that avoids processor 154 delays while waiting for data. These and other modules can control or be configured to control the processor 154 to perform various actions. Other system memory 146 may be available for use as well. The memory 146 can include multiple different types of memory (e.g. FLASH, RAM, or other) with different performance characteristics. The processor 154 can include any general purpose processor and a hardware or software service, such as service 1 132, service 2 134, and service 3 136 stored in storage device 131. These software services can include instructions that configure or control the processor 154 as well as a special-purpose processor where software instructions are incorporated into the actual processor design. The processor 154 may be a completely self-contained computing system, containing multiple cores or processors, a bus, memory controller, cache, etc. A multi-core processor may be symmetric or asymmetric. Other components can include shared memory, a message bus, a publish/subscribe (pub/sub) messaging service that decouples services and produces events from services that process events. The system can also include virtualization or virtual machines.

To enable user interaction with the computing device 130, an input device 144 can represent any number of input mechanisms, such as a microphone for speech, a touch-sensitive screen for gesture or graphical input, keyboard, mouse, motion input, speech and so forth. An output device 142 can also be one or more of a number of output mechanisms known to those of skill in the art. In some instances, multimodal systems can enable a user to provide multiple types of input to communicate with the computing device 130. The communications interface 140 can generally govern and manage the user input and system output. There is no restriction on operating on any particular hardware arrangement and therefore the basic features here may easily be substituted for improved hardware or firmware arrangements as they are developed.

Storage device 131 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 150, read only memory (ROM) 148, and hybrids thereof.

The storage device 131 can include services or modules 132, 134, 136 for controlling the processor 154. Other hardware or software modules are contemplated. The storage device 131 can be connected to the system connection 138. In one aspect, a hardware module that performs a particular function can include the software component stored in a computer-readable medium in connection with the necessary hardware components, such as the processor 154, connection 138, output device 142, and so forth, to carry out the function.

For clarity of explanation, in some instances the present technology may be presented as including individual functional blocks including functional blocks including devices, device components, steps or routines in a method embodied in software, or combinations of hardware and software.

In some aspects, the systems and methods disclosed herein address the problem of the existing market infrastructure outlined above. The technologies herein also enable prime brokerage trading services 104 to more customers and provide a technical solution to make such services available and increase the performance and security of associated data, transactions, and network infrastructures. The technologies disclosed herein are blockchain-based and, in some aspects, include a component that ties the exchange network disclosed herein to data contained within the blockchain by requiring that each genesis block of each blockchain-based ledger be signed by the exchange network that will later be the platform upon which trades are made and recorded in an atomic fashion on the blockchain-based ledger. Various example components of blockchain technologies are disclosed in FIG. 2.

Figure 2:
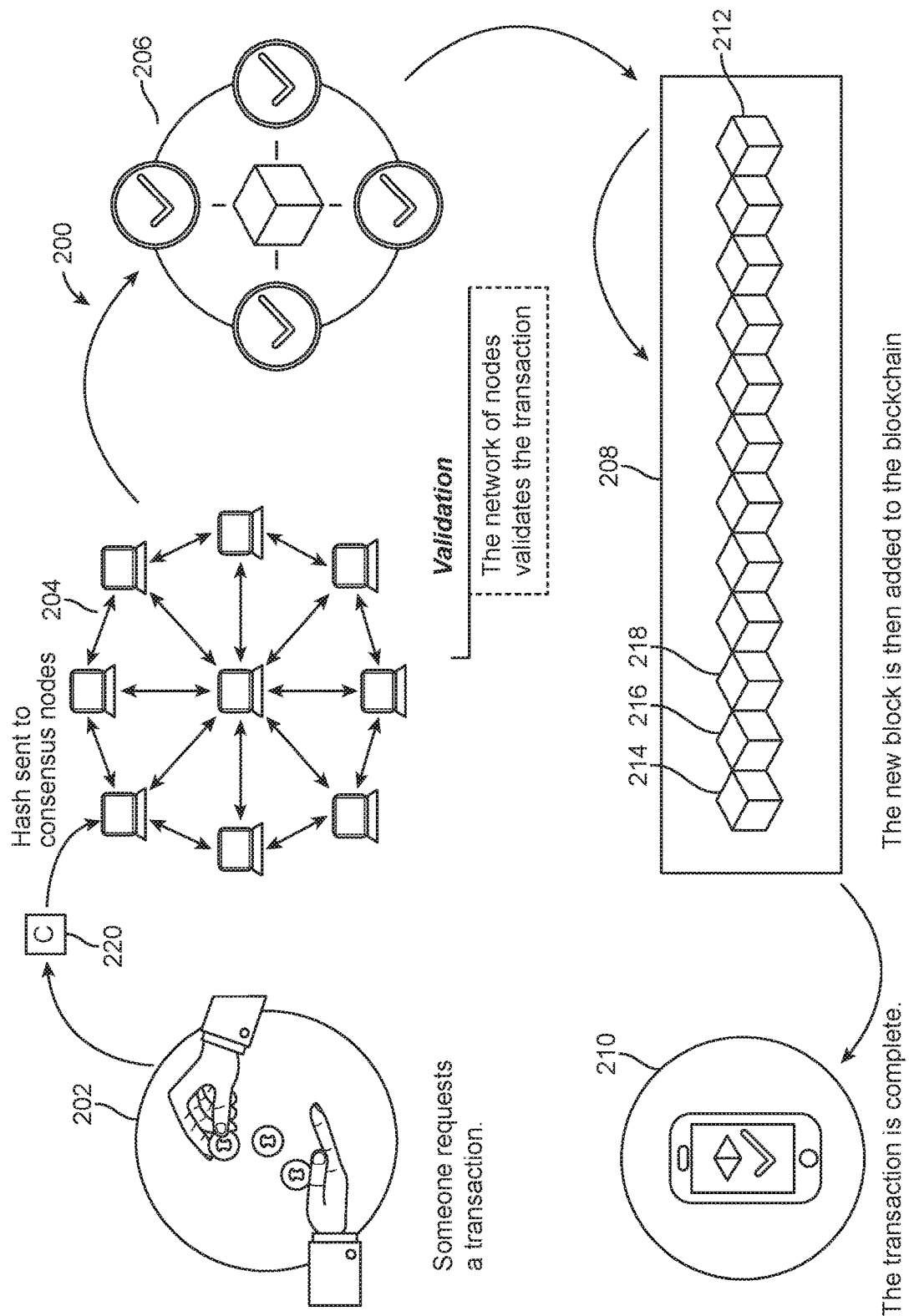
FIG. 2 illustrates a blockchain recordation process with various components.

FIG. 2 illustrates a blockchain recordation process with various components. The overall operation of a blockchain network 200 is typically initiated with a request for a transaction 202. Generally, the transaction can relate to any transaction that needs to be recorded, such as issuance, redemption, trade, payment, reservations, etc. In some aspects herein, the transaction can be a particular transaction with respect to a custodial blockchain-based ledger as disclosed herein. The requested transaction is broadcast to a network that includes a plurality or a group of nodes 204. The group of nodes executes a validation process 206 that will validate the transaction as well as the user status using an algorithm. A blockchain process ensures that the data that is recorded is trustworthy. The blockchain facilitates a trustless interaction and enables the data to be freely accessible and visible. One of the benefits of using a blockchain is that the blockchain can be used to mirror real assets, as will be described in the present disclosure. Once the validation 206 occurs on numerous nodes within the network, new block 212 is added to the blockchain 208 and the transaction is then complete 210 as is shown in FIG. 2. The genesis block 214 is the initial block in the blockchain 208, and follow-on blocks are shown as block 216 and block 218. In the present disclosure, each genesis block of each ledger is signed by the exchange network, or an entity associated with the exchange network. In one example the genesis block can be signed by a trader or trader module.

Copies of the blockchain ledger 208 are stored across a small or large number of computers in the network. The network can include a network of peer nodes in which each node in the network can store its own copy of the blockchain ledger. Keeping all of the copies of the blockchain 208 ledger synchronized is done using a consensus protocol operating in a distributed manner across the nodes. The blockchain network represents a specific or specialized computer system that includes both hardware specific requirements (distributed nodes) and a first specific software requirement (a consensus algorithm or protocol) and a second specific software and hardware requirement (a distributed ledger that records transactions). As such, the blockchain network cannot be considered a generic computer system. In some cases, the blockchain 208 only records transactions rather than state information. In some examples, as will be discussed, blockchain records can record the result of trade transactions and/or state information with respect to particular accounts, and particularly with respect to accounts of certain asset types that are managed by the custodian. For example, the exchange network can manage a trade in which a first client sold 1 BTC on the exchange for $10K. As a result of that trade, the "state" for each client can include the fact that the first client now has $10K and the second client now has 1 BTC. Recording that respective information on a USD-based blockchain ledger and the BTC-based blockchain ledger can be considered a recordation of state information regarding who owns what amount of that asset type.

The process creates an alternate ledger to what a custodian or other entity involved in the trading lifecycle might use and adds faster finality and cryptographic provability and immutability over, for example, a relational database and conventional settlement process of moving assets or recording ownership changes T+2, etc. In another aspect, the respective ledgers can be configured to record the results of the transaction.

Figure 3A:
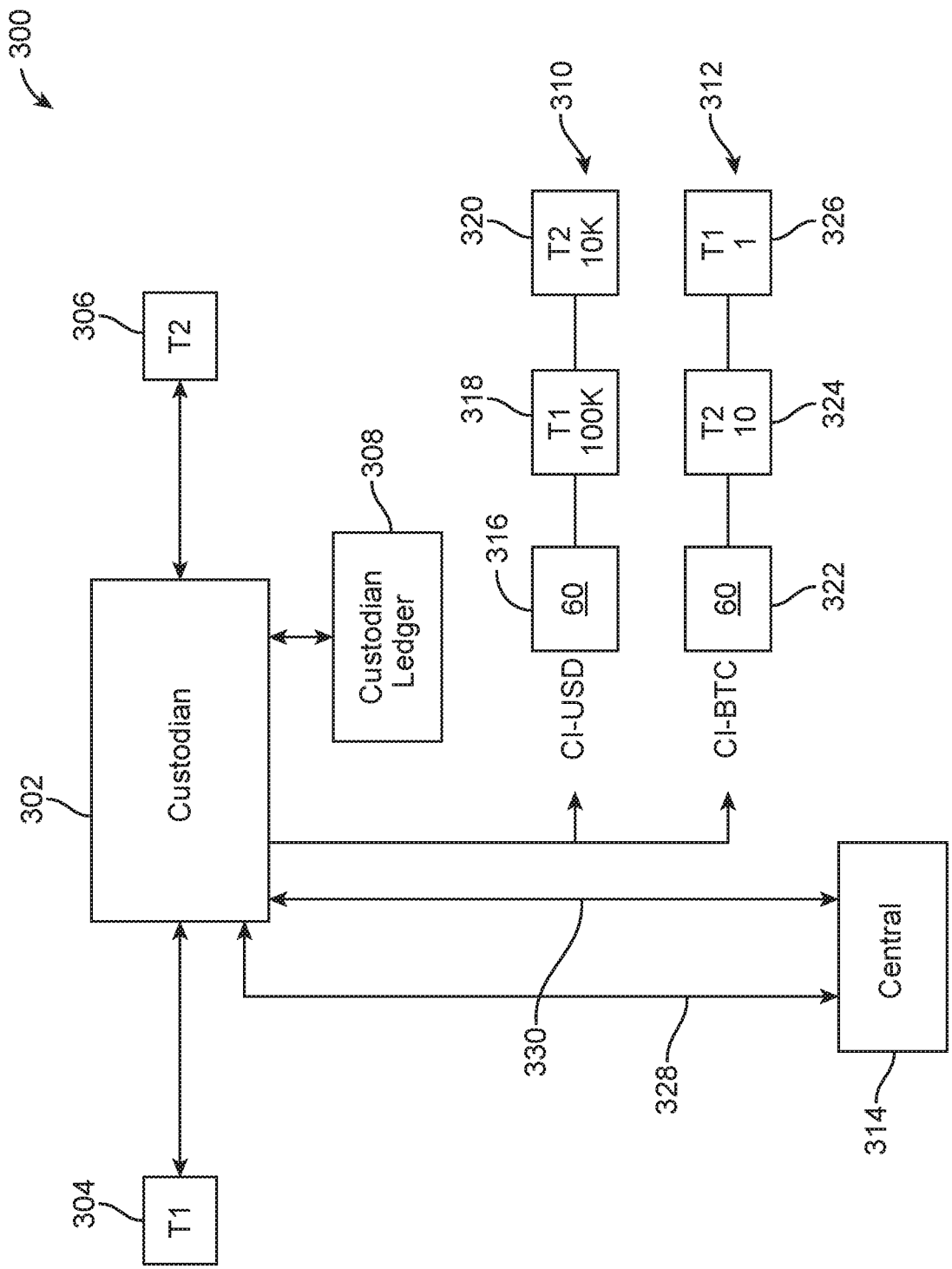
FIG. 3A illustrates a custodian module according to an aspect of this disclosure.

FIG. 3A illustrates a custodian module according to an aspect of this disclosure. FIG. 3A discloses a system 300 which includes the operation of a custodian 302 module for managing a plurality of ledgers associated with transactions. The custodian technologies provided herein can be offered to customers that are custodians of assets that are members of the network. The custodian solution can be implemented via a custodial module that operates on the custodian computer system or is accessible via an interface. Accessing the custodian solution can be performed through a custodian downloading a custodian module onto their own network for performing the functions disclosed herein or via a custodian obtaining an account with a custodial service that presents the functionality to the custodian and their customers. The technologies herein make it possible to seamlessly and programmatically digitize any assets the custodian can legally hold on behalf of clients as collateral to support the client's financial transactions on the network. In one aspect, the principles disclosed herein can enable a "one-click" aspect where blockchain ledgers can be created with a one-click tokenization request.

Several example technical components of the custodial solution disclosed herein can include a client user interface or application programming interface with which a first client 304 or a second client 306 can access the services provided by the custodian 302 or the exchange network 314. The approach can also cover any type of digital asset storage mechanism including protocols that can lock and unlock and transfer assets based on meeting logical criterion, smart contracts, etc. These user interfaces can enable clients to transfer assets to a custodian 302 and make trades such as dollars for bitcoin or anything of value for any other item of value, whether the items are of a similar type or not. Any application programming interface disclosed herein includes calls, responses, and protocols or API framework configured to communicate data between different entities, and so forth. For example, a custodian user interface 330 and/or application programming interface 328 can be included as well. These interfaces can be between a custodial entity 302 and a central server or central entity 314, which can provide services as disclosed herein. In one aspect, the central entity 314 can perform the custodial functions that are described for the custodian 302 such that the custodian 302 can log into the custodial user interface 330 and access the functionality. While a user may log into the custodian 302 via the user interface 330, other data may be communicated between the custodian 302 and the central entity 314 via a separate application programming interface 330 as well.

FIG. 3A also includes US dollar ledger 310 and BTC ledger 312 that are discussed below in respect to FIG. 4. US dollar ledger includes genesis block 316 and trading blocks 318 & 320. BTC ledger includes genesis block 322 and trading blocks 324 & 326.

The term "central entity" can include an exchange server, a blockchain node, or a management entity operating an exchange network (XN). Whether via a user interface 328 or combination of an interaction between the user interface 328 and the application programming interface 330, when the custodian entity 302 is separate from the central server 314, such interfaces can be used. In another aspect, the custodian entity 302 could be separate from a central server 314 and the central server 314 can provide a software module that is loaded onto computer systems of the custodian entity 302 to provide the functionality necessary. In this scenario, API calls or other communication calls could be used to communicate data between the custodian module and the centralized entity 314. Generally speaking, the central server or centralized entity 314 can be considered to be the exchange network upon which the clients will access for the purpose of trading.

Other features disclosed and discussed herein include key management services and blockchain details such as a protocol specification, ledger creation, transaction model, and consensus over proofs concept. Several other concepts disclosed herein will be a ledger management service, the concept of persistence, a P2P communication protocol, a custodian account system, and a user interface or API. Any type of interface is contemplated as being usable with the concepts disclosed herein. User interfaces can be graphical, audible, speech related, multimodal, text-based, gesture-based, and any combination thereof.

The term "blockchain node" is used herein to represent a collection of software components that the central server 314 provides for each node of the network of nodes communicating with each other to implement the blockchain functionality described herein. Some of these are mentioned as technology components above.

Other concepts associated with the creating and utilization of ledgers as disclosed herein include the utilization of ledger creation metadata: name, address, account number, international bank account number (IBAN), etc. When a custodian creates a new ledger, the genesis block can utilize one or more of such metadata in the creation of the ledger. In one or more examples, a ledger can require an m-of-n multi-signature scheme requirement for client accounts to include one or more custodian accounts as a signatory agent for ledger creation. Ledgers can have a ledger state such as disabled/enabled based on any number of factors. For example, an administrative agency may prevent an individual or an entity from trading on the platform and thus implement a disable state to a ledger or an account. The custodian can carry out the instructions from the agency by virtue of disabling a ledger associated with that client.

The ledgers created and operated as disclosed herein can be utilized to perform a number of different actions. For example, ledger actions can include one or more of issuance, redemption, acceptance, reversal, removal, sending, enabling, disabling, or placing holds.

Figure 3B:
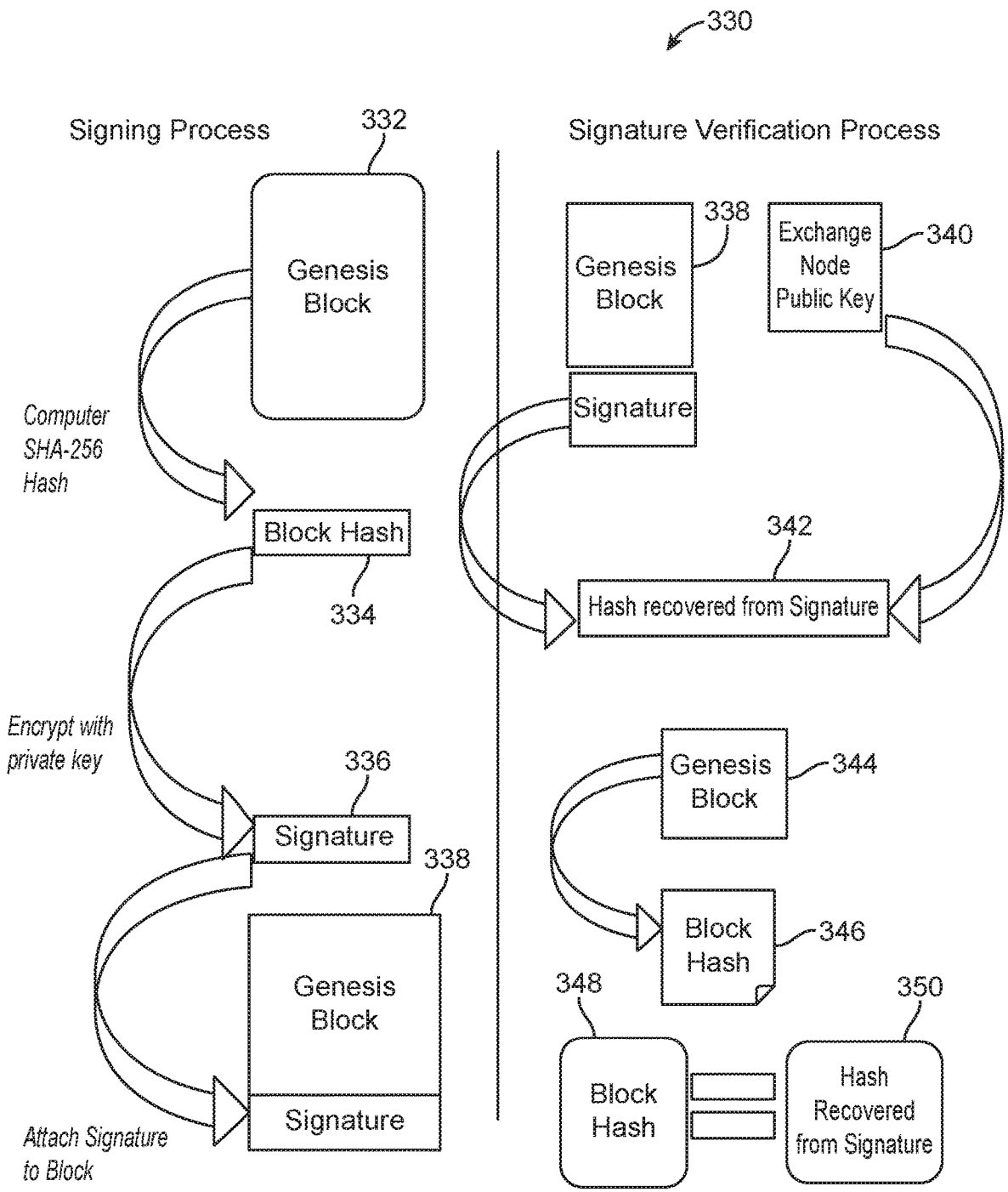
FIG. 3B illustrates a genesis block signing process, in accordance with some examples of the present disclosure.

FIG. 3B illustrates an example genesis block signing process 330 consistent with exemplary implementations of the present disclosure. The signing process 330 begins with a genesis block 332 in which a hash is computed using, for example, the SHA-256 Hash or other hash, to yield a block hash 334. A custodian, in one aspect, can create the genesis block and transmit it to an exchange network node. The block hash 334 is encrypted with a key to yield the signature 336. The key can be the private key of a trader, a custodian public key, or a key associated with the exchange network node. In one aspect, the exchange network node performs the encryption using its elliptic curve private key. The exchange network node can send back the encrypted hash to the custodian node 302 of FIG. 3A. The signature is attached to the genesis block to yield a signed genesis block 338. The custodian node 302 can perform the operation of attaching the encrypted hash along with the genesis block as the cryptographic signature of the genesis block.

An entity wanting to validate the authenticity of the genesis block of the custodian node can pick the signature attached with the genesis block and pick the public key of the exchange network node, which can be public domain. The signature verification process involves utilizing the genesis block that is signed 338 and applying the exchange node public-key 340 to recover the hash associated with the signature 342. The question is whether the genesis block 344 with the block hash 346 is a match for the recovered hash. The system determines whether the block hash 348 equals or matches the hash recovered from the signature 350. If a match exists in the resulting hash matches with the SHA-256 hash of the genesis block, then the signature is verified as authentic.

Figure 4:
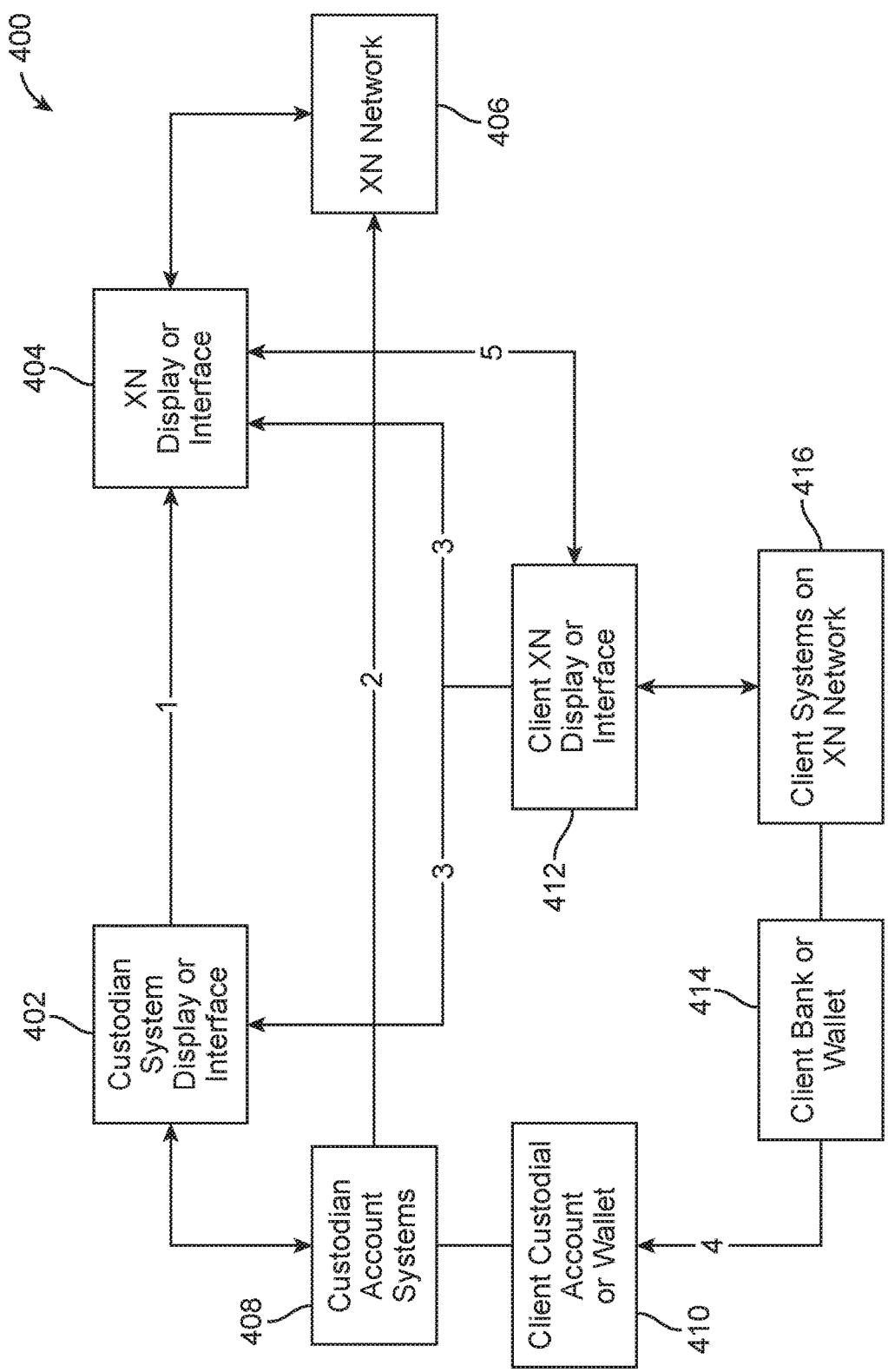
FIG. 4 illustrates a scenario of various components working together to create accounts to operate an exchange network for clients as disclosed herein.

FIG. 4 illustrates a scenario of various components working together to create accounts to operate an exchange network for clients as disclosed herein. Further details of the process shall be described next and with reference to FIG. 4, which illustrates a system 400 for setting up the appropriate accounts. It is noted that in the overall system 400 shown in FIG. 4, the general process involves setting up accounts both in a custodial system 402 as well as a central system, or exchange network component 404, all for the purpose of participating in the exchange network 406. The custodian 402 accesses the user interface 404 or API 330 of FIG. 3B when communicating with the central server 406 to set up their account 08, establish key pairs, create roles and permissions for authorized parties, create ledgers for assets they wish to support holding as collateral for digitization on the network, etc. Step (1) in FIG. 4 shows the communication between the custodian system interface 402 and the interface 404 of the exchange network 406. The setup of the ledgers is shown in FIG. 3A. First, there is a standard custodial ledger 308 that includes a traditional ledger that a custodian could use to manage account details or store assets of users, such as accounts to hold dollars transferred by a client 304 to the custodian.

The ledgers 310 and 312 are set up as follows. The ledgers are blockchain-based, and thus are separate from a traditional custodial ledger 308. A first custodial ledger "C1" is created for a certain asset type. The example provided in FIG. 3A is for ledger C1 to be used for dollars (US dollar ledger 310). Of course this can be for any fiat currencies such as rubles, yen, and so forth. Further, the custodian 302 could of course set up an individual ledger for each type of asset.

A second or additional blockchain-based ledger is also shown for the custodian 302 for bitcoin, the "BTC" ledger 312. In creating the basic ledger components, one feature disclosed herein is that the central server 314 has to sign the genesis block 316 or 322. This genesis block shows an initial amount in that ledger for each type of asset. For example, the US dollar ledger 310 has a genesis block 316 that shows zero dollars. The BTC ledger 312 has a genesis block 322 showing zero bitcoin in the ledger at creation.

In general, a ledger is a sequenced, tamper-resistant record of all state transitions that will occur and be managed by custodian 302 between a first client 304 and a second client 306. Each transaction results in a set of asset key-value pairs that are committed to the ledger as creates, updates, or deletes.

The ledgers can include a blockchain ('chain') to store the immutable, sequenced record in blocks, as well as a state database to maintain current state. Each peer in the communication network 204 maintains a copy of each ledger 310, 312 for each asset type managed by custodian 302.

In general, the chain is a transaction log, structured as hash-linked blocks, where each block contains a sequence of N transactions. The block header includes a hash of the block's transactions, as well as a hash of the prior block's header. In this way, all transactions on the ledger are sequenced and cryptographically linked together. It is not possible to tamper with the ledger data without breaking the hash links. The hash of the latest block represents every transaction that has come before, making it possible to ensure that all peers are in a consistent and trusted state.

The ledger's current state data represents the latest values for all keys ever included in the chain transaction log. Current state represents all latest key values known to the channel.

Chaincode interactions include steps that execute transactions against the current state data stored in a chain transaction log. To make these chaincode interactions extremely efficient, the latest values of all keys are stored in a state database. The state database is simply an indexed view into the chain's transaction log, it can therefore be regenerated from the chain at any time. The state database will automatically get recovered (or generated if needed) upon peer startup, before transactions are accepted.

In one illustrative example, persistence model utilizes PostgreSQL as the underlying database for storing state information. Different implementations and different clients may have different preferences with respect to their database model. If preferred, state database options can include LevelDB and CouchDB. LevelDB is a state database embedded in the peer process and can store chaincode data as key-value pairs. CouchDB is an optional alternative external state database that provides addition query support when chaincode data is modeled as a JAVA script object notation (JSON), permitting rich queries of the JSON content. Other database systems and models are also contemplated herein.

At a high level, the transaction flow can include a transaction proposal sent by an application client to specific endorsing peers. The endorsing peers verify the client signature, and execute a chaincode function to simulate the transaction. The output is the chaincode result, a set of key-value versions that were read in the chaincode (read set), and the set of keys/values that were written in chaincode (write set). The proposal response gets sent back to the client along with an endorsement signature. The validation model can include a consensus between a central governance node and custodian nodes and can also have alternate validation schemes.

The client assembles endorsements into a transaction payload and broadcasts it to an ordering service. The ordering service delivers ordered transactions as blocks to all peers on a channel. Before committal, at least some of the peers 204 will validate the transactions. First, they will check the endorsement policy to ensure that the correct allotment of the specified peers has signed the results, and they will authenticate the signatures against the transaction payload 206. Second, at least some of the peers 204 will perform a versioning check against the transaction read set, to ensure data integrity and protect against threats such as double-spending.

The custodian 302 of FIG. 3A then broadcasts (step (2) in FIG. 4) its availability as a custodian on the exchange network 406. The clients 304/306 can then use, via a client network interface 412, the custodian 402 or central server interface 404 that may be provided as a user interface (UI) or an application program interface (API) to set up their account at the central server 314 on XN network 406 and the custodian 302/402. This is illustrated in step (3) in FIG. 4. The clients 304/306 transfer assets from a client bank or wallet 414 to an account or wallet at the custodian 308/410 via step (4) in FIG. 4. This transfer can occur in any manner appropriate for the asset type, such as a wire transfer, or bitcoin, transfer, or any other cryptocurrency transfer. The clients 304/306 use a UI for the central entity 314/404 or API to set up their central entity account and establish connection with the custodian 302/402. The client can include a system on the exchange network 416. Once in place, clients 304/306 can utilize the services of the exchange network 406 and make trades. This is illustrated in step (5) in FIG. 4.

Figure 5:
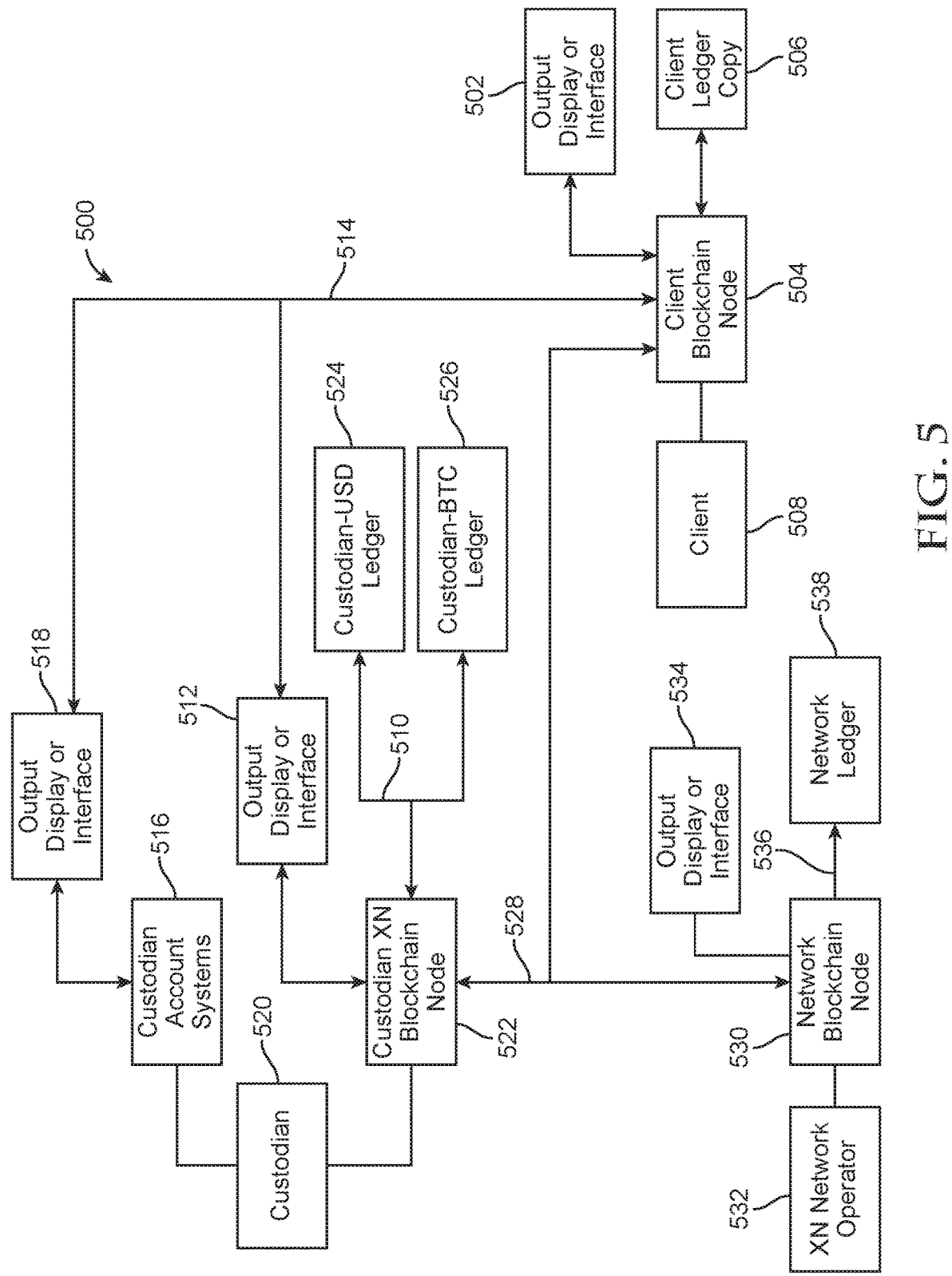
FIG. 5 illustrates the use of a custodial blockchain node, exchange network blockchain node, and a client blockchain node to perform transactions and redeem assets according to the concepts disclosed herein.

FIG. 5 illustrates the use of a custodial blockchain node, exchange network blockchain node, and a client blockchain node to perform transactions and redeem assets according to the concepts disclosed herein. FIG. 5 illustrates an example process 500 for asset tokenization according to various aspects disclosed herein. FIG. 5 shows the beginning of an initial issuance of a digital representation of the collateral. As shown in FIG. 5, a client 508 with an account at the custodian 520, containing a fiat currency such as US dollars, cryptocurrency, or other assets that can be used as collateral, uses a UI or API at interface 502 to request a reservation of the collateral by selecting the account and specifying the amount. The reservation of the collateral means the custodian 520 places an administrative or other hold on the reserved assets such that it cannot be used or accessed while it is securing open positions or other financial commitments of the client on the network. In one aspect, placing the administrative hold on the assets is programmatic.

Client blockchain node 504 electronically communicates the request to a custodian blockchain node 522. A "blockchain node" is being used generically to represent a collection of components that can include a blockchain component. In another aspect, the nodes shown (504, 522, 530) can represent more general servers or computing devices on the network that may not be necessarily a blockchain node performing blockchain-based functions.

The custodian blockchain node 522 receives the client request for reservation of collateral on UI or via API 512 via request communication 514 which contains client specific identifiers matching those on record with custodian already. Additionally, the request 514 is digitally signed and contains the client public key. The custodian account system 516 (or manual operator using interfaces 512 and 518) receives request communication 514 at display and/or interface 518 and verifies client identifiers and custodian-held assets are available for client request prior to placing administrative hold on portion of assets requested.

The custodian 520 through UI or API interface 512 approves issuance of the digital representation (e.g., token, digital deposit slip, or deposit receipt) of the reserved collateral 510 into a digital ledger (e.g., ledgers are typed as <custodian-id>|<asset-id> and can include an asset amount). An alternative to issuance and redemption directly to the client public key address on the Custodian blockchain ledgers would be to (1) Once the system creates a ledger for a custodian, the system also can create an address for the custodian in that ledger; (2) If the custodian is committed to hold 1 M USD based on client requests to issue collateral (variable sum based on redemption request totals), the governance node or custodian node can create a "coinbase" transaction to issue the 1 M to the custodian public key address on the custodial node. In that transaction, the governance node signature could be required (the custodian-held collateral could optionally be assured based on any proof of reserves methodology); (3) When a user node requests collateral issuance, this could be a transaction from a custodian public key address to user node public key address.

Digital ledgers 524, 526 are generated for managing and tracking asset issuance, change of ownership, and asset redemption are created for each asset, USD at 524 and BTC at 526 in this example, but could be any asset or any number of ledgers. Note that ledger creation can occur in the setup phase as illustrated by FIG. 4 and existence of the ledgers can be broadcast to the exchange network that is how clients will discover custodians. In this regard, the overall process can include multiple custodians, each creating their own set of ledgers covering services and interactions that they provide. The multiple custodians can then broadcast on the exchange network to clients in order to compete for business. This disclosure provides a way to have multiple custodians holding the same types of assets or different types of assets and facilitating atomic exchange transactions between clients with assets as different custodians and then using the cross-custodian net settlement capability to finalized transactions according to the specific technology disclosed herein.

In one example, a custodian 520 can create a plurality of ledgers for a plurality of different types of assets. Each ledger can be created for a different type of asset. In some cases, multiple ledgers for a same asset type could be created, with different ledgers created for different asset type ranges. For example, one ledger for BTC transactions from 0.1 to 10 BTC and another ledger for transactions above 10 BTC. As noted herein, each ledger is created with a genesis block signed by the network node 530 or a central server. A client 508 might contact a custodian asking to transfer a new kind of asset to the custodian for exchanging on the exchange network. If a ledger typed for the respective kind of asset for the custodian (issuer) does not exist, a ledger is created. This can therefore be a dynamic process of ledger creation upon request of an asset.

The custodian blockchain node 522 generates the initial ledger root metadata containing ownership information (identifying the custodian) and conditions applicable to all clients requesting issuance or redemption of collateral. The ledger root metadata is transmitted to XN blockchain node 530 for network authorization and participation, as further illustrated in FIG. 5. Acceptance by the exchange network is verified and attestable with a digital signature generated by the XN blockchain node 530 incorporating the ledger root metadata received by custodian. Without the XN digital signature, the custodian's ledger would be considered unauthorized and unable to participate in network services or exchange services. It is noted that this process could apply to any service provided. This can be accomplished with other access control methods such as by provisioning the custodial node software in the first place. For example, the services do not need to be specific to an exchange network or trading platform, the services can be any kind of service such as a video streaming service, searching mechanism, on-line marketplace, and so forth.

If the ledger typed for the requested kind of asset for this custodian (issuer) does exist, then a digital representation is created in a transaction commitment message at 510 to the ledger 524, 526 by the custodian blockchain node 522.

The custodian blockchain node 522 aggregates transactions at custodian defined intervals. The blockchain network will provide detail transaction validation, a block write algorithm, and a write mechanism, to add a new block to a blockchain-based ledger. In another aspect, a mempool config and block command can be used to write can be actually controlled by a central exchange network or governance node. Custodians can perform the net settlement movements based on aggregated/netted transactions and they can do this at any time. However, the choice of timing can affect the actual wallets/ledgers of the clients and one improvement can include synchronizing transactions to match the state of the blockchain ledgers. A mempool is where all valid transactions wait to be confirmed by the blockchain network consensus algorithm.

A cryptographic-proof (mathematically-provable) incorporating aggregated transaction data is generated by the custodian blockchain node at 522 and then transmitted to network participants at 528. As network participants receive proofs, additional attestation is conferred by comparing proofs with other network participants. Note that in this blockchain network, the blockchain custodian node 522, a network blockchain node 530 and a client blockchain node 504 all exist. The custodian blockchain node 522 has is its associated custodian ledgers based on asset type 524/526. The client blockchain node 504 has its copy of the ledger represented as the client ledger copy 506. The network blockchain node 530 includes the network ledger 538 that may receive information 536 from network blockchain node 530. This can be any combination of copying the ledgers at any of these nodes, or not. Minimally, a governance network node has copies of everything and custodial nodes have copies of their own client transactions and cross-custodian net settlement transactions.

When a majority threshold is met, such as 3 of 5 network participants agree they have received the same proof, the network participant stores the proof and considers it final. The entire process of proof creation, distribution, collection, and comparison is performed automatically and programmatically by blockchain nodes such as at 522. Another form of consensus over proofs may be configured to provide security that no custodian node has altered its ledger. Transaction validation and commitment may still work with the real-time consensus, and the secondary "just in time" after-the-fact consensus can certify the integrity of custodial ledgers or give trading firms copies of their own transactions with ability to let regulators see them, etc. Any alternate consensus model or transaction validation could be used, but generally today are not fast enough for use within a real-time on-chain transaction system.

However, the validation process can be performed ad-hoc or by separate client-developed services that conform to the protocol specifications. Any operations or transactions performed by the exchange network as the network operator 532 can also cause the network blockchain node 530 to generate cryptographic-proofs as described herein and commit transactions to one or more ledgers it controls and operates as shown at 538. Feature 538 also relates to recordation of operational actions taken by the governance node and is optional and could involve data recordation only and not asset transactional ledgers. The point is to record the cryptographic lineage of operations taken by the governance node/autonomous software entities, etc. The network blockchain node 530 can broadcast such transactions and/or cryptographic-proofs to the network (i.e., to one or more of the custodian blockchain node 522 and/or the client blockchain node 504) for recordation, consensus, display and other uses as shown at 528.

The value of the digital representation of collateral on deposit at the custodian 520 in the name of the client 508 is visible to network services of 530/532 and displayed in custodian 520, client 508 and network operator UI/API 502, 518 and 534. As transactions are created or received as managed by the network operator 532, balances are calculated in real-time and maintained in memory and in one aspect, also persisted to disk. "Persistence" can be writing directly to the file system, or a database, or a cryptographic database. Balances can also be computed in real time from a state on blockchain ledgers and may involve real-time enrichment/adjustments to state such as "earmarking" assets as used when a redemption request is pending even though no blockchain transaction for the redeem has taken place yet. The same can apply for a pending order not yet filled. This prevents the failure of the transaction on the second collateral verification check in the atomic swap process and prevents a bad user experience or lost opportunity.

Value representations recorded as transactions on ledgers 524/526 can be transferred through various types of transactions recorded where: (1) Cryptographic-proof of existence of the collateral is validated, such that each transaction generated contains the asset source and asset destination, (2) Cryptographic proof the transaction is validated where each transaction contains a non-repudiation mechanism, such as incorporating one or more digital signatures generated by current asset owner(s), and (3) Transactions primarily represent changes of ownership of the digital representations of the collateral assets that are recorded on ledger. When starting from a last committed transaction, it is possible to traverse backwards to the original issuance of the asset by the custodian.

After assets are transferred to the custodian, and the appropriate asset types and custodial ledger are created, users can trade the assets on the XN network. At some point, however, clients will desire to redeem their collateral. For example, a client may have purchased bitcoin with dollars, and, after the price has risen, the client desires to redeem their bitcoin and receive their assets back from the custodian.

Redemption of collateral from the custodian 520 is initiated by the present cryptographically provable owners such as the client 508 by sending a request including at least the asset (which contains the custodian reference, e.g., <custodian-name>|<asset>) and amount being redeemed off the custodian's ledgers on the network 524/526 back to the custodian account system 516 which can include account ledgers in any form (e.g., standard banking system ledger accounts or omnibus accounts) and/or cryptographic wallets of any kind (e.g., hot or cold storage, software or hardware) through the UI or API 502 with communication 528 between the client blockchain node 504 and the custodian blockchain node 522.

The requesting party such as client 508 can encrypt metadata used by the custodian with one of the custodian's redemption accounts (as determined by asset root metadata) and embed within the transaction as additional metadata prior to submission. This is performed programmatically by the client blockchain node 504.

Custodian 520 receives the client 508 request 528 on UI or via API interface 512 and is able to verify digital signature associated with request/transaction was generated by owner (signed with client's private key). Any possible digital signature scheme or key management solution can be applied. Custodian blockchain node 522 and/or custodian system 516 either programmatically or with a manual operator verifies the client signature and asset ownership contained in the redemption request.

Custodian 520 through UI or API interface 512 approves redemption request causing the custodian blockchain node 522 to migrate the digital representation of the asset situated currently at redemption account (e.g., public key address) to the custodian's burn account. The custodian's burn account can be represented by a public key burn address where movement of digital representation of the asset is no longer possible after this point as corresponding private key associated with burn account's public key is not known, rendering it unspendable.

The custodian account system 516 then manually or programmatically releases administrative hold on actual assets on deposit backed by "burned" digital representation of the assets. In one aspect, redemption is only permitted after net settlement movements are processed by the custodian. If the redemption request is by the original asset owner that first created the issuance request that resulted in the digital representation of the asset (e.g., the coinbase issuance transaction) on the ledgers 524/526, assets are released within or placed back into the client account in the custodian account system 516. If redemption is by a new owner of the digital representation and underlying asset through a valid transaction recorded on the custodian ledgers 524/526 then prior to or concurrent with the administrative hold being released, the assets are debited from the original client account and credited to the new owner's account on the custodian account system 516.

If the new owner does not have an account/relationship with the custodian 520, the administrative hold is released and the assets are concurrently sent to the new owner's account or cryptographic wallet at their designated custodian with coordinates that were specified in the redemption request 528. This is one optional embodiment. The preferred approach is to use the cross-custodian net settlement.

If the new asset owner's custodian is a member of the exchange network, the payment can be sent by custodian 520 via custodian blockchain node 522 as a transaction to transfer the digital representation of the asset to the new asset owner's custodian (receiving it in trust for the new asset owner while giving the asset owner's custodian a redemption right on the sending custodian 520) where it can be used by the new asset owner as collateral on the exchange network by following the steps for requesting reservation of collateral as described herein, together with a standard redemption/issuance where it is replaced by the new asset owner's custodian (as the new issuer/guarantor for the new asset owner) with the new asset owner's custodian issuance of a digital representation of the assets as described herein (i.e., in their equivalent of accounts/wallets described at 516).

The transaction that transfers the digital representation of the asset from the new asset owner who requested the redemption to their custodian as the new owner (in trust) is initiated by custodian 520 and committed 510 to the ledger 524/526 where it is now owned by the new asset owner's custodian and can be used to settle amounts owed to custodian 520 or redeemed over traditional payment rails with a standard redemption request as described herein. The asset can be redeemed by the new asset owner to any other account or wallet and net settled later over traditional payment rails between custodian 522 and the new asset owner's custodian. In this case, the new asset owner's custodian can elect to replace the currency assets from its own reserves and release the assets to the new asset owner, while retaining ownership of the digital representation of the assets issued by custodian 522. Optionally, there can be a check against shared anti-money-laundering (AML)/know-your-customer (KYC) solution before allowing transference to the new asset owner's custodian.

The burn and reallocation process (atomic between two custodial ledgers) and transfer of residuals either over traditional rails (wire transfer or public ledger transaction) or optionally via smart contracts can make the burn and reallocation of the netted portion and smart contract release of residuals atomic with the burn and reallocation such that neither custodian has any counterparty or settlement risk. Additional details are provided herein.

The (AML)/(KYC) solution relates to due diligence activities the financial institutions or other regulated companies perform to ascertain relevant information from their clients for the purpose of doing business. An atomic exchange service processes any value transfer or other transaction request guaranteeing availability of underlying collateral based on digital representation of the assets on ledger.

Figure 6:
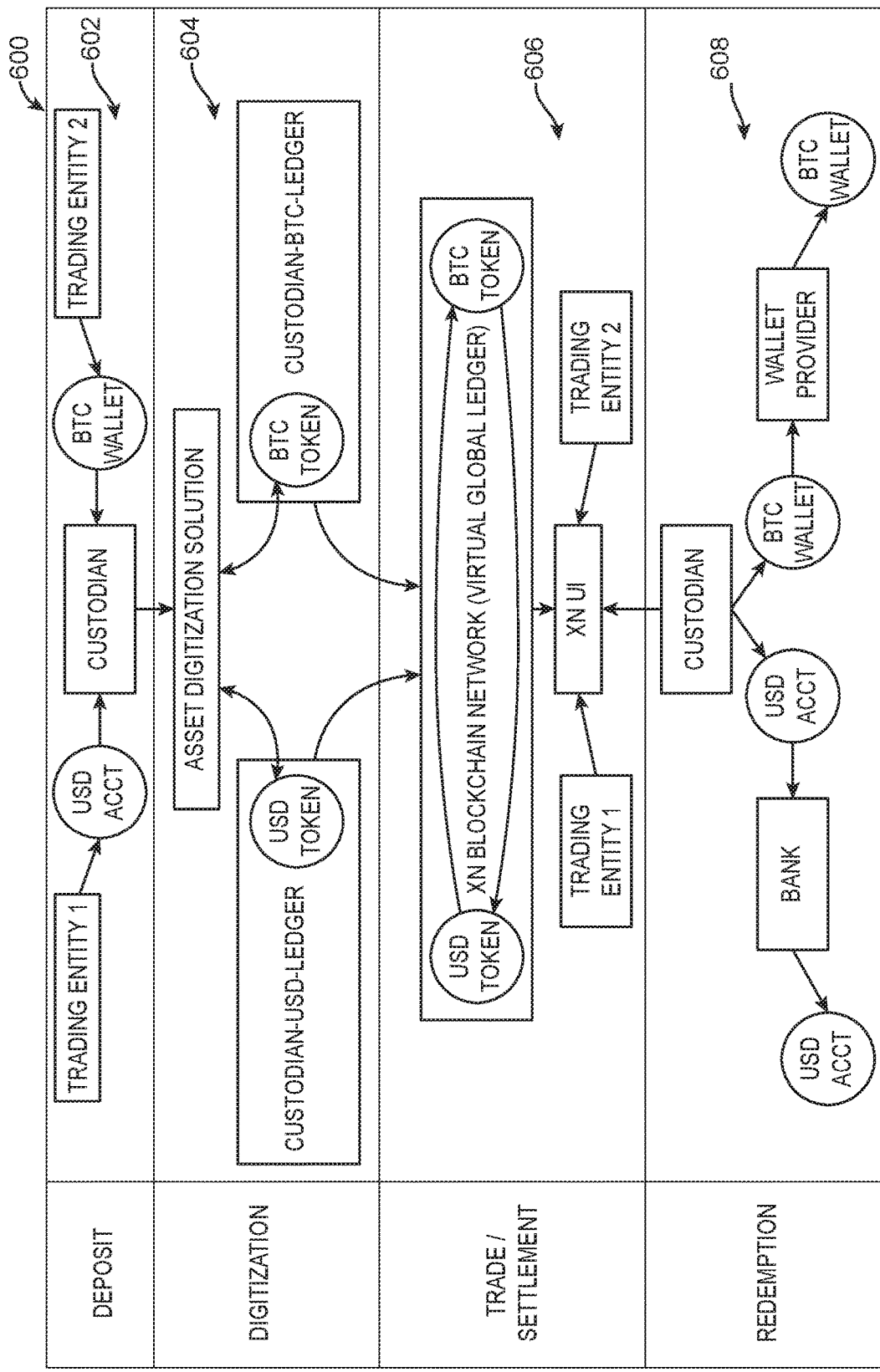
FIG. 6 illustrates a block diagram of an example overall structure, in accordance with some examples of the present disclosure.

FIG. 6 illustrates a block diagram of an example overall structure, in accordance with some examples of the present disclosure. While the configuration of FIG. 6 might give the impression that the blockchain network is a unified blockchain network for each asset class, this disclosure contemplates both a unified blockchain network as well as the use of multiple blockchain networks for the same asset class. The overall network 600 has a number of different components. In the deposit phase 602, trading entity 1 places US dollars with the custodian and trading entity 2 can place bitcoin with the custodian. The custodian can represent in this scenario two custodians in which one custodian manages fiat currency and a separate custodian manages cryptocurrencies. The custodian could also be holding any other asset of value, such as real estate, contracts, and so forth.

In the digitization phase 604, the custodian issues a digital representation of assets, such as a token, backed 1:1 by the held fiat currency and cryptocurrency onto an exchange network on ledgers that the custodian owns and controls within the solution provided by the exchange network. The token that is issued in one aspect, is not a cryptocurrency token per se. In one aspect, the token is data that utilizes encryption algorithms to secure them from theft or tampering. The data can be an asset, an ownership right or characterized in any other way.

In the trade and settlement components 606 of the network, trading entity 1 and trading entity 2 use a trading network provided user interface to agree on a price and enter into a trade of fiat currency for cryptocurrency. Again, the trade could be for any asset or anything of value and is not limited to dollars and bitcoin or any particular cryptocurrency or token. The approach could also be used for payments from one entity to another. The trading network performs an atomic exchange (e.g., a concurrent transaction) of US dollar tokens for bitcoin tokens at the agreed price and the trade is complete. Changes to token ownership are recorded on the respective custodian ledgers automatically. Numerous trades can occur, and those trades are tracked on each respective custodian ledger. One of the benefits of this approach is that trades by trading entity 1, trading entity 2, or any other participants can be performed rapidly with no requirement to move fiat currency, or cryptocurrencies. In other words, the trade and settlement process can occur on the created ledgers without actually needing to move the actual currencies or other assets. This can dramatically speed up the process of trading and settlement finality, reduce the burden on the network and compute resources and reduce cost and risk. These technical improvements address the issues outlined above with the current market infrastructure. Another technical improvement includes a method of scaling the underlying public blockchain networks and other non-blockchain network transactions like SWIFT.

At some point, the trading entity desires to redeem their assets. The redemption phase 608 involves the actual movement of the fiat currency, or the cryptocurrency, between accounts or wallets at the custodian or other bank account or wallet upon a redemption request by the owner of the tokens. The movement of the settlement amount by the custodian can be integrated into custodian systems, and automated such that the trading entities can receive the respective type of currency that they purchased on the exchange ultimately, at their own fiat currency, account or cryptocurrency wallet.

Several benefits of this approach for custodians include the ability to work with clients in fiat and/or cryptocurrencies, but that the custodian does not have a requirement to handle both types of assets in a trade. Because the exchange network can communicate with the custodian via APIs or a user interface, no technology integration is required at the custodian network. The approach can leverage a custodian's preferred crypto wallet provider and their existing ledger structure, e.g., a traditional bank account ledger software system. Further, given the configuration of the network, this solution can fit within the current standard custodial workflow, and thus easily be implemented. One or more general conditions can be implemented to make the process work. For example, the ability to place and administer a hold on funds and or cryptocurrencies can provide the ability of the digitization and trade and settlement process to work. A custodian can also have the ability to run AML/KYC reports on their clients to confirm credibility. Furthermore, a custodian can have the ability to manage large deposits and withdrawals and have an authorized representative periodically process additions and redemption requests such that they are visible in a provided web-based interface.

In the network structure outlined here, the custodian does not have to provide credit to the client. The custodian is only acting as the issuer and redeemer of the digital representation of the underlying claim assets. The custodian also in the scenario does not have to get involved in the clearing and settlement process. The exchange network software manages a riskless peer-to-peer trade between the counterparties and submits transactions to the custodial ledger for validation and recordation which essentially makes the transactions self-clearing and settling. Another example benefit is trading from cold storage or other secure storage without moving the underlying assets. Such an approach can lower costs, blockchain network congestion and operational risk. Further, the custodian does not have a financial obligation to the exchange network. The exchange network pays a new revenue stream to the custodian based on the transactions and volume that can include the use of atomic swaps and cross custodian net settlement.

Figure 7:
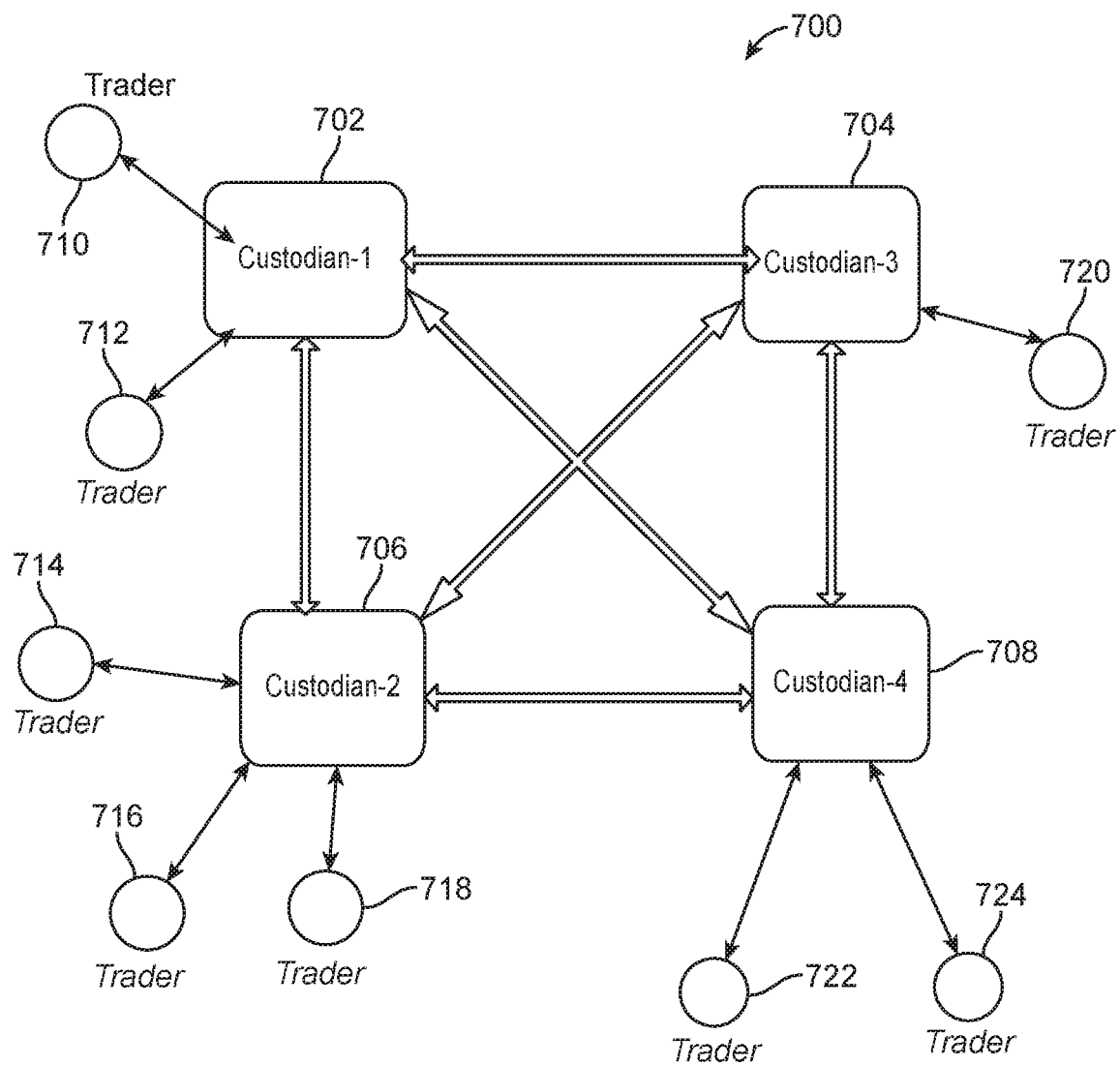
FIG. 7 illustrates a trading network and communications between custodians and traders, in accordance with some examples of the present disclosure.

FIG. 7 illustrates an example trading network 700 and communication channels between custodians and traders. In this example, various custodians 702, 704, 706, 708 are shown with communication channels existing between each respective custodian. Traders 710, 712 are registered with and communicate trades with custodian 702. A trader 720 communicates with custodian 704. Traders 714, 716, 718 communicate with the custodian 706. Traders 722, 724 communicate with custodian 708. While each of the traders may be registered with and have an interface or access to a respective custodian, the principles disclosed herein enable traders to trade with each other across different custodians, with the ability to settle those trades easily.

Figure 8:
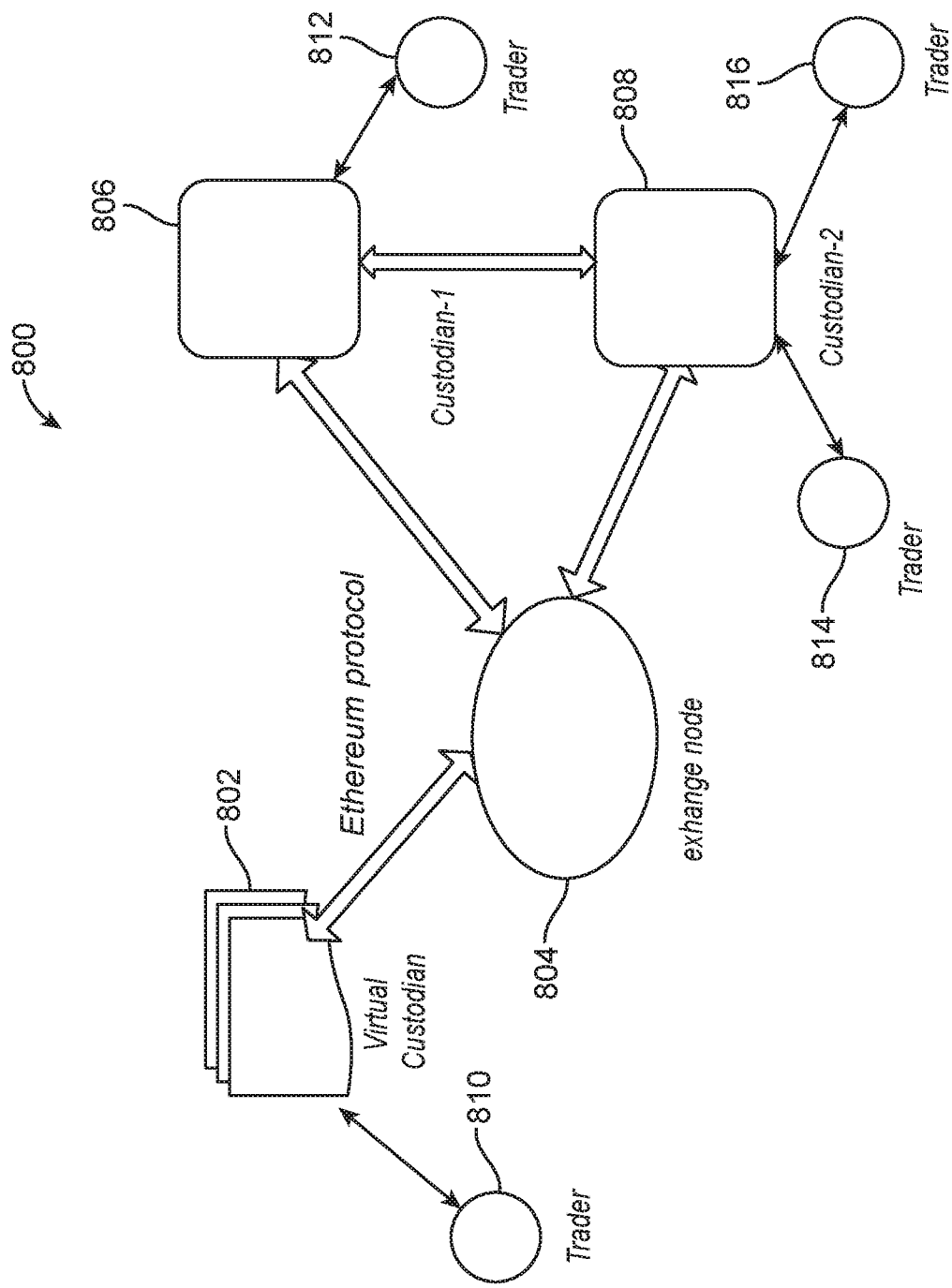
FIG. 8 illustrates a virtual custodian on a blockchain network, in accordance with some examples of the present disclosure.
Figure 14:
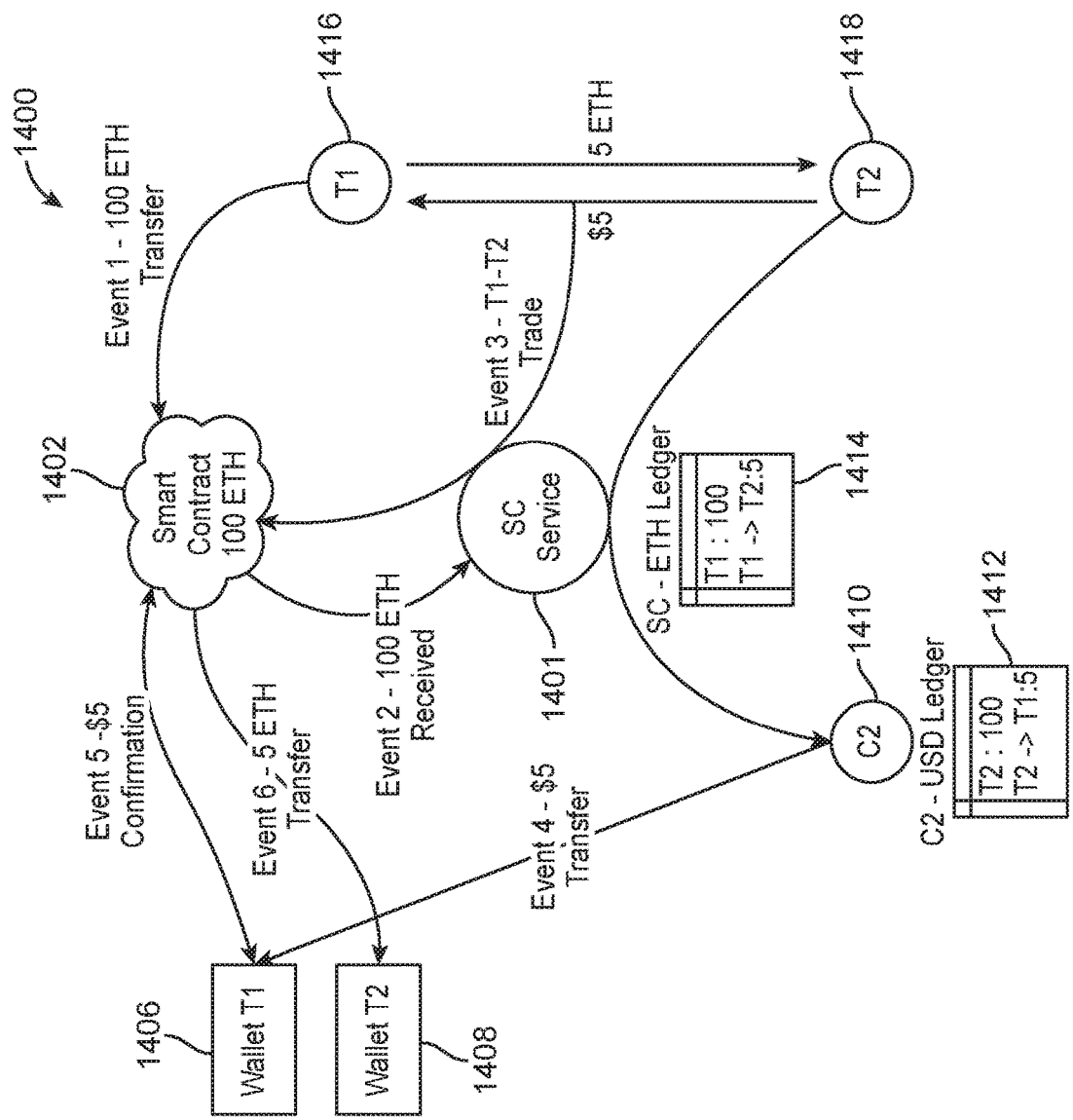
FIG. 14 illustrates a trading flow associated with a blockchain-based trading platform.

FIG. 8 illustrates a virtual custodian on a blockchain network, in accordance with some examples of the present disclosure. FIG. 8 includes an environment 800 having a virtual custodian 802 on a blockchain, such as the Ethereum Blockchain, as a nonlimiting example. The blockchain can be a public blockchain or a private blockchain. A trader 810 is registered with and has access to the virtual custodian 802. The virtual custodian 802 is able to communicate with an exchange node 804 via a syntax or a protocol associated with the blockchain network associated with the virtual custodian 802. Communication also occurs between the exchange node 804 and a custodian 806, with its trader 812. A custodian 808 also communicates with the custodian 806 as well as with the exchange node 804 and has its respective traders 814, 816. FIG. 14 and its associated description show an example anatomy of an example virtual custodian, such as virtual custodian 802. In one aspect, fiat-to-cryptocurrency or crypto-currency-to-fiat settlement could be enabled with a virtual custodian. This could be performed via a single virtual custodian and a brick and mortar custodian or multiple virtual custodians.

Figure 9:
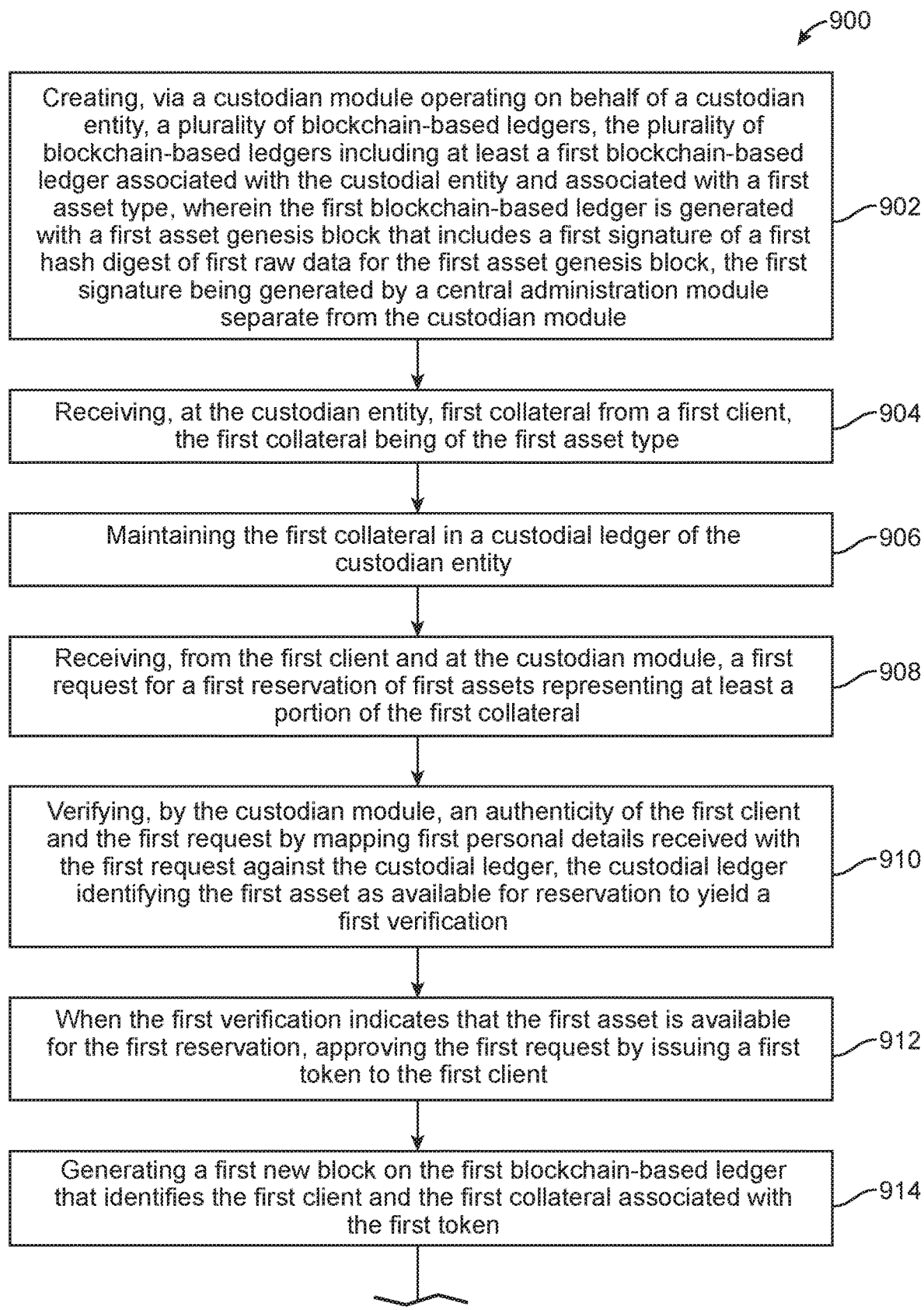
FIG. 9 illustrates an exemplary method for facilitating asset transfers in accordance with the present disclosure.
Figure 9:
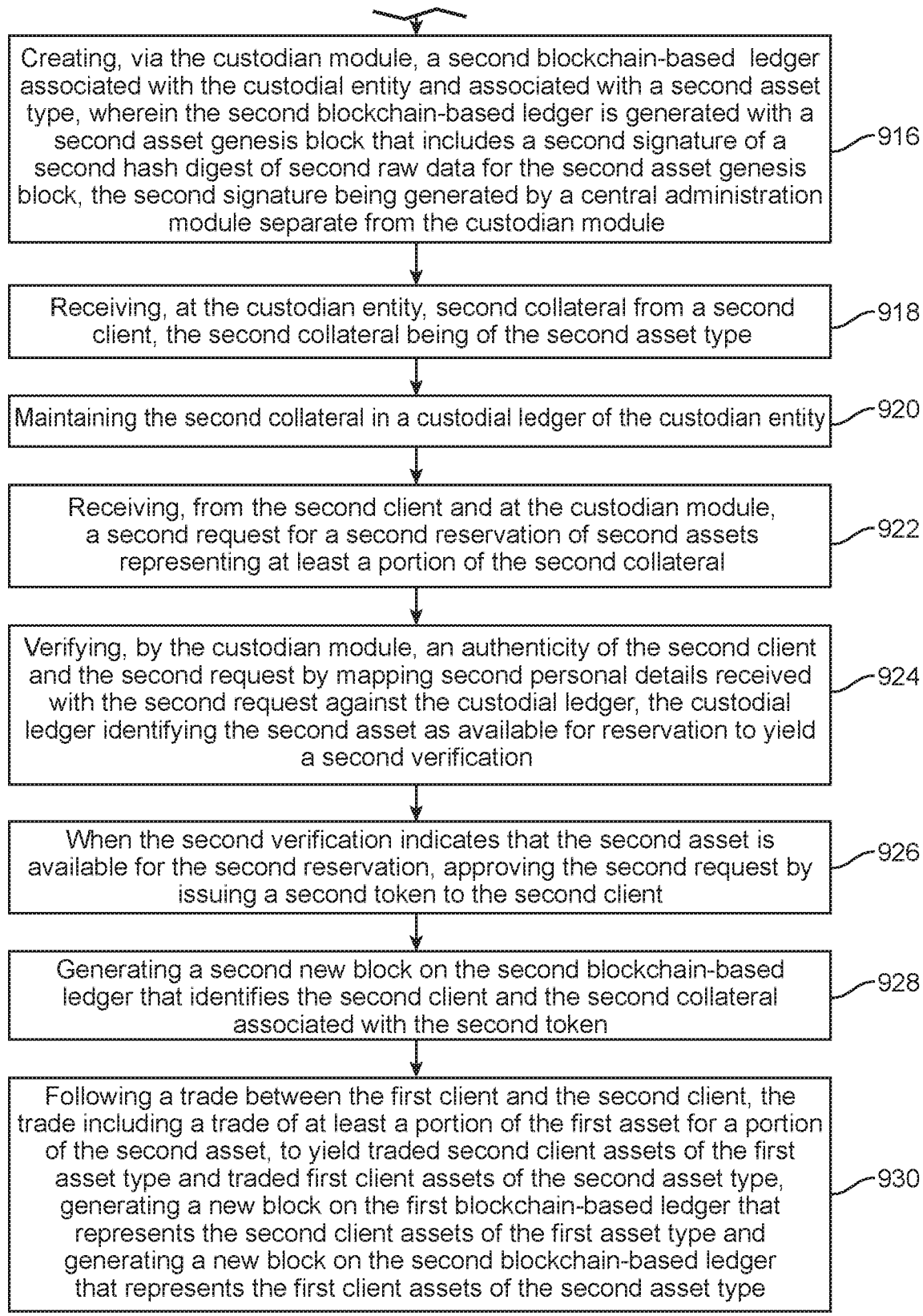

FIG. 9 illustrates an example method 900 of facilitating asset transfers. The example method 900 can include creating, via a custodian module operating on behalf of a custodian entity, a plurality of blockchain-based ledgers, the plurality of blockchain-based ledgers including at least a first blockchain-based ledger associated with the custodial entity and associated with a first asset type, wherein the first blockchain-based ledger is generated with a first asset genesis block that includes a first signature of a first hash digest of first raw data for the first asset genesis block, the first signature being generated by a central administration module (or other type of decentralized governance node) separate from the custodian module (902). Next, the process of FIG. 9 can include receiving, at the custodian entity, first collateral from a first client, the first collateral being of the first asset type (904); maintaining the first collateral in a custodial ledger of the custodian entity (906); receiving, from the first client and at the custodian module, a first request for a first reservation of first assets representing at least a portion of the first collateral (908); and verifying, by the custodian module, an authenticity of the first client and the first request by mapping first personal details received with the first request against the custodial ledger, the custodial ledger identifying the first asset as available for reservation to yield a first verification (910).

When the first verification (e.g., step 910) indicates that the first asset is available for the first reservation, the method 900 can include approving the first request by issuing a first token to the first client (912) and generating a first new block on the first blockchain-based ledger that identifies the first client and the first collateral associated with the first token (914).

The method 900 further includes creating, via the custodian module, a second blockchain-based ledger associated with the custodial entity and associated with a second asset type, wherein the second blockchain-based ledger is generated with a second asset genesis block that includes a second signature of a second hash digest of second raw data for the second asset genesis block, the second signature being generated by a central administration module separate from the custodian module (916). Next, the method of FIG. 9 can include receiving, at the custodian entity, second collateral from a second client, the second collateral being of the second asset type (918); maintaining the second collateral in a custodial ledger of the custodian entity (920); receiving, from the second client and at the custodian module, a second request for a second reservation of second assets representing at least a portion of the second collateral (922); and verifying, by the custodian module, an authenticity of the second client and the second request by mapping second personal details received with the second request against the custodial ledger, the custodial ledger identifying the second asset as available for reservation to yield a second verification (924).

When the second verification (e.g., step 924) indicates that the second asset is available for the second reservation, the method 900 includes approving the second request by issuing a second token to the second client (926) and generating a second new block on the second blockchain-based ledger that identifies the second client and the second collateral associated with the second token (928). Following a trade between the first client and the second client, the trade including a trade of at least a portion of the first asset for a portion of the second asset, to yield traded second client assets of the first asset type and traded first client assets of the second asset type, the method 900 can include generating a new block on the first blockchain-based ledger that represents the second client assets of the first asset type and generating a new block on the second blockchain-based ledger that represents the first client assets of the second asset type (930). The asset ownership change could also be a one-time or one-way payment versus a trade. These new blocks are different blocks each on their respective ledger.

An optional feature is to couple this process with an order entry system, credit check, and matching engine as disclosed herein. Without these (for handling order entry and trade execution), the system can get trade execution messages from any source (even for payments or trades ordered or agreed outside the network) and still perform the atomic swap on the client assets.

Generating a new block can also mean creating one or more transactions that will go into the blocks. In another aspect, generating the different blocks on the different ledgers can include to blockchain entries on two different blockchain ledgers being done atomically as disclosed herein.

A trade match can mean a number of different things. For example, it can be a payment transaction or repo or repossession transaction that is really a trade. Any transaction type including one-way payment between any two addresses can be a "trade".

Without these (for handling order entry and trade execution), the system could get trade execution messages and do the atomic swap on the client assets.

Following a redemption request received at the custodial entity from the second client to redeem the second token, the method 900 can include burning the second token and transferring the second client assets of the first asset type from the custodial ledger to the second client.

Following a redemption request received at the custodial entity from the first client to redeem the first token, the method 900 can include burning the first token and transferring the first client assets of the second asset type from the custodial ledger to the first client. The first asset genesis block can further include redemption conditions for the first client to redeem the first collateral. The redemption conditions can include at least one or more of a name, an address, an email address, a phone number, biometric data, and social media data. The first asset genesis block can further include an identification of the custodian entity and an identification of the first asset type. The first asset type can include a fiat currency and the second asset type can include a cryptocurrency. The asset types can also include any kind of asset as well. The first blockchain ledger can include a first ledger for a first asset type and the second ledger for a second asset type.

The first ledger and the second ledger can each be separate from the custodian module and can be generated with the first asset genesis block and the second asset genesis block, respectively, that includes a respective signature associated with the custodian module that attests to its validity on a network. The first ledger and the second ledger can each reside on a blockchain network or on different blockchain networks. Issuing the first token to the first client can mirror actions on the custodial ledger.

In one aspect, the first ledger and the second ledger can be part of the custodial module rather than separate from the custodial module.

In one aspect, burning the second client assets of the first asset type from the first blockchain-based ledger can include transferring the second token to a burn wallet. Burning the first client assets of the second asset type from the second blockchain-based ledger can also include transferring the first token to a burn wallet. Generally, a cryptocurrency wallet can be a device, physical medium, program or a service which stores the public and/or private keys for use in achieving transactions. In addition to this basic function of storing the keys, wallets can also offer the functionality of encrypting and/or signing information. In one example, signing can result in executing a smart contract, a cryptocurrency transaction, identification or legally signing a 'document', confirming a payment or authorizing a trade.

The redemption request received at the custodial entity from the second client to redeem the second token can include encrypted metadata utilized a custodian redemption public key as indicated in the second asset genesis block. The redemption request received at the custodial entity from the first client to redeem the first token can also include encrypted metadata utilized a custodian redemption public key as indicated in the first asset genesis block.

In one aspect, the method 900 further includes providing one or more of a web-based user interface to access functions performed by the custodian module and/or an application programming interface to access functions performed by the custodian module. Burning the second token can also occur after required due diligence by the custodian entity by reassigning ownership of the second token to a burn account. Further, burning the first token can occur by performing an operation, after required due diligence by the custodian entity, of reassigning ownership of the first token to a burn account.

Figure 10:
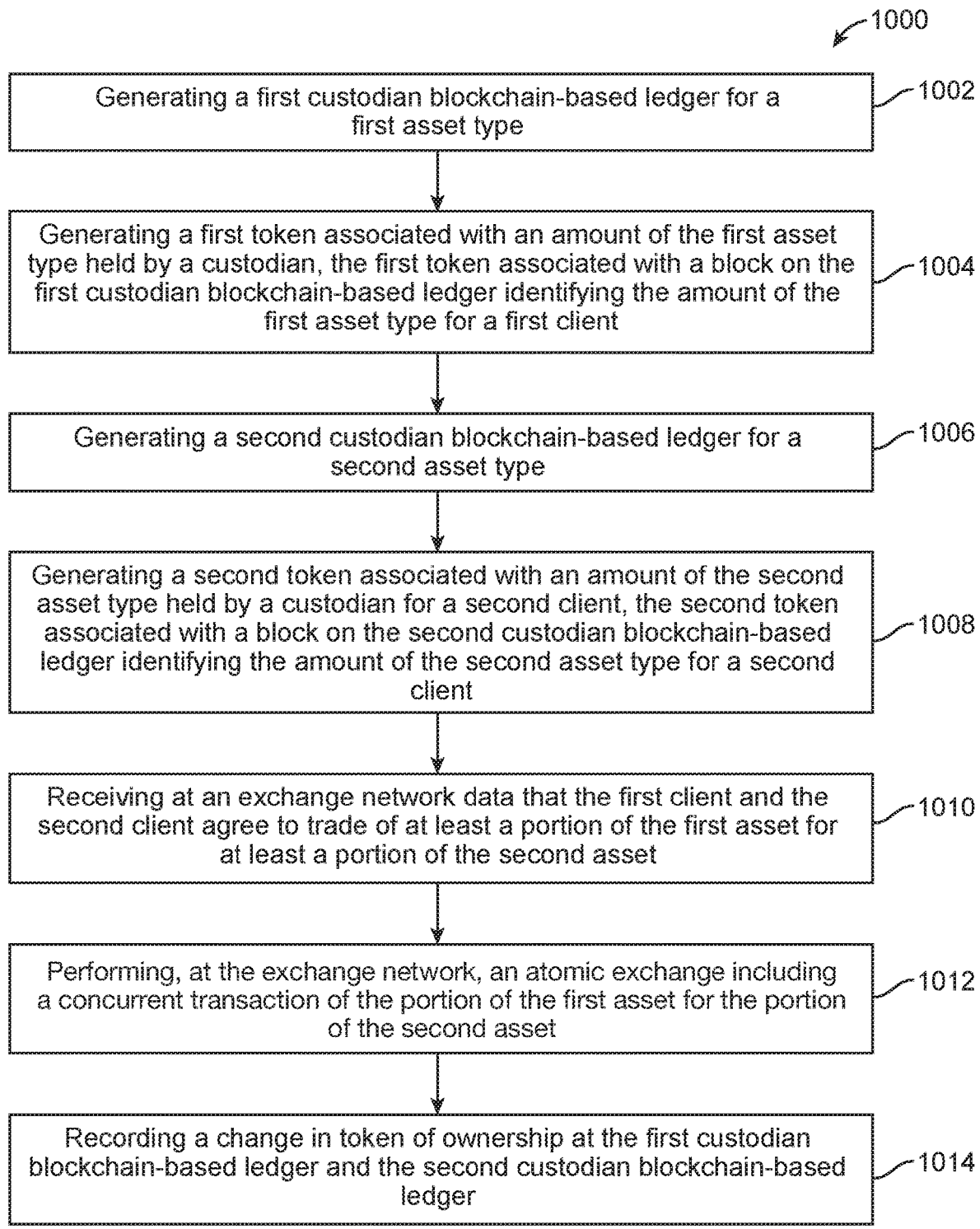
FIG. 10 illustrates another method in accordance with some examples of the present disclosure.

FIG. 10 illustrates another method 1000 example of this disclosure. The method 1000 includes one or more steps including generating a first custodian blockchain-based ledger for a first asset type (1002); generating a first token associated with an amount of the first asset type held by a custodian, the first token associated with a block on the first custodian blockchain-based ledger identifying the amount of the first asset type for a first client (1004); generating a second custodian blockchain-based ledger for a second asset type (1006); generating a second token associated with an amount of the second asset type held by a custodian for a second client, the second token associated with a block on the second custodian blockchain-based ledger identifying the amount of the second asset type for a second client (1008); receiving at an exchange network data that the first client and the second client agree to trade of at least a portion of the first asset for at least a portion of the second asset (1010); performing, at the exchange network, an atomic exchange including a current transaction of the portion of the first asset for the portion of the second asset (1012); and recording a change in a token of ownership at the first custodian blockchain-based ledger and the second custodian blockchain-based ledger (1014).

The method 1000 can further include a redemption process in which the first client (who now owns the second asset type) or the second client (who now owns the first asset type) can receive actual dollars or bitcoin, which can be moved from an account or wallet held by the custodian to the new owner after the trade. At the time of redemption, a respective token can be transferred to a burn account or burn wallet to update the respective ledger appropriately.

FIG. 3A illustrates the evolution of blocks on the respective blockchain ledgers. Assume for example that the first trader 304 deposited $100K with the custodian 302 in a custodial account. Each blockchain-based ledger 310/312 has a genesis block that is signed by the exchange network 314 that validates the ledger and confirms the data within the ledger that can be used for trades on the exchange network 314. The custodial ledger 308 can record this transaction and a custodial account for US dollars to hold the money. Assume the second trader deposited ten bitcoin within a wallet account at the custodian 302. Upon approval of an issuance request the custodial ledger 308 would also record this transaction. The first blockchain-based ledger 310, created for the asset type of US dollars, includes a block 318 that identifies that the first trader has $100 k deposited with the custodian 302. A token can be issued to the first trader that is associated with this block in the blockchain 310. The token is not a cryptocurrency token in one aspect but is a representation of the digitization of that asset or a representation of data and ownership rights to an asset. Similarly, the second trader 306 is shown to have ten bitcoins held by the custodian 302 at block 324 on the ledger. The second trader 306 also is issued a token associated with block 324 in the blockchain-based ledger 312.

Assume that the second trader 306 then sells 1 bitcoin to the first trader 304 on the exchange network 314 for $10K. Following the trade, the US dollar ledger 310 now includes a block 320 that records the transaction that the second trader 304 now has $10K after it sold 1 bitcoin. The blockchain-based ledger 312 associated with the bitcoin asset type also records a block 326 that shows that the first trader 304 now has one bitcoin. This exchange and recordation of the trade can be an atomic exchange which represents a concurrent transaction of US dollar related tokens for bitcoin related tokens at the agreed-upon price and that the trade is complete. This approach can also be integrated into concepts like pre-trade risk that reads ledger transaction balances, for example, UTXO sets (the amount of digital currency remaining in one or more addresses after a cryptocurrency transaction) or the like. The changes to token ownership are recorded in the respective custodian ledgers automatically. Multiple exchanges could take place in a more efficient and immediate approach in the exchange network 314 because there is no requirement as part of the actual exchange to move US dollars or bitcoin. The exchange is performed by tokens and managed on the blockchain-based ledgers 310/312. Upon a redemption request, the exchange network can make appropriate modifications to a respective ledger and inform the custodian 302 to move the actual dollars or bitcoin to the appropriate client accounts 304/306.

The communication between the components within the network that perform the asset digitization process, the trade settlement process, and the creation and use of the ledgers, can be accomplished through the use of user interfaces, APIs or any other protocol. In other words, no new computer component may need to be implemented at the computer network operated by a custodian entity.

The functions disclosed herein can be combined into a single entity, such as an exchange network that also manages the blockchain-based ledgers on behalf of custodians. In another scenario, the custodian might receive a "custodian module" that can include the necessary programming for the custodian to be able to create the respective blockchain-based ledgers, have those ledgers include a genesis block that is signed by the exchange network, and then enable the appropriate communication between the exchange network and the ledgers to carry out the atomic trades and manage the redemption process. All communications, such as API calls, secure communications, requests for information, responses to requests, network security, encryption of data, decryption of data and so forth, are considered to be included within the scope of this application where different entities need to perform respective functions to carry out the overall process described herein with respect to the creation and use of the blockchain-based ledgers. Example embodiments can include claims directed to any component or module described herein and the functions performed from the standpoint of that component. For example, an atomic exchange smart contract can be one example embodiment which could be a separate invention and which could be described in terms of the functionality is performs relative to the other components in the overall system.

Aspects of this disclosure can be claimed or described entirely from the standpoint of an exchange network that is created with the functionality of being able to sign genesis blocks for blockchain-based ledgers that are created for use by a custodian entity. Other claims can be focused entirely on the functionality of this process from the standpoint of the custodian entity that receives actual fiat currency or cryptocurrency held in a custodial relationship to clients, but enables the creation of the blockchain-based ledgers in the manner disclosed herein for the purpose of enabling their clients to trade on the exchange network and then distribute actual dollars or cryptocurrencies, held in custody based on the result of those trades and upon the redemption request.

Other aspects could be also claimed from the standpoint of client devices. This disclosure can apply to a client device that may include a software module distributed to it which provides a user interface, enables security or encryption processes, enables communication to and from a cryptocurrency wallet, enables secure communication with a bank associated with the respective client, and/or provides functionality for the client to access the exchange network and make trades after depositing an asset of value with a custodian entity. Thus, any of the functionality that is disclosed herein that would include any communication to or from a client device that accesses via a user interface, the exchange network, is included within the scope of this disclosure. Again, this is particularly true if downloaded software were included on the client device that would enable the client to access the services and capabilities of the disclosed computer system.

Figure 11:
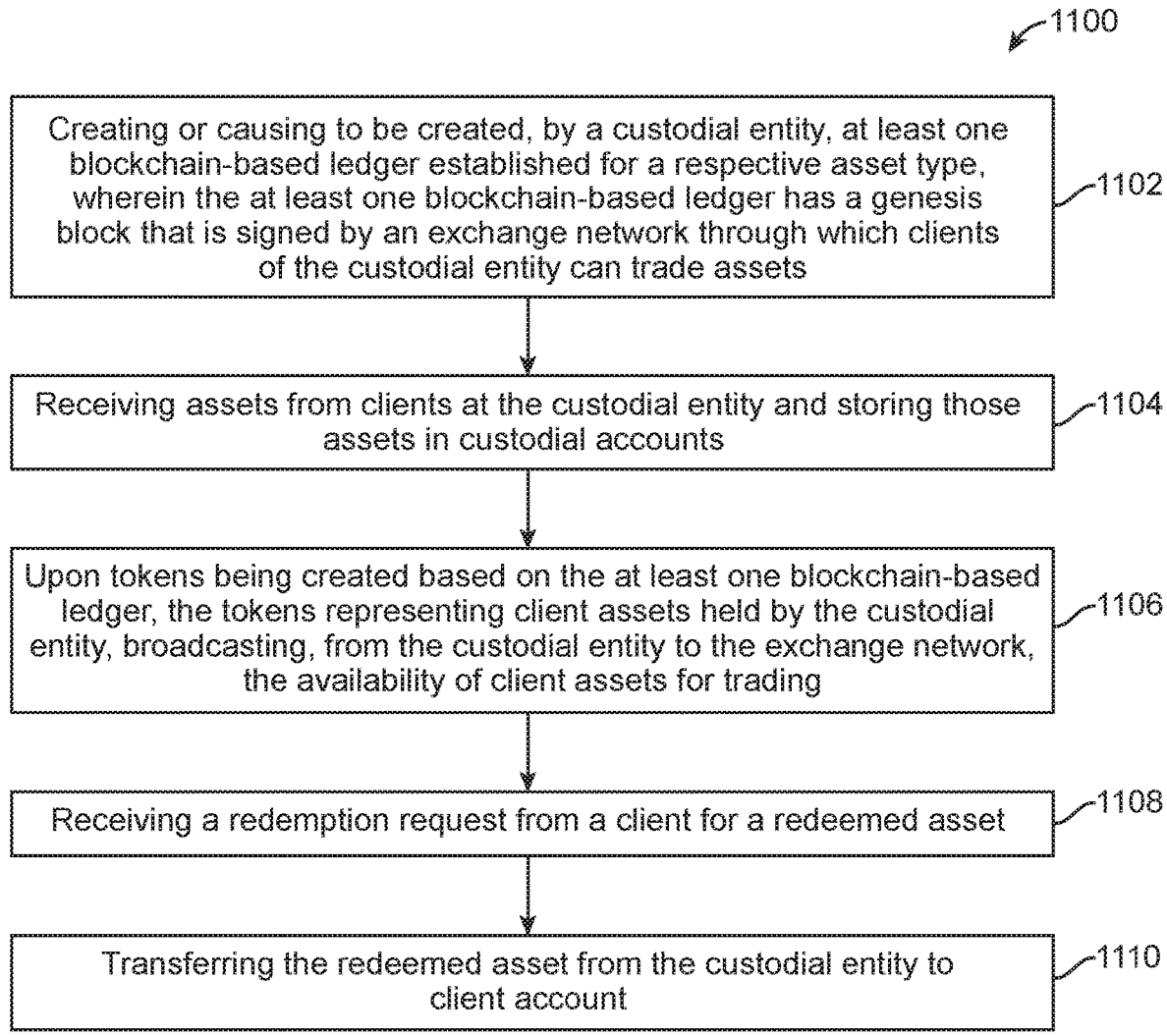
FIG. 11 illustrates an exemplary method consistent with the present disclosure from the standpoint of a custodial entity.

FIG. 11 illustrates an example method 1100 from the standpoint of the custodial entity. The method 1100 includes creating or causing to be created, by a custodial entity, at least one blockchain-based ledger established for a respective asset type, wherein the at least one blockchain-based ledger has a genesis block that is signed by an exchange network through which clients of the custodial entity can trade assets (1102). The method of FIG. 11 can also include receiving assets from clients at the custodial entity and storing those assets in custodial accounts (1104); upon tokens being created based on the at least one blockchain-based ledger, the tokens representing client assets held by the custodial entity, broadcasting, from the custodial entity to the exchange network, the availability of client assets for trading (1106); receiving a redemption request from a client for a redeemed asset (1108); and transferring the redeemed asset from the custodial entity to client account (1110).

Other aspects that can be addressed by the framework disclosed herein can include the programmatic reservation and release of collateral with a banking backend ledger system. Through the use of communication means or APIs, a banking backend ledger system can also be utilized to reserve collateral and/or release collateral in a similar manner, utilizing blockchain-based ledger systems as disclosed herein. In a scenario where several custodians are involved in a trade, such as where first custodian stores assets of the first trader and a second custodian stores assets of a second trader, payments and settlement between custodian nodes can be possible. This can occur through a redemption and re-issuance process such that a respective custodian has tokens redeemable by the original issuing custodian and the client that transferred assets from the other custodian now has a token issued by its own custodian. In other words, as per the redemption process, tokens that represent redeemed assets or assets that are in the process of being redeemed can be exchanged between different custodians. Upon receiving a particular token, that token can indicate to a custodian that the physical asset associated with that token should be distributed to the identified client. Such data can be incorporated into the token itself.

In another aspect, where multiple trades occur and where multiple custodians represent multiple clients in those trades, a batch settlement mechanism or net settlement mechanism could occur to more efficiently handle a number of different transactions. Given the fungibility of fiat currency and/or cryptocurrencies or other asset types, custodians could trade tokens issued by each other and settle later on a net settlement basis over traditional payment rails. In this manner, additional separate ledgers, whether blockchain-based or not, could account for the exchange of tokens which represent trades performed and recorded on the respective blockchain-based ledgers. After a certain period of time or based on some other triggering mechanism, a net settlement could occur over traditional payment rails such that only the net amount of actual assets, such as dollars or bitcoin, within have to be transferred from one custodian to another. Thus, the approaches described herein could include a set period of time in which a first custodian and a second custodian only need to exchange tokens associated with trades on the exchange network. At the end of a predetermined period of time, such as every night, or every week, or upon demand, a net settlement process can occur such that rather than multiple exchanges of actual currencies occurring. The system only need to perform a single transfer of dollars as a net settlement amount or a single transfer of bitcoin is a net settlement amount. This can be a beneficial process inasmuch as each transfer can cost money in order to effectuate the actual transfer of the asset.

In another example, requirements may be in place, such that once the net settlement amount reaches a certain threshold, such as $100 M or 500 BTC, the net settlement process is initiated. Thus, in some examples, the net settlement process can be automatically triggered by one or more specific events and/or conditions.

In yet another scenario, where multiple custodians utilize the exchange network for respective clients, a shared AML/KYC check for custodian movements of funds to clients they have no direct relationship with could also be implemented. This AML/KYC check could be built into the tokens themselves such that a token received, could have an identification contained therein that an AML/KYC check has been successfully performed.

Figure 12:
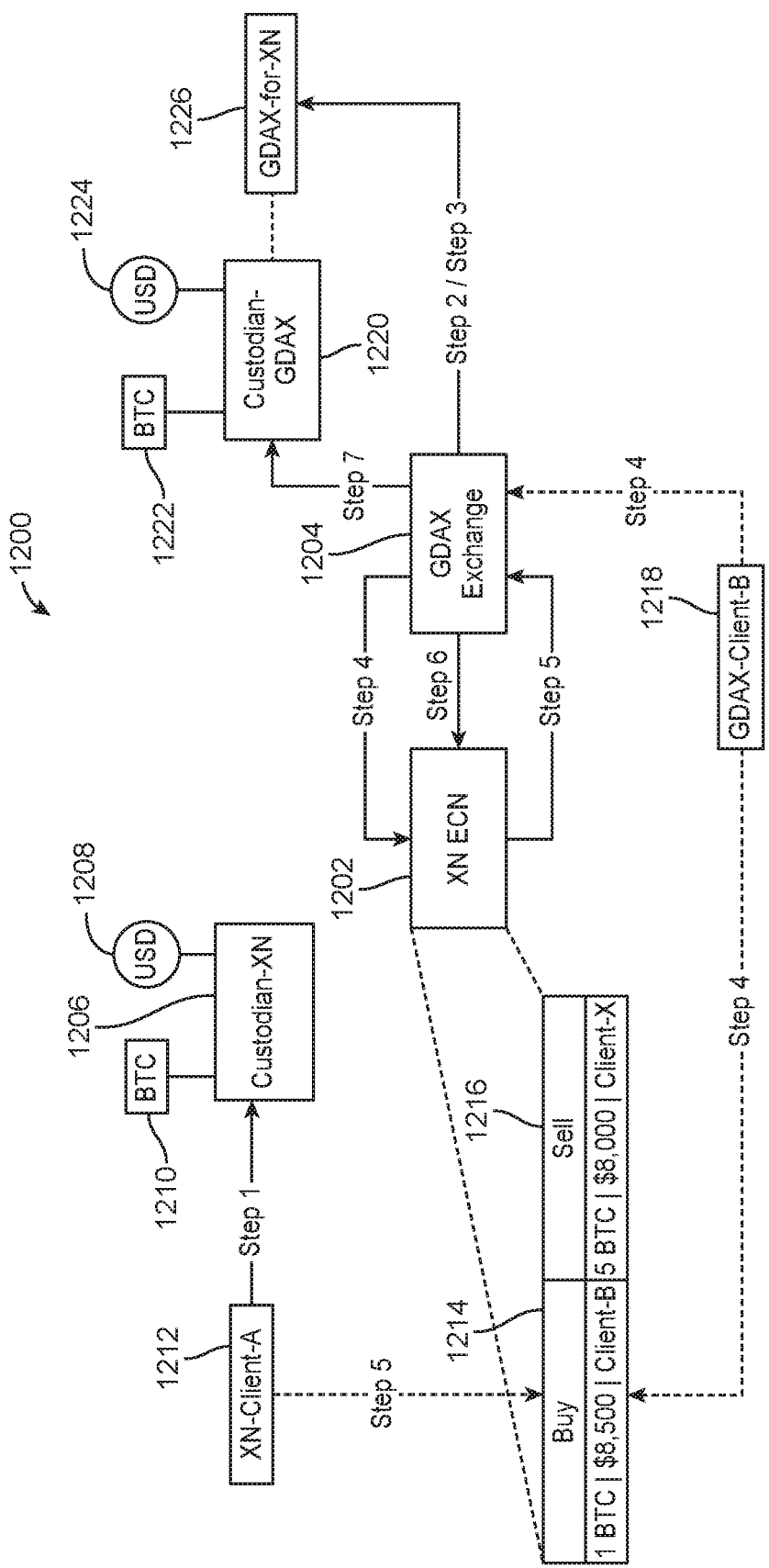
FIG. 12 illustrates an example asset issuance flow in a blockchain-based trading platform.

FIG. 12 illustrates an example asset issuance flow in a blockchain-based trading platform 1200. In step 1, a client A 1212 funds custodian accounts 1206 for dollars 1208 or bitcoin 1210 or any other asset. In step 2, GDAX exchange 1204 (which generally in this platform is a custodian and trading entity and will operate software for both types of members of the network (custodians and trading entities)) opens a GDAX-for-XN account 1226 at the custodian-GDAX 1220 with accounts for US dollars 1224 and bitcoin or other cryptocurrency 1222. In step 3, the GDAX exchange 1204 funds custodian-GDAX accounts for US dollars and/or bitcoin. In step 4, the exchange network (ECN) 1202 receives priced feeds (that includes sell information 1216) via FIX (the Financial Information eXchange protocol which is a global language for describing trade-related messages) from GDAX Exchange with quote IDs. An ECN is an electronic communication network that is a type of computerized forum or network that facilitates the trading of financial products outside traditional stock exchanges. In step 5, client A 1212 trades on the ECN price sourced from the GDAX Exchange 1204 with client B 1218 based on buy information 1214. The network 1202 routes the order to the GDAX Exchange 1204 for the GDAX-for-N account. The FIX protocol can provide a tag in the order such as the following: XN:Client ID.

In step 6, the GDAX Exchange 1204 sends back ACK/NAK signal on behalf of GDAX-Client-B (with associated Quote ID) and the trade is complete. The XN ECN's matching engine will perform an atomic exchange which will interact with the XN-Client-A and Custodian-XN systems as well as the GDAX-for-XN and custodian-GDAX systems to cover signing on behalf of XN-client-A 1212 and GDAX-Client-B 1218 and a transaction commit to the dollars and/or bitcoin ledgers of both the custodian-XN 1206 in the custodian-GDAX 1220.

Figure 13:
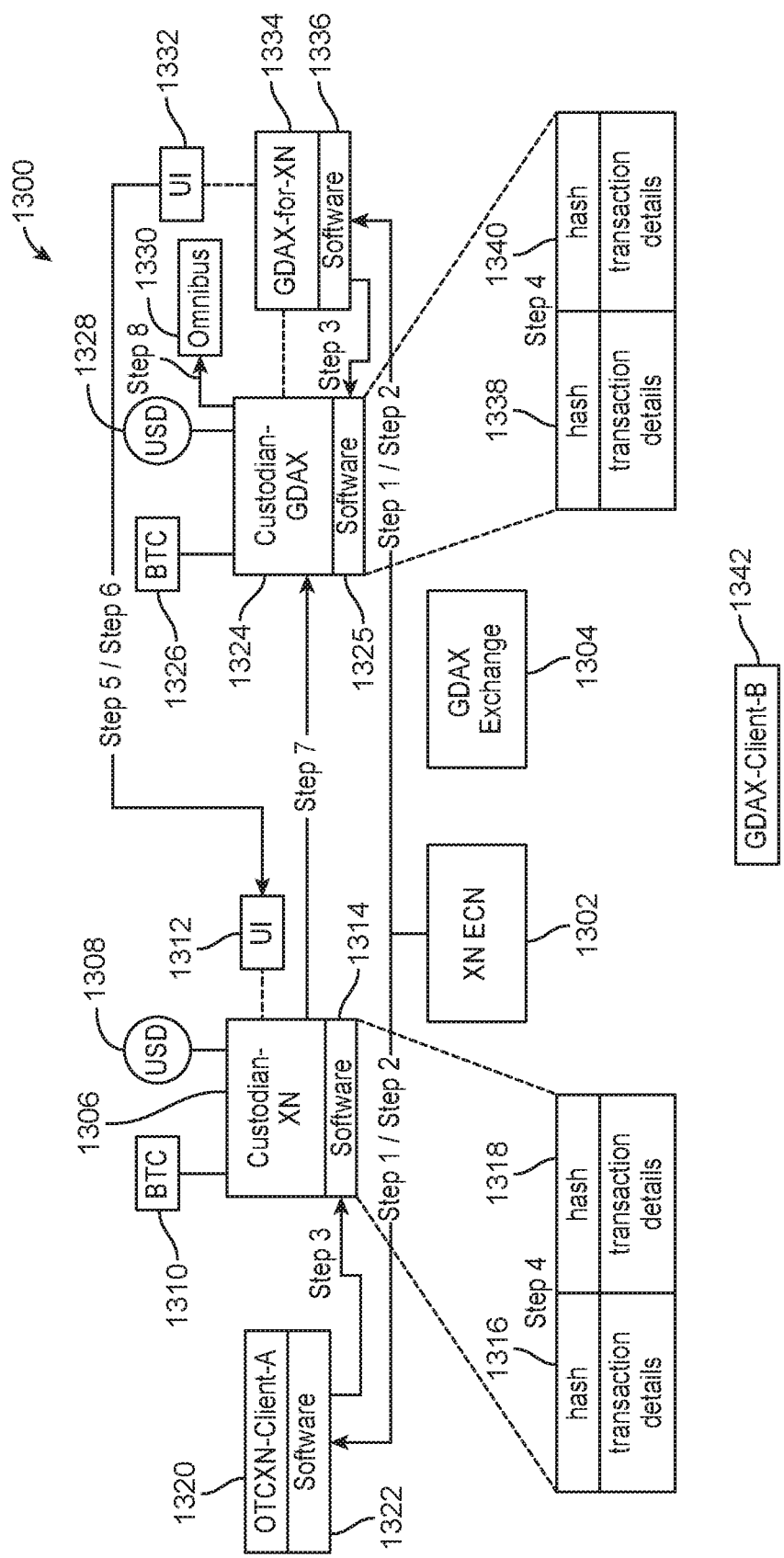
FIG. 13 illustrates an example asset redemption flow in a blockchain-based trading platform.

FIG. 13 illustrates an example asset redemption flow in a blockchain-based trading platform 1300. In this example, step 1 represents an XN-ECN 1302 matching engine performing an atomic exchange. Feature 1304 represents a GDAX Exchange. Concurrently, transactions for the match (the atomic exchange) are sent to XN-Client-A 1320 and GDAX-for-XN 1334 for signing. The transactions are automatically signed using software 1322, 1336 at each respective entity. Step 3 involves sending signed transactions to both the custodian-XN 1306 and the custodian-GDAX 1324.

Step 4 involves updating ledgers. In one example, custodians will own and operate their own ledgers for each asset tokenized. These ledgers are updated automatically with provable client signed transactions. The respective custodians can see their ledgers as well as all proofs and can independently verify all transactions and the existence of value on the ledgers pre- and post-transfer. Features 1316, 1318 represent a hash used in connection with updating the ledgers with transaction details for the custodian-XN 1306. Similarly, features 1338, 1340 represent a hash of transaction details for updating the custodian-GDAX 1324 ledger in connection with step 4. This can include updating software 1325 operating or controlling the custodian-GDAX 1324. The custodian-GDAX 1324 can be the custodian for bitcoin 1326, US Dollars 1328 or any other asset 1330.

Step 5 involves the GDAX-for-XN 1334 requesting through, in one example, a user interface 1332/1312, redemption for US dollars or bitcoin via a user interface (or some other interface) for balances at the custodian-XN 1306. Software 1314 operating in connection with the custodian-XN 1306 will perform these operations.

In step 6, the custodian-XN 1306 receives a request on the user interface and redeems tokenized US dollars and/or bitcoin. Step 7 involves the custodian-XN-1306 transferring assets to custodian-GDAX 1324. Finally, step 8 involves the custodian-GDAX receiving assets back into a main omnibus account.

FIG. 14 illustrates a trading flow associated with a blockchain-based trading platform 1400. In this example, a first trader T1 1416 wants to trade a cryptocurrency to a second trader T2 1418 in exchange for dollars. In a first event, T1 transfers 100 ETH (by way of example) to a smart contract 1402. In a second event, the smart contract transfers the 100 ETH to a smart contract server 1401. A smart contract ledger records that trader T1 has 100 ETH in the smart contract. In a third event, trader T1 1416 trades 5 ETH to trader T2 1418 in exchange for $5. Data regarding this trade is reported to the smart contract 1402. Traders T1 and T2 might utilize the smart contract server 1401 to perform the trade. As part of event 3, data is provided to a custodian C2 1410 associated with the second trader T2 1418 which causes a fourth event to transfer $5 from a USD ledger 1412 to a wallet of T1 1406. Ledger 1412 reflects the transfer from T2 to T1 of $5. A fifth event represents a confirmation from wallet T1 1406 of receipt of the $5 to the smart contract 1402. A final and sixth event represents a transfer of 5 ETH to wallet T2 1408. The ETH ledger 1414 shows the transfer from T1 to T2 of 5 ETH.

Figure 15A:
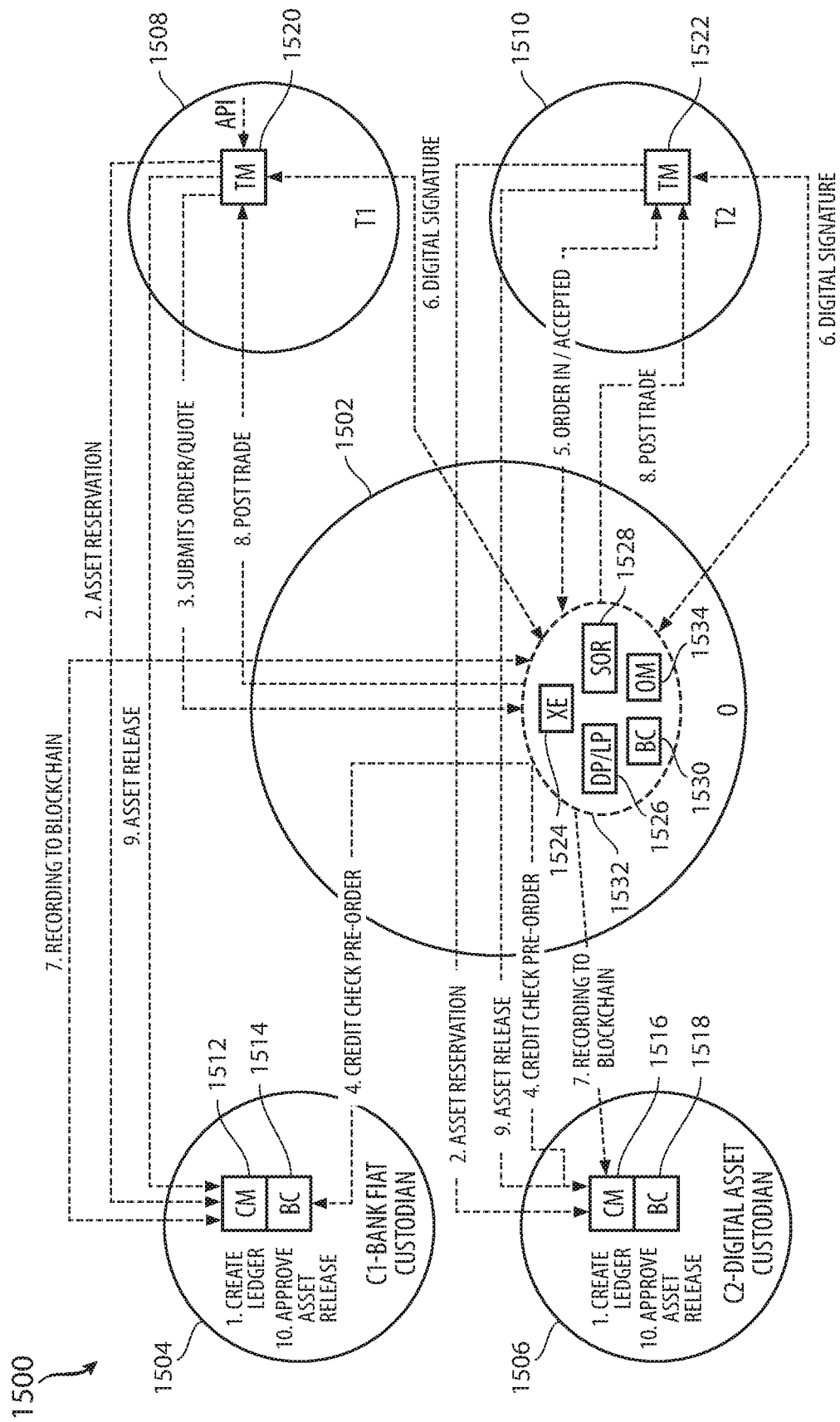
FIG. 15A illustrates an alternate flow diagram for the processes of issuance, trading and redemption.

FIG. 15A illustrates another example platform for providing custodial services. A new platform 1500 enables parties to a trade to directly face each other and trade assets without counterparty risk, as the assets being traded are collateralized by each participant's respective sponsoring firm that is also registered to use the platform. At a high level, the platform can include three main components: a core system or governance node 1502, a custodian module 1512, 1516, and trader module 1508, 1510. The custodian module 1512, 1516 can be hosted directly by a sponsoring firm 1504, 1506 and communicate with the core system 1502 through application programming interface ("API") calls. The custodian module can also be hosted by the same entity operating the core system, thus enabling the sponsoring firm to perform all applicable functions through a web portal accessed through a multi-factor authentication process.

In FIG. 15A, the following are the meaning of the acronyms: TM: trading entity module; CM: custodian module; XE: matching engine; BC: blockchain node; C1: bank fiat custodian; C2: digital asset custodian; T1: trading entity 1; T2: trading entity 2; DP/LP: Dark/Lit pool; SOR: smart order router; OM: order module.

The high-level summary of the flow can be as follows: In step 1, the custodian 1512, 1516 creates ledger on the blockchain 1514, 1518. Separate ledgers can be created for a custodian and currency pair. For example, C1-USD, C2-BTC, etc. In step 2, the trader 1508 through a trading entity module 1520 requests from a custodian module 1512 issuance of assets on the specific currency ledger. The custodian 1512 approves the issuance. In step 3, the trader 1508/trader module 1520 submits the order/quote/trade to the matching engine 1524 of the core system 1502. The matching engine 1524 can access dark pools and lit pools of data 1532 in making its matching decisions. In step 4, a pre-trade risk check can be performed on the blockchain 1514 to make sure assets exists on the blockchain. In step 5, the order is sent to TM1/TM2 1520/152 for acceptance by T1/T2 1508/1510. The order can then be accepted by T1/T2 1508/1510. A smart order router 1528 can be used to provide an automated process of handling orders. This can be accomplished through a signature using a private key. In step 6, the core system 1502/1532 sends a request to T1 and T2 1520/1522 for digital signature. In step 7, the system 1632 sends the trade to the respective custodial modules 1512/1516 to be recorded on the respective blockchains 1514/1518 atomically on the two ledgers involved. Data is written to three nodes: one on the C1 side 1504, one on the C2 side 1506 and other one on the exchange side 1532 using a two-phase commit protocol. On the exchange side 1532, the data can be written to a blockchain 1530. In step 8, the exchange 1532 provides an execution report message to T1 and T2 1520/1522. In step 9, an asset release request can be sent by T1, T2 1508/1510 to C1, C2 1504/1506. In step 10, the asset release is approved by the custodian 1504/1506.

In this illustration and example, it is assumed that T1 and T2 1508/1510 each have an account (custodial wallet) at their respective custodians C1-bank fiat custodian 1504 for custody of USD and C2-digital asset custodian 1506 for custody of BTC or other cryptocurrencies or digital assets. In the trade, it is assumed that T2 1510 bought BTC held at C2 1506 from T1 1508 with USD held at C1 1504 as the fiat custodian. After the trade, T1 1508 now owns BTC on the C2-BTC blockchain ledger 1518 and T2 1510 now owns USD on the C1-USD blockchain ledger 1514.

This disclosure now steps through the process summarized above in more detail, still with reference to FIG. 15A, although the specific step numbering will differ from what is shown in FIG. 15A. Step 1: Sponsoring firm C1-Fiat Bank Custodian ("C1") 1504 uses a custodian module 1512 user interface to create a blockchain ledger for each particular asset to be tokenized for use on the network 1500. For example, a USD ledger and a separate unique EUR ledger can be created if USD and EUR are two supported assets. Each blockchain ledger 1514 is part of the custodian module 1512 and is controlled and operated by C1 1504 and not by the entity operating the exchange 1502. After a ledger is created, participants may then make requests to issue assets held by the custodian onto the respective ledgers for use on the network 1600, as described in the following steps.

Step 2.1: Trader 1 (T1) 1508 requests that its sponsoring firm (C1) to reserve an amount of assets on deposit with C1 1504 for use on the network 1502. That request is initiated by T1 1508 using the trader module 1520 user interface and is routed through the network 1502 and received and viewable on the custodian module user interface attributable to C1 1504. Step 2.2: After internal verification of the availability of assets of T1 1508, C1 1504 reserves the requested amount of assets in its systems, e.g., by placing an administrative hold on the specified amount of assets. C1 1504 uses the custodian module 1512 user interface to issue the applicable number of tokens onto the blockchain ledger 1514 on behalf of T1 1508. Tokens can be issued at a ratio of 1:1, one token for each unit of a US dollar, or any other asset. Upon issuance, the value of the issued tokens will be displayed to T1 1508. The issuance is recorded in the private ledger 1514 attributable to the issuing Sponsoring Firm (C1) 1504.

The trading process is as follows. Step 3: T1 1508 submits an order/quote to trade its collateralized assets for those of a counterparty trader on the platform (T2) 1510. Order messages originate from T1 and T2 1508/1510 and are signed with the private key of T1 and T2 respectively in the trader module 1520/1522. Step 4: All orders are subject to a real-time pre-trade risk check that confirms that T1 and T2 1508/1510 have at least enough of the specified assets on the C1 blockchain ledger 1514 to cover the trade and any fees associated with the trade, otherwise the order will be rejected and will not enter the matching engine 1524. The pre-trade risk check uses the current state of provable assets on the ledger and accounts for all state changes that reduce or could reduce available assets such as active but unfilled orders, fees incurred in trading transactions as is customary in institutional trading systems.

Step 5: The system 1502 verifies T1's assets with C1 1504 and then enters the order into the matching engine 1524, matching the order with a corresponding order from T2 1510 that meets T1's trade request, assuming T2 1510 completed the same Step 1 through Step 4 with C1 1504 including clearing the real-time pre-trade risk check against provable assets of T2 1510. In one example alternative framework, trades can also involve two assets and two traders at one custodian, e.g., T1 1508 with assets at C1 1504 and T2 1510 with assets at C1 1504.

Step 6.1: The matching engine 1524 sends matched orders to atomic exchange engine 1534 that ensures a concurrent transaction of provable assets on ledger. At the time of the atomic exchange of assets, the assets are verified on the respective blockchain ledgers containing assets of T1 and T2 1508/1510 and if enough assets exist to cover the trade quantity and pay any related fees, then the acknowledgement of the order execution is sent to T1's TM 1520 and T2's TM 1522. Step 6.2: Once the order has been accepted by T1 and T2 1508/1510, the trading transaction acknowledgment messages are routed to T1 and T2 trader modules 1520/1522 for digital signing with their respective private keys.

Step 7: The digitally signed executed trade is sent to C1 and C2's custodian module 1512/1516 for validation and recordation on the respective blockchain ledgers 1514/1518 involved (i.e., one per asset). Fee transactions are also automatically created based on the T1 and T2 fee schedule and corresponding configuration in core system 1502 and sent to T1 and/or T2 trader module 1520/1522 for digital signing and the transactions are then sent to C1 and C2's custodian module 1512/1516 for validation and recordation. The recordation of the trading transaction occurs atomically on the two blockchain ledgers involved 1514/1518. Transaction data is written to three nodes: one for C1 1514, one for C2 1518 and one for the core system 1530 using a two-phase commit protocol. Step 8: The final execution report message is sent to T1 and T2 1508/1510.

An example redemption process is described in more detail. After the steps described above, T1 or T2 1508/1510 can now redeem the exchanged tokens with C1 or C2 1504/1506 who use the respective custodian module 1512/1516 to perform the redemption function on behalf of the participants. Step 1: C1 1504 will see the token redemption request by T1 1508 digitally signed by T1 1508 in the custodian module 1520 user interface. The redemption request message will contain the information fields mandated by C1 1504 as configured in advance using the custodian module 1512. This can include special PINs or passwords used for authentication as well as account or wallet coordinates if the sponsoring firm permits receipt of payment instructions as part of the redemption request, such as would be required in a multi-custodian configuration when a participant with an account at another custodian requests redemption to their custodial account, e.g., T2 1510 requests redemption to C2 1506. In this case, C1 and C2 1504/1506 can perform all AML/KYC procedures to their satisfaction and as agreed between the parties. In the example detailed here, T1 and T2 1508/1510 each have an account at C1 1504 and can redeem assets they now own on the C1 blockchain ledgers 1514 to their respective custodial accounts from which they can provide further instructions to C1 1504.

Step 2: C1 1504 uses the provided tools to verify that the redemption request is valid and that the request was made by the rightful owner of the tokens, all validated by cryptographic proofs. Sponsoring firms may institute any other policies or procedures such as a mandatory call back to the participant with independent authentication procedures. Step 3: At the time of any redemption request or periodically as dictated by the sponsoring firm's policies and procedures, C1 1504 uses the custodian module's provided reconciliation snapshot report tool to see what asset accounts on their legacy system's ledger need to be debited and credited to net settle between the accounts for transactions recorded on the blockchain ledgers 1514 up to that point-in-time. For example, T1 1508 needs to be debited 10 BTC and T2 1510 needs to be credited 10 BTC. The report shows all intermediate transactions incorporated in the net movement that needs to be processed on the legacy system to synchronize it with the sponsoring firm's blockchain ledgers. Redemption is the process of a participant moving funds from its public key address to the public key address of the sponsoring firm, e.g., T1 1508 to C1 1504, and this transaction is recorded on the blockchain ledger 1514 of the asset in question. C1 1504 then verifies the existence of the underlying assets backing the tokens submitted by T2 1510 for redemption which are presently in T1's account. The sponsoring firm can synchronize the legacy account system with the blockchain ledgers for just T1 and T2 1508/1510 in this example, or for all client accounts, as desired, in accordance with their own internal policies and procedures. One example practice is to redeem tokens off the network for any valid redemption request before adjusting the accounts on the legacy system in order to remove the assets from the blockchain ledgers 1514/1518 and prevent any transaction of the tokenized assets to be redeemed during the reconciliation process. The verification of underlying assets and debits and corresponding credits in the reconciliation process is completed using C1's internal systems.

The reconciliation snapshot report tool has a confirmation tool that C1 1504 can use to acknowledge each net settlement processed with the debit and corresponding credit between each account where there is an asset movement on the legacy system. The custodian module 1512 keeps track of these acknowledgements of movements that have already been processed on the legacy system so that the next pull of the reconciliation snapshot report will be point-in-time and will only show new net movements related to same assets and accounts since the acknowledgement was recorded. Recordation of net movements between wallets for a cryptocurrency asset on the public ledger can be performed at the time of the net movement or at some future time in accordance with the sponsoring firm's internal policies and procedures. Transaction fees related to registering net movements on the public ledger are born by the underlying client or the sponsoring firm.

Step 4: If the redeeming party are both clients of the same sponsoring firm then the sponsoring firm can perform internal debit/credit transactions. If the redeeming party is not at the same sponsoring firm, then C1 1504 unblocks T1's funds and remits the funds to T2 1510 pursuant to the payment instructions submitted by T2 1510, usually in the form of a wire transfer from C1 1504 to T2's designated custodial or other specified bank account or a wallet transfer from C1 1504 to T2's custodial or other specified wallet, as may be permitted by the sponsoring firm's internal AML/KYC procedures.

The following is an additional description of the various nodes and systems disclosed herein. The custodian Nodes 1504/1506 can include the following features. The nodes can perform blockchain ledger creation for each unique instrument or data type (multiple ledgers per node, multiple ledgers for the same asset but unique as to custodian node). The nodes can perform UTXO (unspent transaction output) or any other transaction model on ledgers. The nodes can include payment scripts for one-way payments and also perform an atomic swap script for concurrent transactions. The nodes can include access control with signed genesis blocks by one or more governance nodes (any governance from centralized to federated, to voting rights as a token on a public ledger protocol. With respect to the tokenization (issuance) process and the burn (redeem/detokenization) processes, the nodes can issue requests (create new un-mined token issuance signed by the custodian for public key address of a user aka "coinbase" transaction), redeem requests (send to burn address); or custodian controlled address is possible for other use cases and lock and unlock data or assets (can be wallet to wallet transfer with different policies applied, (e.g. no withdrawals allowed without m of n signature or custodial signature) or other programmatic lock or reservation of assets (e.g. smart contract code executed on a public ledger or other machine or policies) preventing movement/spend.

In the cryptocurrency domain, smart contracts are digitally signed in the same way a cryptocurrency transaction is signed. The signing keys are held in a crypto wallet. Byzantine fault-tolerant algorithms allowed digital security through decentralization to form smart contracts. The programming languages with various degrees of Turing-completeness as a built-in feature of some blockchains make the creation of custom sophisticated logic possible. Notable examples of implementation of smart contracts include the following: Bitcoin provides a Turing-incomplete script language that allows the creation of custom smart contracts on top of Bitcoin like multisignature accounts, payment channels, escrows, time locks, atomic cross-chain trading, oracles, or multi-party lottery with no operator.

Ethereum implements a Turing-complete language on its blockchain, a prominent smart contract framework. Solidity is an object-oriented smart contract language. EOS.IO is a blockchain platform for smart contract. Tezos is a blockchain platform modifying its own set of rules with minimal disruption to the network through an on-chain governance model. Any of these approaches can be used to implement the smart contracts described herein.

With respect to the validator for custodian ledgers, this process can be configured in the custodian node 1504/1506 that owns the ledgers. The nodes can receive transactions from sources such as the matching engine 1524 or atomic swap process 1534 containing signed orders that have been matched (can be any order or flow to optimize performance). The nodes can validate signatures and a block writer can write the transactions to one or more affected ledgers, or alternatively, the custodian node can write its own block after validation based on notification from another process such as atomic swap described below. The custodian nodes can enable a consensus to be applied before block writing if desired but can also be used to verify that custodian nodes 1504/1506 have not altered the ledger in a background, just-in-time process based on user nodes operating over transaction proofs broadcast by custodian nodes (thus securing validity of custodian ledger balances). The custodian nodes can perform new transactions that can be halted if consensus is not reached for a given custodian node.

Governance nodes can perform the following functions. The management node or nodes that can be controlled by centralized party, a federation or consensus driven governance mechanism. The nodes can authorize/control/perform any desired operation, i.e., they can perform a credit check, an atomic swap process, a validation, a block write, etc. The governance nodes can serve as third-party verification to custodian nodes or user nodes regarding data received from other custodian nodes or user nodes. The governance nodes generally do not custody or control assets, i.e., are not part of any multisignature process, and do not directly lock/unlock assets, etc. The governance nodes can have public/private keys for signing operations and/or instructions to add cryptographic provability or linkage.

User nodes 1508/1510 can have the following characteristics. The user nodes can implement private key/public key creation/management and can signs transaction orders. User nodes can delegate signing and inject private keys into any other process, e.g., within a secure enclave that is hardware or software based, or a high frequency trading module that is collocated with a matching engine process. User nodes can optionally receive a broadcast of custodian block commit transactions and maintains full or abbreviated copy of the blockchain ledger. With user nodes, data can be encrypted but decryptable for transactions of or related to the user or permissioned for the user to see, or can be transaction hashes only.

An order entry system can allow parties to submit payment or trade requests, and can be more than one type. The system can include all payment and trade requests (orders) signed with private key of user/originator and can be signed when sent. An order can be sent and then requested to sign later, e.g., after trade match or even after blockchain recordation (as may be desired for performance optimizations/use cases). The system can be delegated to sign, e.g. by injecting its private key and authorization into a secure enclave (hardware or software) utilized by another process. In an order entry system, the custodian node can validate a signature or a smart contract or other delegate could also validate the signature. The system can create an "earmark" on a UTXO set in shared memory cache to reduce balance by any order. Orders for trades can go through an order entry, matching and atomics swap process. In another aspect, payments can go direct to an atomic swap or optionally direct to a custodian node for validation and recordation using any consensus including the one specified here with the governor node and custodian node.

A credit check module can be based on pure credit limits between counterparties (collateralized or not) or can read in UTXO (unspent transaction outputs) set and calculate the sum (optional) of on-chain assets. The credit check module can send reject message back to sender or will allow the matching engine 1524 to receive/act on order. The credit check module can also be responsible for earmarking on UTXO sets (balances) of a user.

The matching engine 1524 can have the following characteristics. Depending on pre-trade credit check/UTXO, the engine can set a value (collateralized or not) for user trading transaction requests and allows or declines inclusion in the order book and/or match algorithm (price-time-priority or any other style of matching or trade consummation/execution). The matching engine can call the atomic swap 1534 with transaction details (trade execution on the orders that matched). The matching engine can perform all sorts of other connected traditional trading technologies, e.g., post-trade, RFQ-based OTC (over the counter) block trading, etc.

The atomic swap 1534 can have the following characteristics. The atomic swap can include a process that creates/orchestrates a consensus driven (e.g., two-phase commit) write of the blockchain transaction for all ledgers involved in the transaction. This can make it approximately concurrent, and either all successful or all failed. The atomic swap 1534 can be implemented any other way as well. It can check the UTXO set to verify assets are provably there and optionally perform a second credit check. It can validate a transaction and add data to the mempool. It can further initiate blockchain transaction writes and get signatures from user nodes or delegated service.

The atomic swaps service steps can include one or more of (1) Initiate the trade transactions to an order module ("OM") (governance node or central) blockcore 1530; (2) Initiate the trade transaction to CUST1 blockcore; (3) Initiate the trade transaction to CUST2 blockcore (4) Commit the trade transactions to OM blockcore (if 2 and 3 pass validation); (5) Commit the trade transaction to CUST1 blockcore; and (6) Commit the trade transaction to CUST2 blockcore. The blockcore 1530 is the blockchain process performed by the governance node 1502.

Figure 15B:
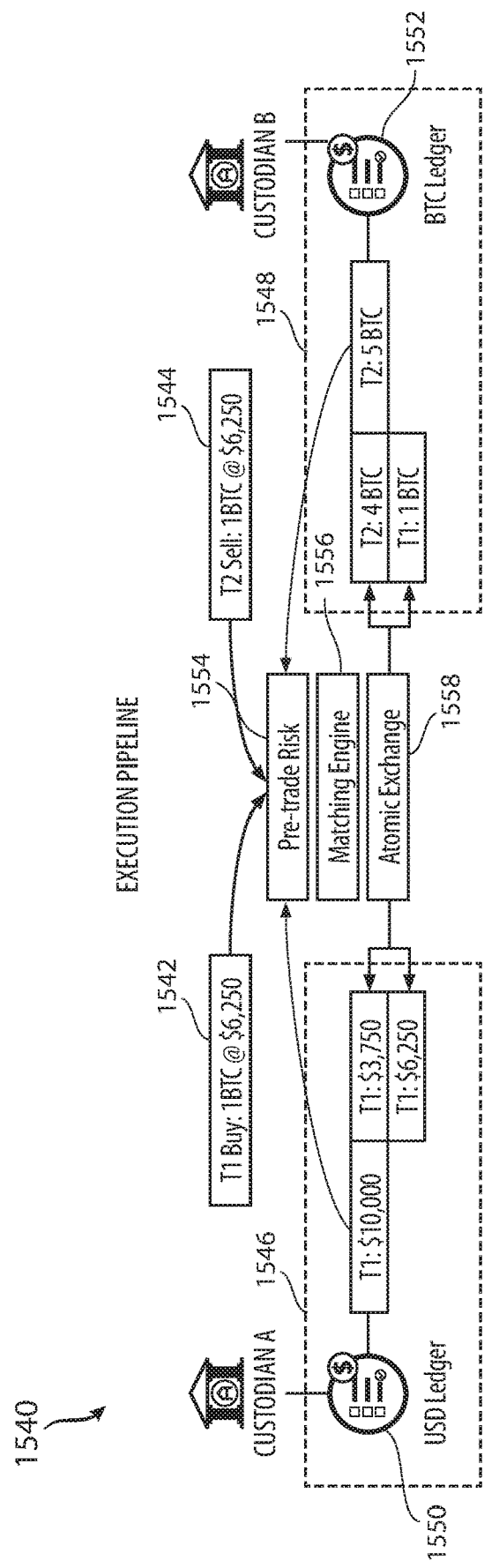
FIG. 15B illustrates an execution pipeline for the processes disclosed herein.

FIG. 15B illustrates an execution pipeline 1540 for a first trader desiring to buy 1BTC at $6,250 1542. A second trader desires to sell the 1BTC @ $6,250 1544. The pre-trade risk process 1554 includes confirming from custodian A 1546 that the USD ledger 1556 has enough money in US dollars for the first trader and confirming that the BTC ledger 1552 of the custodian B 1548 has sufficient BTC. The matching engine 1556 can confirm the trade and then the atomic exchange component 1558 can cause the atomic exchange to occur and the different custodian blockchain-based ledgers.

The net settlement movements described herein are discussed next. The net settlement process involves crawling the blockchain ledgers and calculating provable net amounts due between all counterparties based on transactions recorded on the ledgers (including payments or trades, etc.). The movements between counterparties on the traditional custodian ledger systems (fiat accounting systems) or digital asset storage systems (cold, warm or hot wallets) can be executed against public ledgers of underlying assets, e.g., bitcoin, or including using stable coins or central bank digital currencies for fiat currencies as well as wire transfer or other electronic funds transfer means directly or via smart contracts or payment processor intermediaries. The net settlement movements are executed through any number automated processes called directly by the custodian node or intermediated by any custodian process, manual or automated.

A cross custodian net settlement is also possible with this platform. In this aspect, the system crawls the blockchain ledgers and calculates provable net amounts due between all counterparties based on transactions recorded on the ledgers (including payments or trades, etc.) that are cross-custodian (amounts owed to clients with a different custodian). The net settlement process sets up, triggers and facilitates atomic transaction consisting of movement of residual quantities over various payment rails including public blockchain ledgers and/or other asset accounts and payment systems and provides an allocation report with transaction details, public key addresses and identifier data. The process can also burn and/or provide payment and reallocation of netted quantities on the custodian blockchain ledgers. An allocation report with transaction details, public key addresses and identifier data can also be provided.

A point-to-point messaging protocol can be used for broadcasting transaction data or proofs (hashes) and can be just like any part of any public ledger protocol. In another aspect, a shared memory can be used to maintain UTXO state and totals for faster operations, for real-time cache and state and to enable persistence of all relevant data and state. A message bus can be used for data broadcasting pub/sub.

Figure 16:
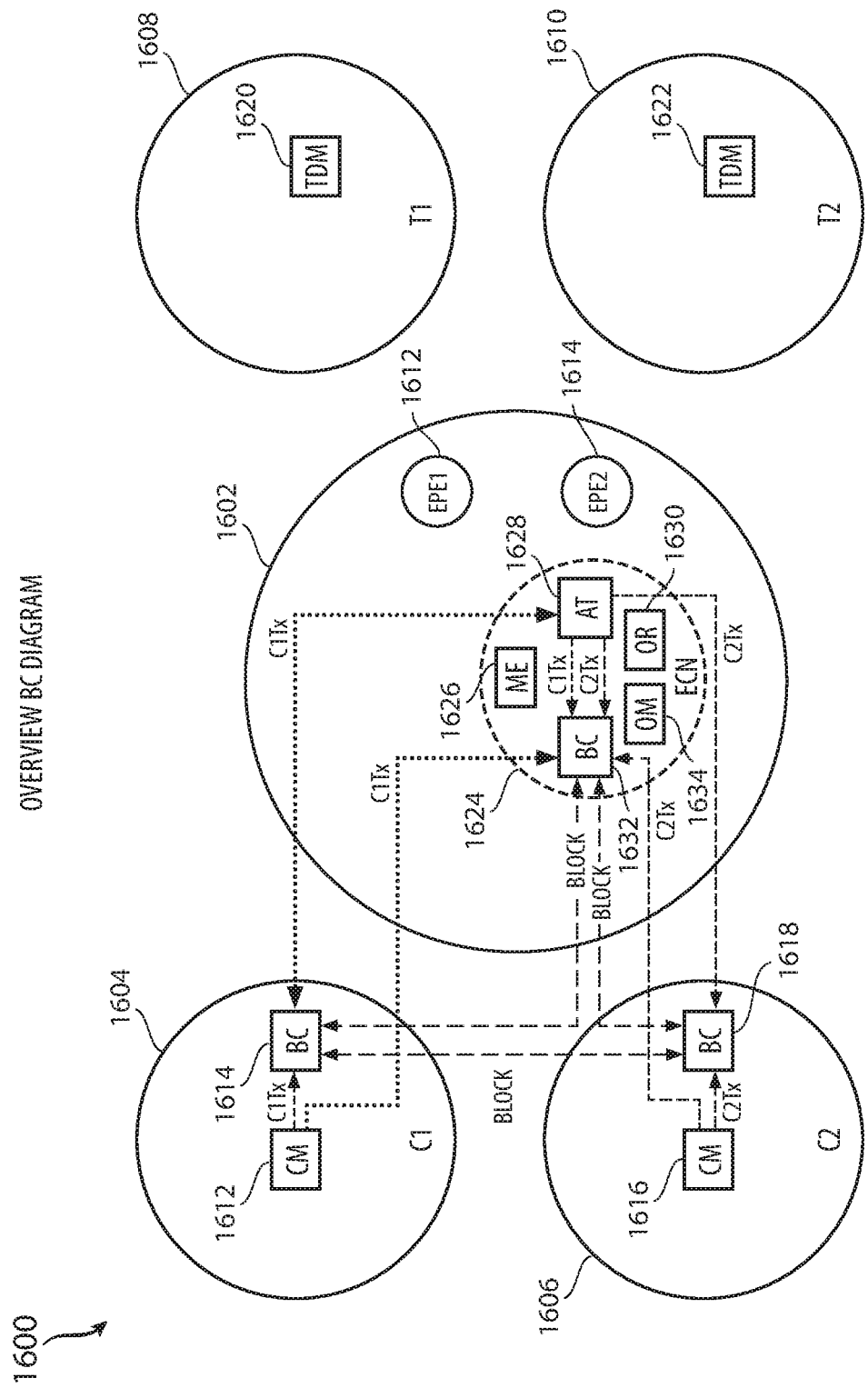
FIG. 16 illustrates an example consensus algorithm.

FIG. 16 illustrates an aspect of the consensus algorithm disclosed herein. The system 1600 has two types of consensus, one that just-in-time related to trade execution and atomic swap execution on custodian node blockchain ledgers 1614, 1618 and one that is in the background over transaction and/or block hashes that serves to notify the network of a tampered—with custodial node 1604/1606. The first type, which is detailed in the FIG. 16 and description is between the governance node 1602 and the custodian nodes 1604/1606. FIG. 16 shows the current architecture approach and where each blockcore (BC) instance is running (each blockchain node). The operational components 1624 of the governance node 1602 can include the various modules shown. The component BC 1632 is the governance node's blockchain node, which can be centralized and run by the network operator. The BC 1632 can also be defined as the OM_BC or the order module blockcore 1632 which can be a network operator's copy of the blockchain network as the network operator is the entity running an order module 1634 instance. An order router 1630 can receive orders and being the process of handling the orders by the exchange network 1624.

The following is an example create ledger flow: (1) A user select an asset from a custodian UI 1612/1616; (2) A call createNewLedger API on the OM_BC 1632 from a custodian module 1612/1616; (3) On the OM_BC 1632, a genesis block is created for the new asset; (5) The OM_BC 1632 then sends the genesis block to the custodian BC 1614/1618; (6) The custodian BC 1614/1618 validates the block and creates a new ledger for that asset.

A reserve collateral flow can be as follows: (1) On a trader UI 1608/1610, a trader requests collateral on any existing asset from available custodians; (2) On a custodian UI 1604/1606, a custodian accepts the collateral request; (3) A new "coinbase" transaction spending requested amount to trader's address is created on the custodian module 1612/1616; (4) a two-phase commit is initiated to add/validate the transaction on a blockchain 1614/1618.

The two-phase commit can include the following steps: (1) Call initializeTransaction API on the OM_BC 1632; (2), On the OM_BC 1632, the transaction is validated and if valid, it is added to the mempool with an 'I' status' (3) If initializeTransaction on the OM_BC 1632 succeeds, the system calls InitializeTransaction on the custodian BC 1614/1618. If initializeTransaction on the OM_BC 1632 fails, reserve collateral request is rejected; (4) The transaction is again validated on the custodian BC 1614/1618 and if valid, it is added to mempool with an 'I' status (initial state status); (5) If initializeTransaction on the custodian BC 1614/1618 succeeded, the system calls commitTransaction on the OM_BC 1632. If initializeTransaction on the custodian BC 1614/1618 fails, reserve collateral request is rejected; (6) On the OM_BC 1632, it is ensured that the transaction is already in mempool with status 'I'. Then the UTXO table is updated to spend this transaction and the status in mempool table is updated to 'C' (commit state status); (7) If commitTransaction on the OM_BC 1632 succeeds, the system calls commitTransaction on the custodian BC 1614/1618 where the same procedure is repeated again. If any of these commitTransaction calls fail, reserve collateral request is rejected; (8) A getUtxo call is triggered which updates the available UTXOs on Trader's UI 1620/1622.

The redeem collateral flow can be as follows: (1) On the trader user interface (UI) 1620/1622, the trader requests for redeeming an amount on available assets; (2) On the custodian UI 1612/1616, the custodian accepts the redeem request; (3) A new transaction spending requested redeem amount to custodian's redeem address is created. The inputs for this transaction are all available UTXO's for that trader for that asset; (4) Once the transaction is created, it is sent to the trader module for signature 1620/1622; (5) On trader module 1620/1622, trader's private key is used to sign the transaction; (6) On the custodian module 1612/1616, once it receives the signed transaction back, a two-phase commit is initialized to add/validate this transaction on the blockchain 1614/1618; (7) The two-phase commit is carried out in the exact same manner as for request collateral discussed above; (8) After completing two-phase commit, the trader balances are updated to reflect successful completion of redeem request.

An example trade flow can be as follows, after an order is matched by the matching engine 1626 and it reaches atomic swap service: (1) On the atomic swap service 1628, the system creates two transactions per match; (2) For the buy and sell side of the trade, the following is performed: (a) Fetch the latest UTXOs on that asset for that trader; (b) Fetch fees for that trader; (c) Create a transaction that sends all available UTXO's to 4 outputs: other trader's address, governer fee address, custodian fee address and change if any; and (d) The transaction is then sent to trader module 1620/1622 for signing. Step (3) includes, after both the transactions are prepared and signed, two-phase commit is initiated for the two transactions as follows: (a) The atomic component calls initializeTradeTransaction on the OM_BC 1632; (b) the OM_BC 1632 acquires a database level lock across the two associated ledgers, validates the two transactions and updates the mempool table with 'I' status; (c) If initializeTradeTransaction succeeds, then the atomic component 1628 calls initializeTransaction for 1st transaction on its associated custodian BC 1614/1618; (d) On the custodian BC 1614/1618, the transaction is validated and the mempool table is updated in the same way the system does initializeTransaction for redeem or reserve collateral; (e) Then, initializeTransaction is called for the 2nd transaction on its associated custodian BC 1614/1618 and the same validations are done on the custodian BC 1614/1618; (f) Once the initializeTransaction are successfully completed on all BC instances, commitTradeTransaction is called on the OM_BC 1632; (g) Similar to initializeTradeTransaction, the OM_BC 1632 acquires a DB level lock and performs commitTransaction on both the transactions. The UTXO tables and mempool statuses are updated; (h) If any of the above steps fail, the trade is rejected; (i) Else, the system calls commitTransaction for both the transactions on their associated custodian BCs 1614/1618. Failure of commitTransaction on the custodian BC 1614/1618 doesn't cause trade to fail; and (j) The status of the match is updated to BLOCKCHAIN_CONFIRMED once the two-phase commit transaction succeeds and bubbled back to the Trader UI 1608/1610.

In one aspect, the blockchain network includes a first blockchain node 1632 at a governance module 1602 of an exchange network and a second blockchain node 1614 at a custodian network 1604 that holds financial assets. The custodian network 1604 includes a plurality of custodian modules 1612 that each create blockchain ledgers, receive requests to tokenize assets, tokenize the assets on the blockchain ledgers into tokens, receive redemption requests for the tokens, burn the tokens off the blockchain ledgers, perform atomic transaction commitment and perform net settlement computations based on trading transactions in blocks. The blockchain network can include a plurality of blockchain ledgers per custodian module 1612 of the plurality of custodian modules, wherein each created blockchain ledger of the plurality of blockchain ledgers records transactions per asset, credit line, or other instrument. A peer-to-peer messaging component can be included to allow communications between ledgers or other components or modules. A consensus algorithm operating on the first blockchain node 1632 and the second blockchain node 1614 can use, for example, the peer-to-peer messaging component to reach a common agreement about a present state of the plurality of blockchain ledgers may be included in the consensus algorithm.

Figure 17:
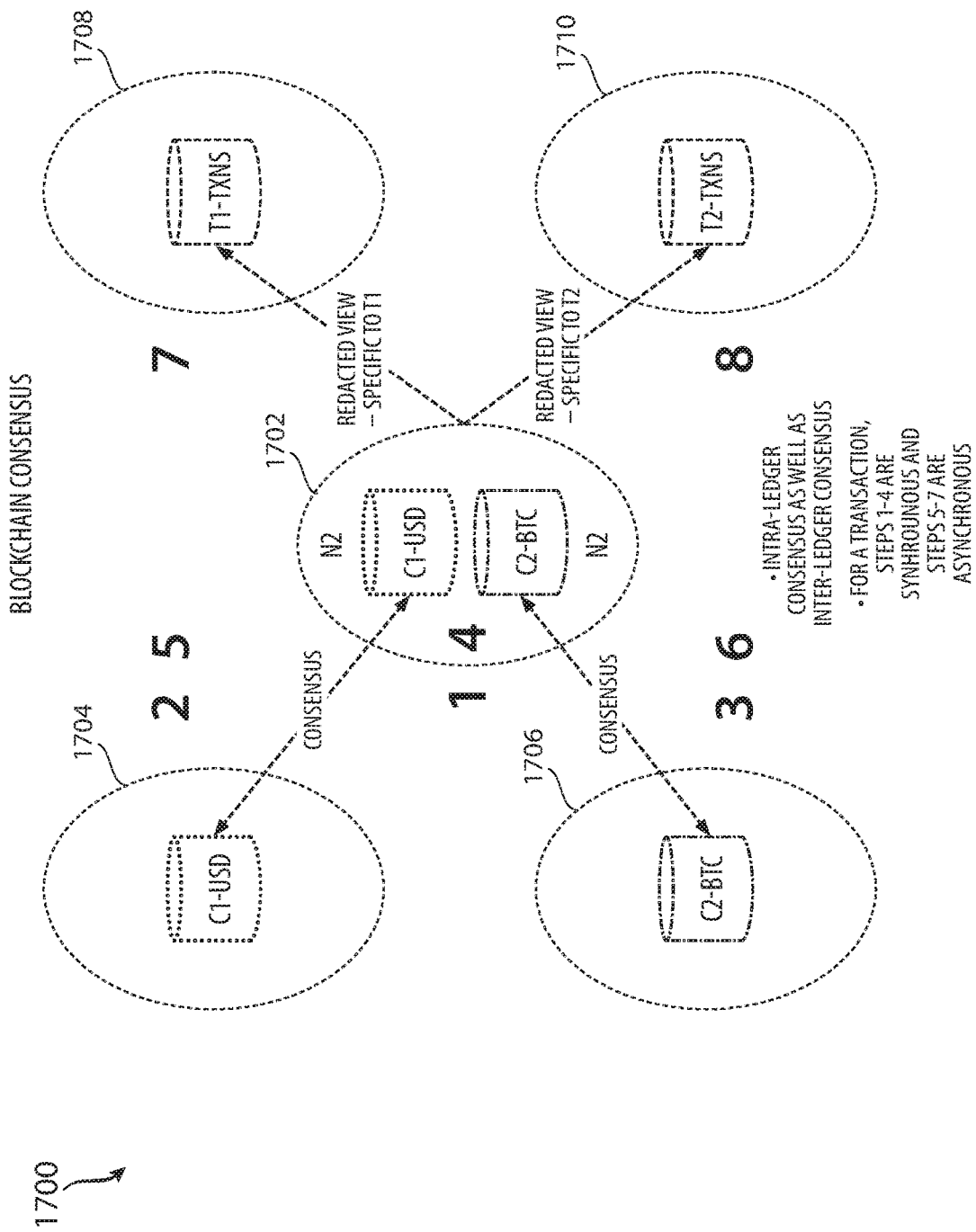
FIG. 17 illustrates another blockchain consensus algorithm.

The block-creation and consensus concepts are as follows and with reference to the framework 1700 and eight steps shown in FIG. 17 with reference to the components of FIG. 16 as well. In FIG. 17, an intra-ledger and inter-ledger consensus is shown between a first custodian ledger 1704 (for USD) a second custodian ledger 1706 (for BTC), a component also having the various ledgers 1702, and trader components 1708, 1710. In step (1), on the OM_BC 1632, a BlockCreation thread is invoked on all existing ledgers in regular intervals (10 seconds, for example). NOTE: BlockCreation is not scheduled on the custodian BC 1614/1618 by configuration. In step (2), the blockcreation thread checks the mempool table for transactions with 'C' (Committed) status. In step (3), if committed ('C' status) transactions exist in the mempool table, then a new block is created for these transactions on the OM_BC 1632. In step (4), the newly created block is validated. In step (5), if valid, a DB (database) level lock is acquired across the mempool, a transaction and block table. The block is added to the block table, all the transactions in the block are added to the transaction table and the same transactions are removed from the mempool table. In step (6), the OM_BC 1632 sends this block to the custodian BC 1614/1618 associated with that ledger. In step (7), on the custodian BC 1614/1618, the block is validated again and, if valid, it will be accepted and added to the database in the same manner it was added on the OM_BC 1632. In step (8), if the block was accepted by the custodian BC 1614/1618, then consensus was reached, the two chains are in sync and the same is logged on the OM_BC 1632. However, if the block was rejected by the custodian BC 1614/1618, then the two chains are out of sync and an error is logged for the same (If such a scenario happens, it should be fixed and synced again by the next SyncNode call).

Figure 18:
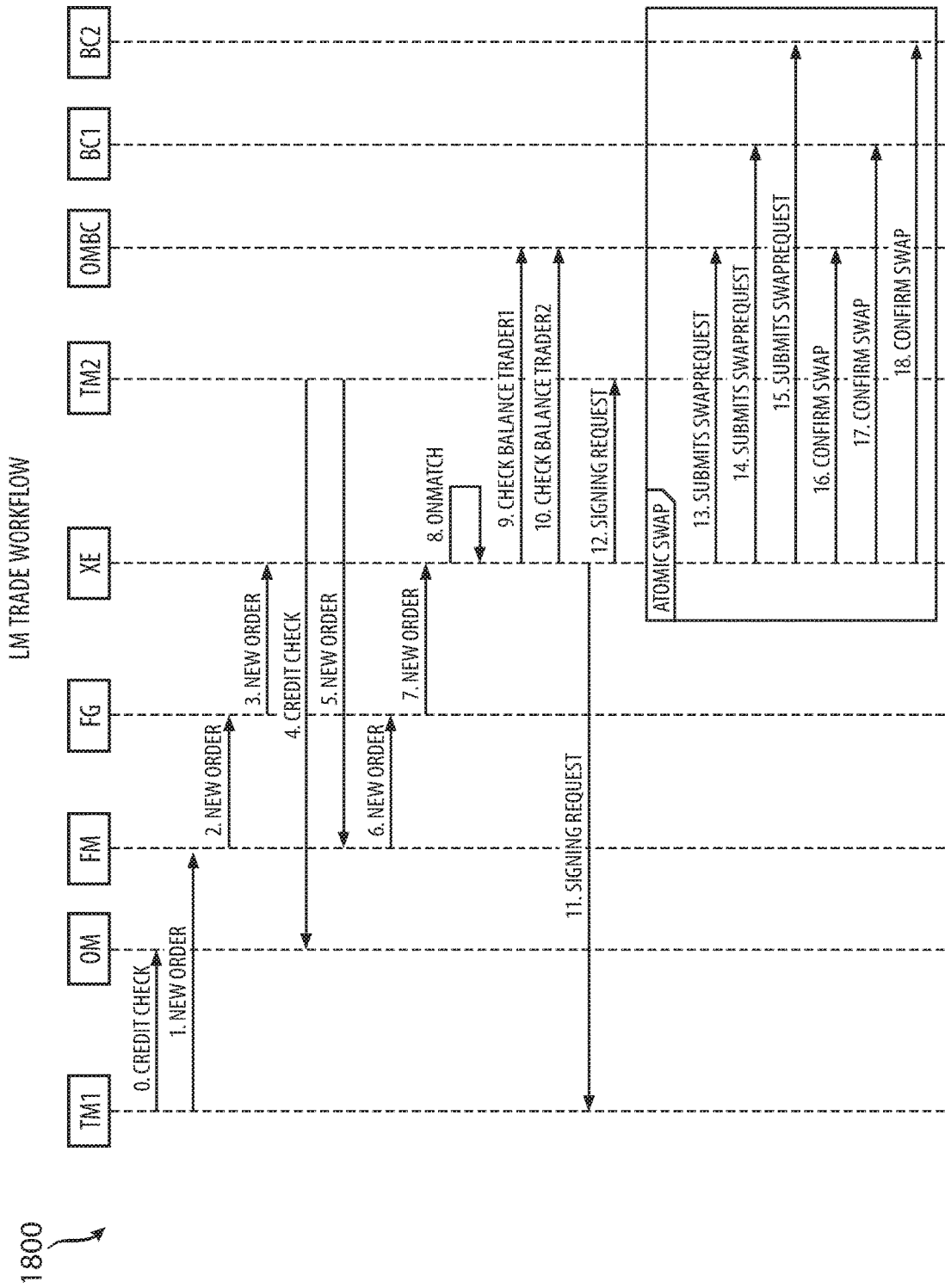
FIG. 18 illustrates a sequence diagram for an atomic swap.

FIG. 18 illustrates a sequence diagram 1800 that shows the various steps included in an atomic swap. In a "zero" step, the trading entity TM 1 requests a credit check to the OM component. Step 1 involves the trading entity TM1 initiating a new order to the FM (FIX Multiplexer) component, which is essentially a one to many multicast FIX (Financial Information Exchange) messaging gateway or adapter between a user interface and the FIX Gateway, with FIX being a common protocol for trading related messaging. The new order is passed to the FG (FIX Gateway) and the XE (Matching or Exchange Engine) components in steps 2 and 3. A credit check from the trading entity 2 is requested from the OM in step 4. Step 5 includes a new order being provided to the FM from the trading entity TM2. Steps 6 and 7 include the new order being passed from the OM, to the FG to the XE. The XE determines in step 8 if there is a match. If so, steps 9 and 10 involves checking the balances of trading entity TM1 and trading entity TM2. If the balances are appropriate, a signing request is sent to trading entity TM1 via step 11 and a signing request is sent to trading entity TM2 via step 12. At this stage, an atomic swap occurs. Step 13 involves submitting a swap request from the XE to the OM_BC. The OM_BC is the order module blockchain or blockcore and can represent the network operator's copy of the blockchain as the network operator is the only one running an order module instance. Step 14 involves submitting a swap request from the XE to the BC1. Step 15 involves submitting a swap request from the XE to the BC2. Step 16 confirms the swap with the OM_BC. Step 17 confirms the swap with the BC1. Step 18 confirms the swap with the BC2.

This disclosure next introduces example data structures of the blockchain applicable to the systems disclosed herein. An example block data structure can include a version, a previous block hash, a merkle root hash, data related to a time, a genesis flag, a height, and/or a list of transactions. An example transaction data structure can include one or more of a version, a locktime, a list of transaction inputs, and one or more transaction inputs such as a transaction hash, an index, a scrip and a sequence number.

A list of transaction outputs can include an amount and a script. An example data structure for UTXO (unspent transactions) can include a map where a key relates to a transaction hash and a value can relate to a map. The structure can include a key related to an index and a value related to a transaction output. An example mempool entry data structure can include a transaction data structure, a priority and a status. Example structures for a database table can include a block having a key; a block hash and a value; and block data structure. The database tables can include a transaction component having a key: transaction hash and a value: transaction data structure.

The database tables can further include a UTXO component having a key: address and a value: UTXO data structure. The database tables can further include a mempoolentry with a key: transaction hash and a value: mempoolentry data structure.

Figure 19:
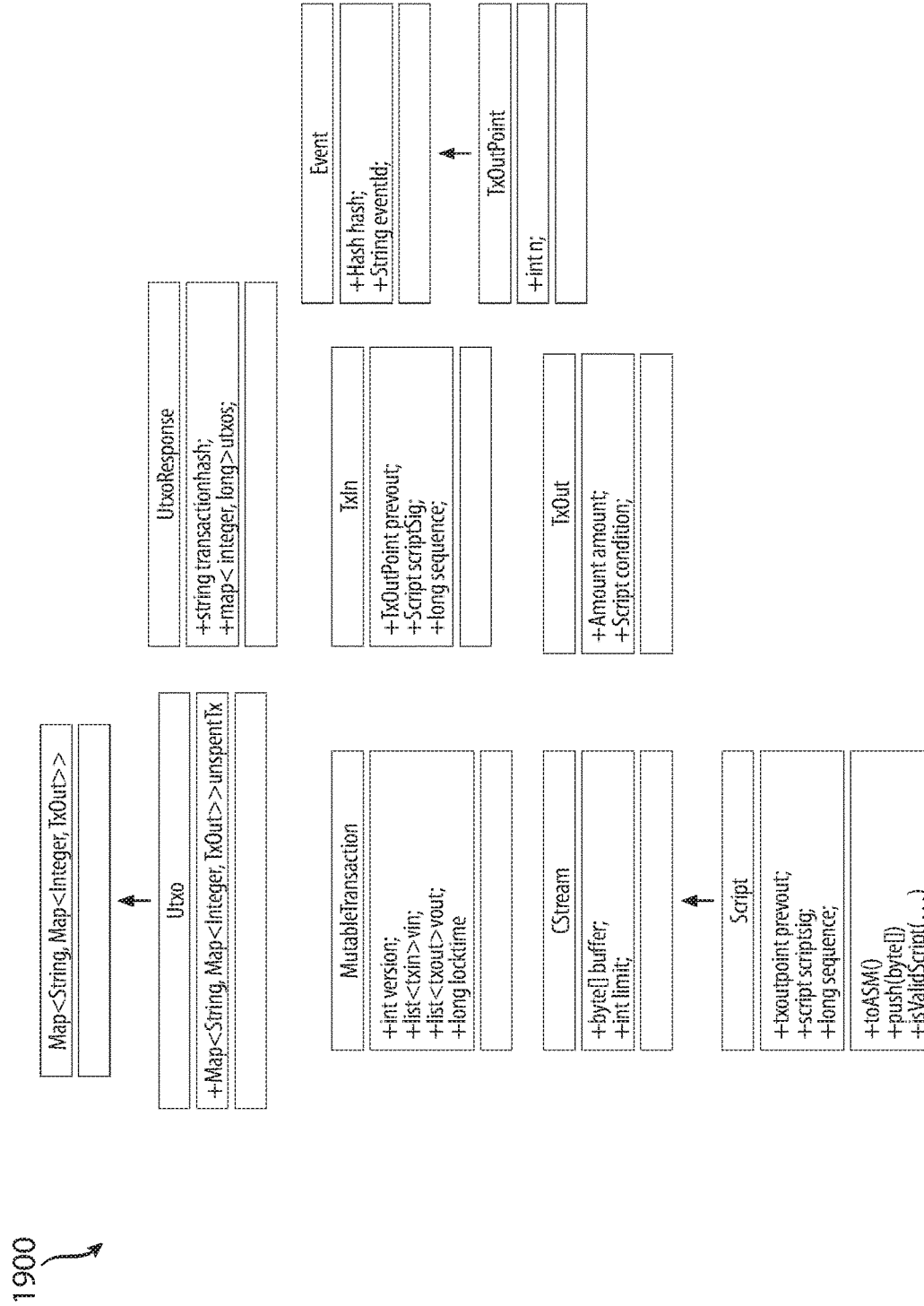
FIG. 19 illustrates blockchain node classes.
Figure 20:
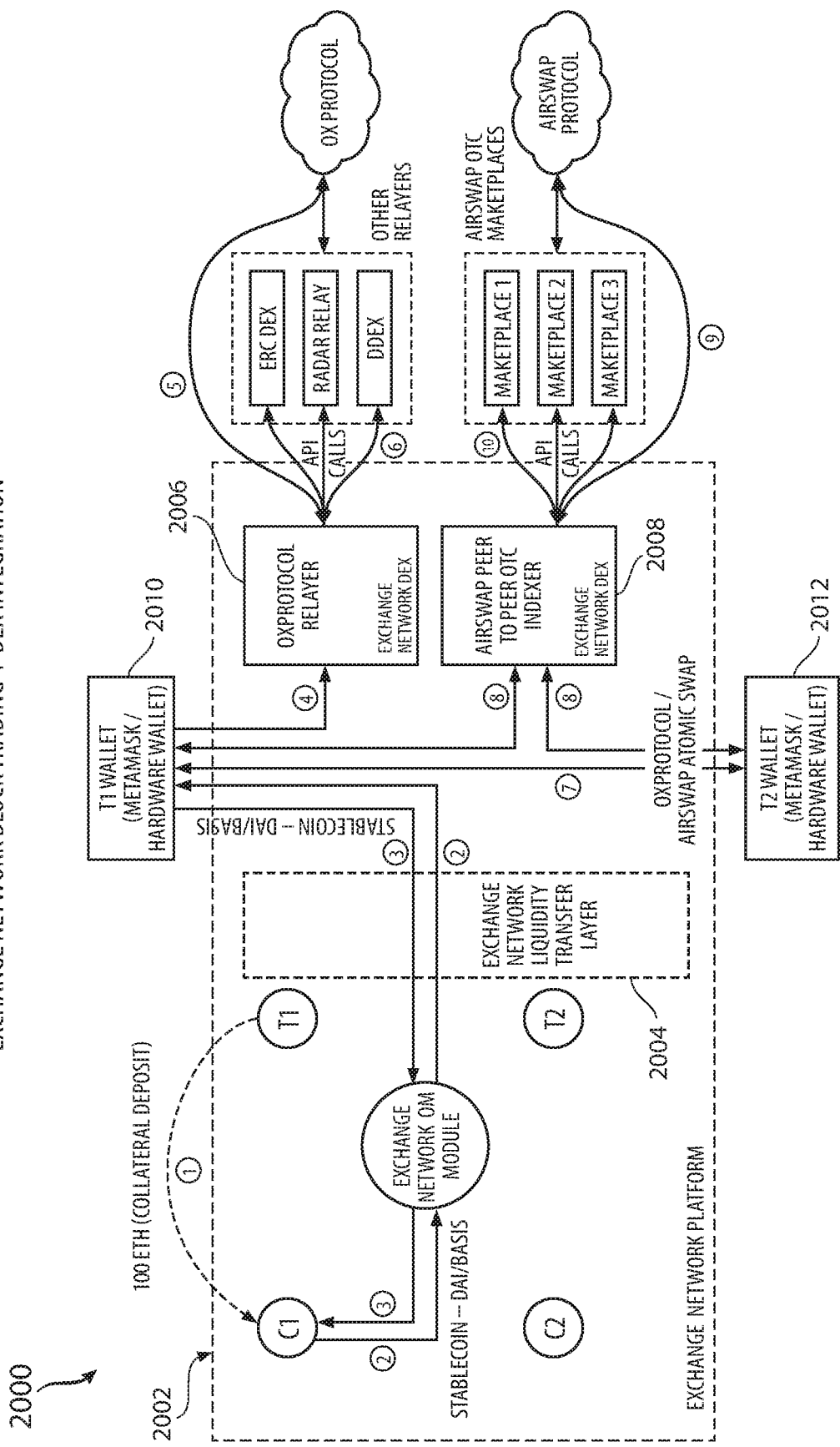
FIG. 20 illustrates a block trading and decentralized exchange approach.

FIG. 19 illustrates blockchain node classes 2000 of FIG. 20. As can be seen in FIG. 19, there are UTXO classes, a UTXOResponse class, an Event class, a Mutable Transaction class, a TXIn class, a TXOutPoint class, a CStream class, a TXOut class, and a Script class. Various dependencies are shown between classes in FIG. 19 and the parameters of the various classes are shown by way of example.

Figure 21:
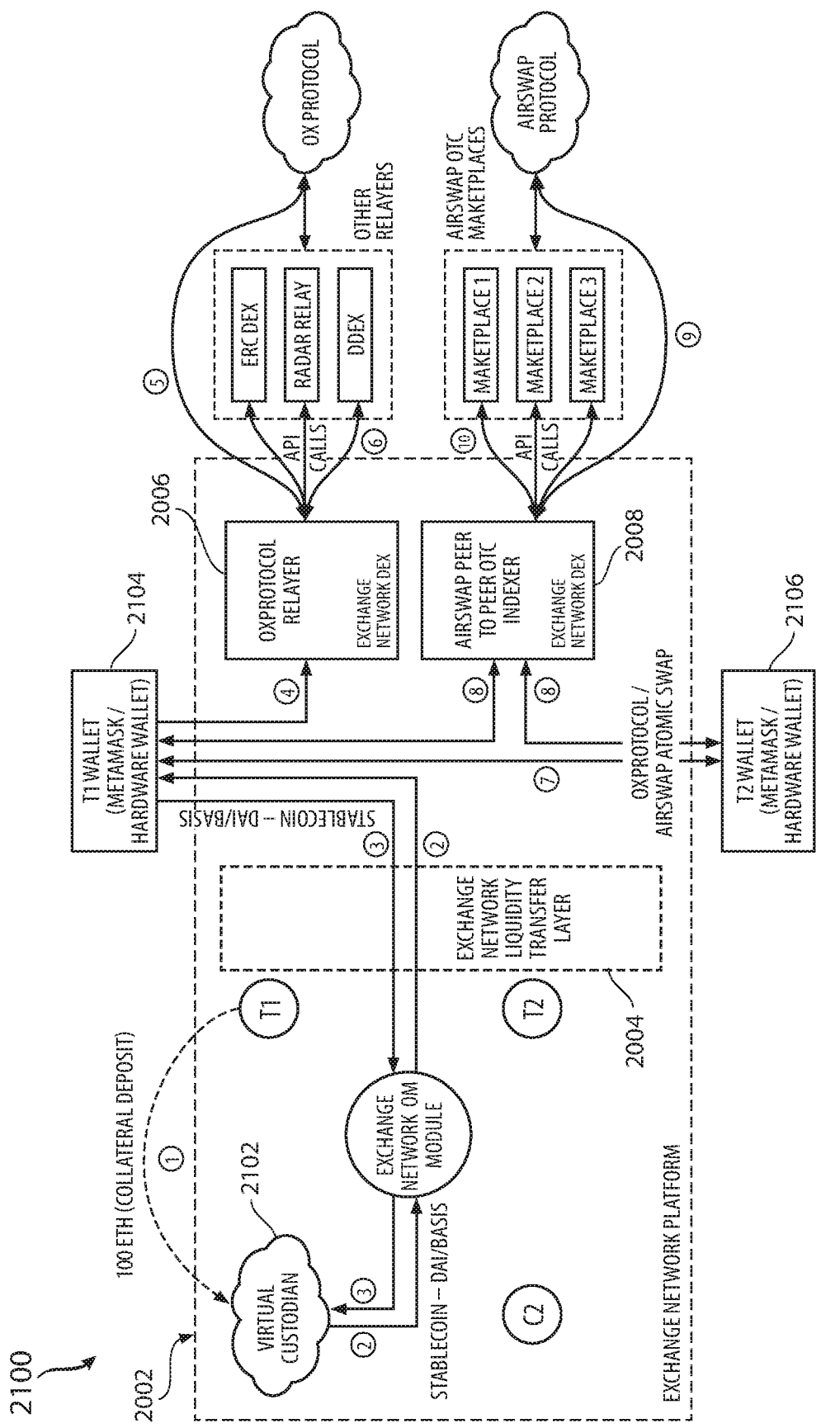
FIG. 21 illustrates a decentralized exchange approach with a virtual custodian.
Figure 22:
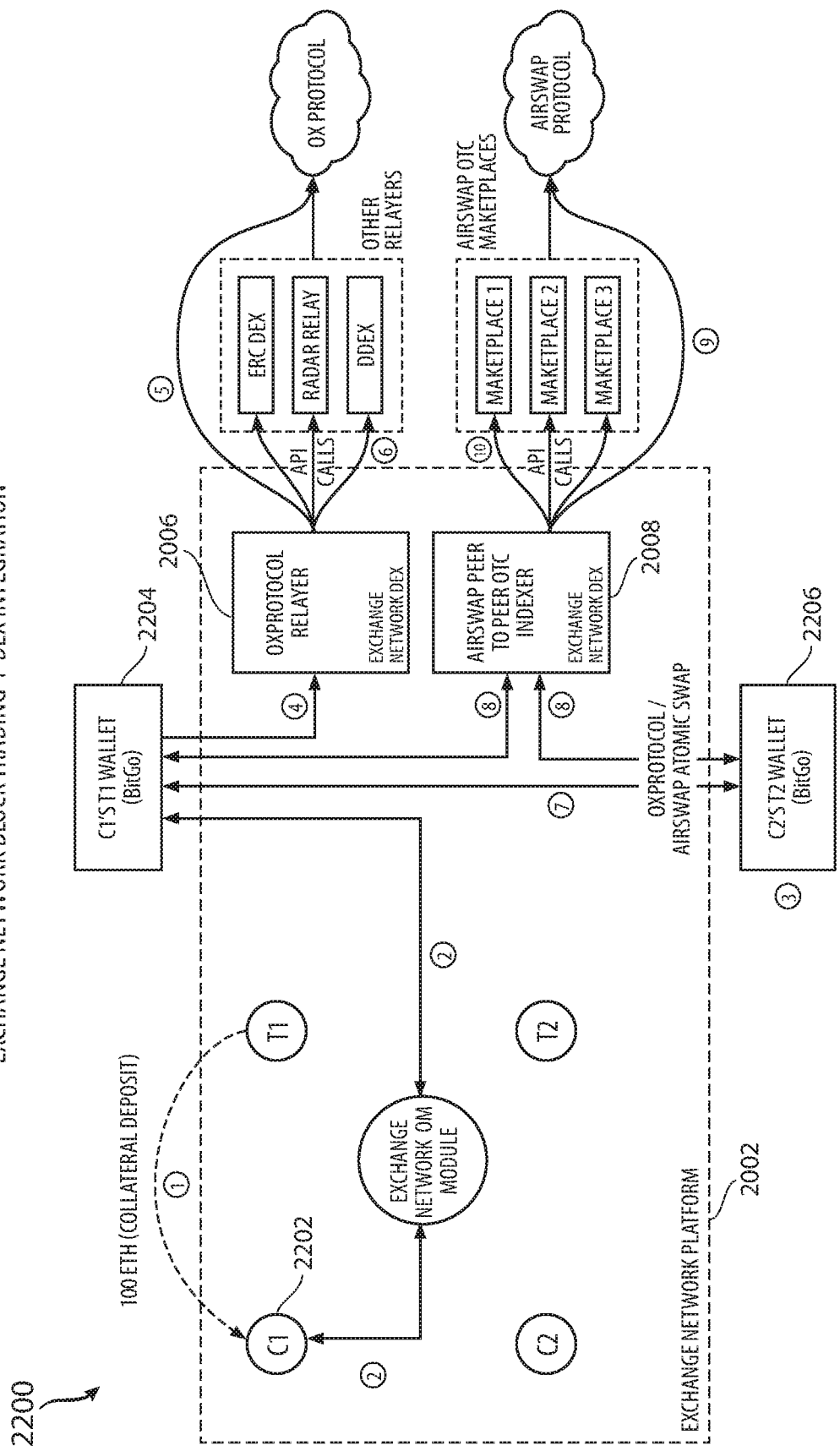
FIG. 22 illustrates a decentralized exchange approach with a wallet that supports decentralized exchange integration.

FIG. 20 illustrates a block trading and decentralized exchange approach. The concept of decentralized exchange will be introduced in the context of FIGS. 20-22. Most cryptocurrency trading is still performed through centralized exchanges such as Coinbase, Binance and soon on other block trading platforms. A promising use case for the blockchain in the context of trading relates to decentralized exchanges (DeX). A solution is disclosed that bridges liquidity between existing block trading platforms and decentralized exchanges (DeX). There are different decentralized exchanges and protocols in the market—0x, AirSwap, Kyber, IDEX, EtherDelta, OmiseGo, Bancor etc. This document focuses on 0x and AirSwap (OTC—peer to peer trading) protocols. The disclosed DeX solution covers use of StableCoin as an example to let traders easily trade in decentralized exchanges. The following steps 1-10 will be outlined for the use of an exchange block trading platform integrated with a decentralized exchange. In step 1, Trader 1 (T1) deposits collateral to a Custodian 1 (C1) though wire/bank transfer. For example, Trader 1 deposits 100 Ethers to Custodian 1. Collateral received by Custodian 1 is tokenized on the exchange platform 2002 and available for trading. In step 2, Trader 1 shows interest on the exchange platform 2002 to trade on the Exchange's Decentralized Exchange (DeX) and requests collateral in the form of "DeX loan" from Custodian 1. Custodian 1 approves DeX loan in the form of StableCoin corresponding to collateral received on Step 1 above. The Exchange can use any of the currently available StableCoins in the market—Dai, Basis, TrueUSD, Gemini etc. StableCoin will help in on-ramping onto the Exchange's Decentralized Exchange.

DeX Loan StableCoin can be transferred from Custodian 1's wallet to Trader 1's wallet 2010 as shown as part of step 2. This loan will be transferred on public ledger such as Ethereum. For example, 65,000 basis coins can be transferred into Trader 1's wallet corresponding to 300 Ethers collateral locked with Custodian 1. The Exchange platform 2002 can facilitate the transfer of StableCoins into Trader 1 wallet 2010 as part of a liquidity transfer layer 2004. Possible supported Trader 1's wallets include Metamask—a browser wallet, virtual custodian smart contract and Trezor—a hardware wallet 2010. There can be a few agreements between Custodian 1 and Trader 1 when DeX Loan StableCoin is issued to Trader 1. For example, Trader 1 may have to return DeX loan in fixed amount of time, e.g. 36 hours or 1 week. If not returned on time, interest can be charged on issued DeX loan. Interest can either be deducted from locked collateral (300 Ethers) or Trader 1 will be expected to deposit extra StableCoins (65000+2000 BasisCoins) or Custodian can keep all the collateral. Custodian 1 can possibly only loan 80% of the locked collateral in the form of StableCoin. This is to protect Custodian 1 from sudden price drop of Ethers and Trader 1 not returning the loan on time. Custodian 1 can also prematurely end the loan contract with Trader 1 if there is drop in price of Ethers.

In another aspect, instead of StableCoin, the Exchange can have a token (a ERC-20 Utility Token, for example) that can also be loaned to Trader 1 on the Exchange platform. One benefit of using StableCoin as a loaned token is the stable market value of StableCoin. If utility token is loaned instead of StableCoin, then Custodian 1 may be at a greater risk because of two volatile coins, i.e., 1) Locked Collateral or 2) Utility token.

In step 3, Trader 1, after completing trading on the Exchange's decentralized Exchange (DeX), can transfer the loaned DeX StableCoin back into Custodian 1's wallet. For example, 65000 basis coin can be transferred back into Custodian 1's wallet. This is the process of off-ramping from the DeX. The amount of StableCoin returned to unlock collateral will also depend on when user is returning the loaned StableCoin. The user can also return partial amount of StableCoin to unlock corresponding partial collateral.

In step 4, Trader 1 can use the Exchange's "DeX OxProtocol widget" 2006 to trade loaned StableCoin with any other ERC-20 compatible token. The Exchange 2002 will act as a relayer on OxProtocol 2006 and keep an off-chain order book. A DeX order coming from Trader 1 will be matched with other Trader's DeX order by the Exchange's Relayer's order book. Both the maker and taker of the order can be on the Exchange platform 2002.

In step 5, after the order is matched by the Exchange Relayer 2006, the order is packaged into a 0x Protocol compatible smart contract and final trade is performed on public ledger. If both the DeX traders are on the Exchange platform 2002 then the Exchange can keep both maker and taker fee. For example, Trader 1 will pay the maker fee and Trader 2 will pay taker fee to the Exchange. The final atomic swap of ERC-20 compatible tokens can happen directly between Trader 1's wallet 2010 and Trader 2's wallet 2012 using the 0x Protocol smart contract on public ledger.

In step 6, if the 0x Protocol order is not matched internally by the Exchange then the order book can be published by API call to other Relayers on OxProtocol. E.g. ERCDEX, DDEX, Radar Relay etc. There are about 20 0x Relayers active in the market. In this case, the Exchange will be the maker and other Relayers will be the takers of the order. If the order is filled by other Relayers then the Exchange can keep the "maker fee" and other Relayer can keep the "taker fee". Similarly, if the Exchange trader fills the order of other Relayer then the Exchange can keep the "taker fee" and other Relayer can keep the "maker fee". This broadcast order book feature of 0x Protocol will make the Exchange part of fast growing decentralized exchange network. The 0x Protocol smart contracts currently support collecting fees of transaction as 0x Protocol token (ZRX).

In step 7, Trader 1 and Trader 2 on the Exchange platform can also use an AirSwap widget to directly chat and trade token from wallet 2010 to wallet 2012. AirSwap has a conversation UI for chat based peer-to-peer transactions. AirSwap provides a peer-to-peer OTC trading option using a smart contract on public ledger. AirSwap supports all ERC-20 compatible tokens for OTC trading.

In step 8, the Exchange can also become an "Indexer" on AirSwap ecosystem. As an indexer, the Exchange will keep off-chain AirSwap order book. Traders on the Exchange platform will send intent of trading "one token with another token" to the Exchange indexer. The Exchange indexer will either match the order or broadcast intent to other interested Traders who subscribe to indexer for certain type of orders. For example, Trader 2 can subscribe to the Exchange indexer to always get an order intent if some other trader 1 is selling DAI (a type of currency) to buy a Binance token (BNB). The Exchange as an indexer can charge fee from both maker and taker of the AirSwap order.

In step 9, when the order is matched by the Exchange indexer, order is put into AirSwap smart contract and executed on a public ledger such as Ethereum. The smart contract executes the atomic swap directly between Trader 1 wallet 2010 and Trader 2 wallet 2012. The Exchange, by having a fully functional indexer, becomes a "marketplace" in AirSwap network. The Exchange will keep both the maker and taker fee by executing the order.

In step 10, if order is not matched by the Exchange indexer, then through an API interface, AirSwap supports broadcast of order book to other "marketplaces" in AirSwap network. For example, in future exchange orders, and AirSwap order book can be broadcasted to Coinbase. AirSwap in one example expects Traders to hold minimum of 250 AirSwap Tokens (AST) to participate in the AirSwap OTC trade.

Flexible system for facilitating atomic swaps between parties to a transaction. A virtual custodian module can launch a virtual custodian smart contract and/or an atomic swap smart contract. A virtual custodian module 2102 can encapsulate other third-party payment rails or systems with trustless atomic swap functionality with a corresponding non-blockchain ledger component such as instructing over regular fiat currency accounts.

The exchange platform, plus the decentralized exchange and StableCoin solution can work with the virtual custodian 2102 as well. The trader will deposit collateral to a virtual custodian smart contract 2102 as part of step 1. The virtual custodian smart contract 2102 will automatically release DeX StableCoin loan into each Trader's wallet 2104/2106 as part of step 2. The Trader will have to return the loaned StableCoin back into virtual custodian smart contract 2102 to unlock initial collateral as part of step 3.

BigGo wallet 2204/2206 currently supports 74 ERC-20 currencies. Trader 1's wallet 2204 and trader 2's wallet 2206 are shown as well as a first custodian 2202. The Exchange Platform 2002 is configured to be able to use these wallets in the context of a decentralized exchange. In this scenario, a wallet like the BitGo wallet can be integrated with OxProtocol and/or AirSwap. In this scenario, there is no need to give StableCoin loan to Traders as in the examples above. The custodian 2202 can directly have a Trader's Wallet 2204/2206 created in BitGo or another wallet provider. Any DeX trade done on the Exchange Platform 2002 by a trader can be executed on Trader's BigGo wallet 2204/2206. The integration of such wallets simplifies the overall solution.

An additional concept relates to an API-based custodian and is shown in FIGS. 23-26. An example of an API-based custodian is shown in the network 2300 of FIG. 23. An "SEN" or SilverGake Exchange Network enables digital currency and institutional investor clients to send dollars 24 hours a day. Other networks may include a similar feature for sending fiat currencies. Currently SilverGate supports API-based access to only Fiat currencies. This disclosure covers different scenarios in which funds can be locked/unlocked in SilverGate SEN account of a trader (using APIs) when trading on the Exchange Platform 2306 disclosed herein. The disclosure also covers instant/automated option of net settlement amounts due between traders.

The goal of this disclosure is to provide integration options between SilverGate as a Custodian 2302 and the Exchange network 2306 where clients can trade Fiat for cryptocurrencies and other digital assets with no trading counterparty or settlement risk. Clients can trade on the block trading platform 2306 and LiquiMatch Exchange/ECN (Matching Engine) which aggregates native Dark and Lit Orders, Streaming Liquidity from Market Makers, Institutional and Retail Exchange Liquidity. Clients only hold a single Fiat account at the custodian 2302 and a single cryptocurrency account at a cryptocurrency custodian 2308 and can trade with any other counterparties on the network 2306 with instant clearing and settlement of both the Fiat and cryptocurrency leg atomically.

Figure 23:
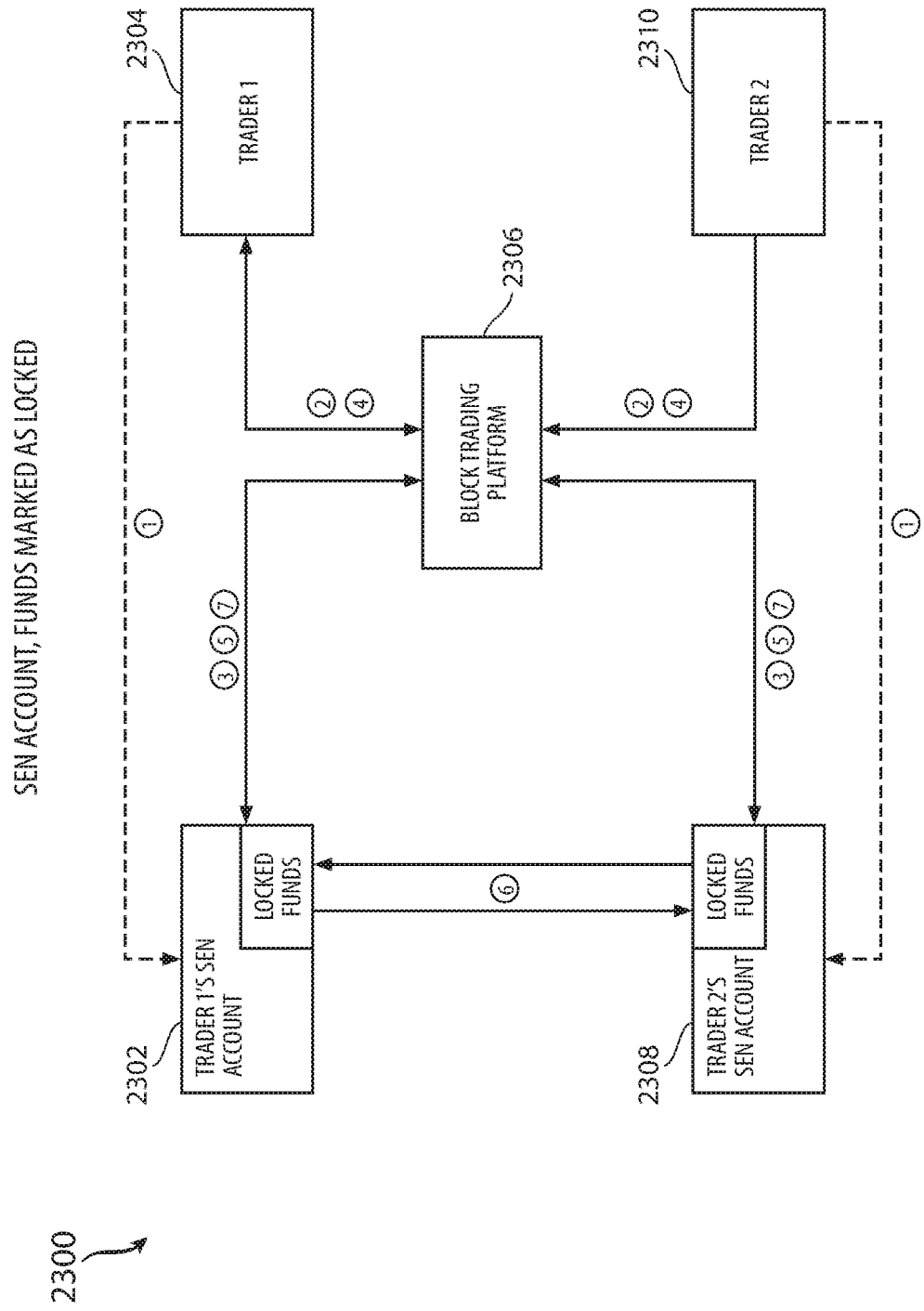
FIG. 23 illustrates an optional approach using a decentralized exchange.

In the option shown in FIG. 23, in the SEN account, the funds are marked as locked and the following steps are performed. In step 1, Trader 1 2304 and Trader 2 2310 go to a custodian website and create SEN Account 2302, 2308. In step 2, the Exchange Trader UI will have a widget for the Trader to enter the "SEN account number" and "Ocp-Apim-Subscription-Key" value. The Trader can find Ocp-Apim-Subscription-Key value in a SilverGate profile section. With the Ocp-Apim-Subscription-Key, the block trading platform 2306 can make API calls to Trader's SilverGate account on behalf of user. The block trading platform 2306 will make API calls to SilverGate 2302, 2308 to register an account balance change the web hook for the Trader's account. With help of webhook, if there is any change in balance of Trader's SilverGate account, the block trading platform 2306 will be notified. In an alternate approach—SilverGate can create a master API key for the block trading platform 2306, so that the block trading platform 2306 can lock and unlock funds on Trader's behalf. One benefit of this approach is that the block trading platform 2306 will not have to ask SilverGate API details from Trader in the Exchange Trader UI.

In step 3, the block trading platform 2306 will make "balance API" call to SilverGate to get account balances for Trader 1 2304 and Trader 2 2310. An "Untokenized balance" will be shown on the Exchange Trader UI. The Trader can allocate a certain amount of funds to be tokenized on the block trading platform 2306. The block trading platform 2306 will make API calls to SilverGate to lock the funds. The "Locked funds" will be shown as available balance for Trader to trade on the block trading platform 2306. At the block trading platform 2306, if there is no ledger, then a ledger will be automatically created for SilverGate and Trader's balance will be recorded in SilverGate's ledger. Trader 1 2304 and Trader 2 2310 will see the balances on Trader UI and are now enabled to do an OTC trade. A new feature to make this process work is a new SilverGate API that is created to enable funds to be locked.

In step 4, Trader 1 2304 and Trader 2 2310 will perform a trade on the block trading platform 2306 or LiquiMatch ECN (electronic communication network) with tokenized funds (digital representation of the locked funds on the Exchange provided custodian blockchain ledger). In step 5, after the trade is recorded on the block trading platform 2306 or LiquiMatch ECN, the block trading platform 2306 will make a transfersen API call to transfer money from Trader 1 into Trader 2 SEN account 2032, 2308 and vice-versa. In step 6, after the transfersen API call is made, settlement is complete between Trader 1 2304 and Trader 2 2310. In step 7, the Trader will perform a redeem on Trader UI and the block trading platform 2306 will make "unlock funds" API call to SilverGate. This will unlock funds at SilverGate SEN account. A new Silvergate API can be implemented to enable the unlocking of funds.

In another option, the Silvergate custodian will call Exchange block trading APIs to perform some functions. In this approach, trader marks certain funds to be locked on "SilverGate UI". A REST API call will be made from SilverGate to the block trading platform 2306 for tokenization. Corresponding REST API available at the block trading platform 2306 can be, for example, a "POST/rest/v1/custodian/collateral". Similarly, SilverGate can call other Exchange REST APIs for automating complete custodial integration with the exchange network using the following steps. At a step 1, call Get Ledgers—"GET/rest/custodian/ledgers"; at step 2, call Get Request Collateral List—"GET/rest/v1/custodian/collateral"; at step 3, call Get Redeem Collateral List—"GET/rest/v1/custodian/redeem"; at step 4, seek Balances of Traders on Ledgers—"GET/rest/v1/custodian/balance"; at step 5, call Get list of orders by Status—"GET/rest/v1/custodian/otcorders/query"; at step 6, call Get Order Reports—"GET/rest/v1/custodian/reports"; and at step 7, call Get/change reconciliation—"GET/rest/v1/custodian/report/reconciliation"

Figure 24:
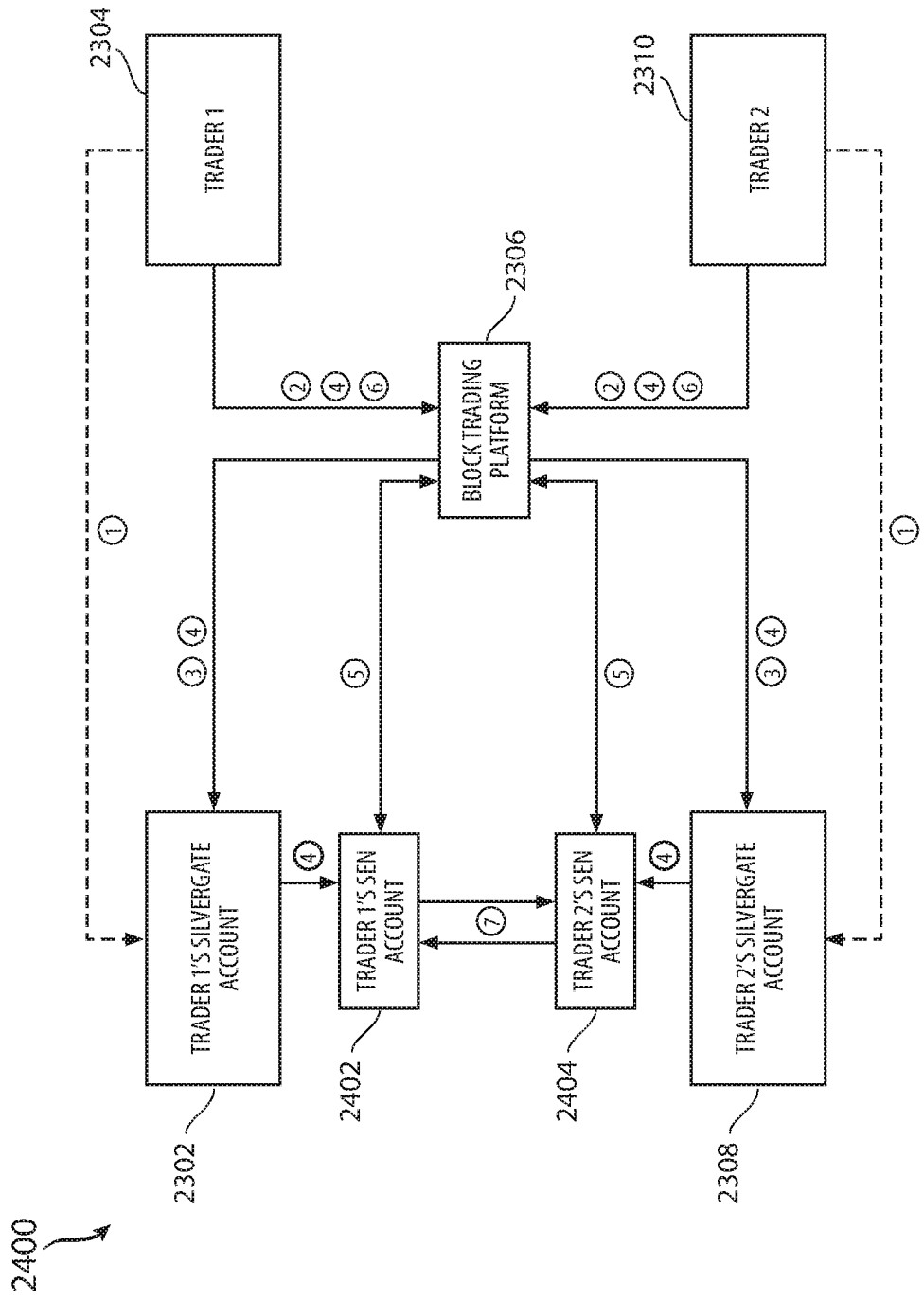
FIG. 24 illustrates an optional approach using a decentralized exchange.

Yet another option 2400 is shown in FIG. 24, in which a trader with SilverGate account creates a separate SEM account 2402, 2404. In this case, the overall flow is similar to the flow shown in FIG. 23. In the flow of FIG. 24, the block trading platform 2306 will additionally call "createsen API" to create a respective SEN account 2402, 2404 for the user. This will be special SEN account created for trading on the block trading platform 2306. Any funds moved to this SEN account can be locked by default. In order to implement this option, a new API change is required at SilverGate. The "createsen API" is the new API configuration and a new parameter will be passed from the block trading platform 2306. For example, the new parameter might identify a certain Exchange as the creator of the new account: "Creator:ExchangeNetwork". This will notify SilverGate to create a special SEN account. Funds only move from these special SEN accounts when redeemed off of the block trading platform 2306 using an Exchange-provided UI.

Figure 25:
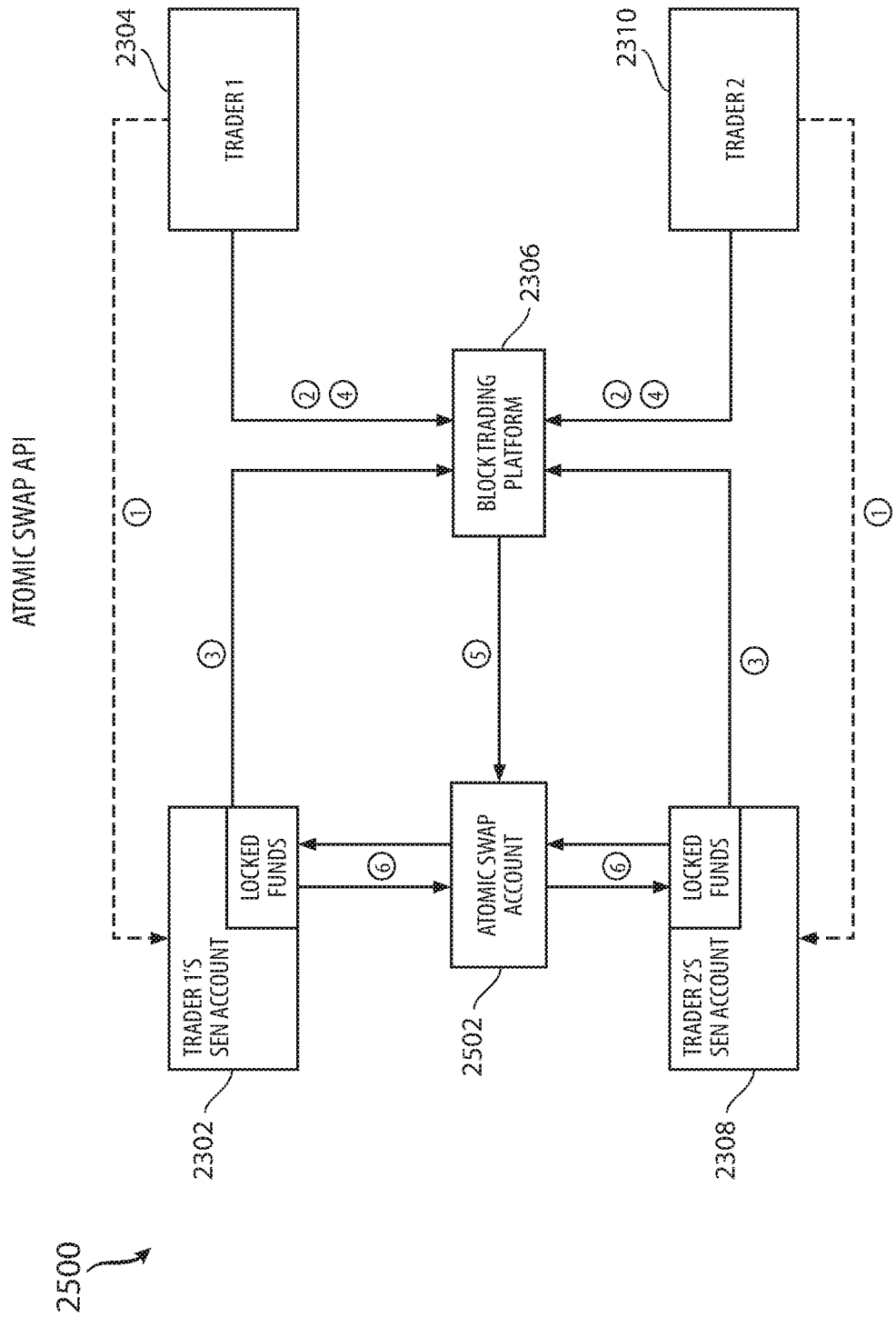
FIG. 25 illustrates an optional approach using a decentralized exchange and an atomic swap API.

FIG. 25 illustrates another option in which a Silvergate atomic swap API is introduced into the network 2500. The overall flow is similar to the flow in FIG. 23. In the flow of FIG. 25, instead of the Exchange moving the funds, an atomic swap account is used to move the funds. One benefit of this approach is that the Exchange 2306 is not be responsible for actual movement of funds for atomic swaps. The block trading platform 2306 only needs to pass net settlement amount parameters to a SilverGate API. A new SilverGate API is included which configured to accept a call made to "SilverGate Atomic Swap Account" (See step 5 in FIG. 25).

Figure 26:
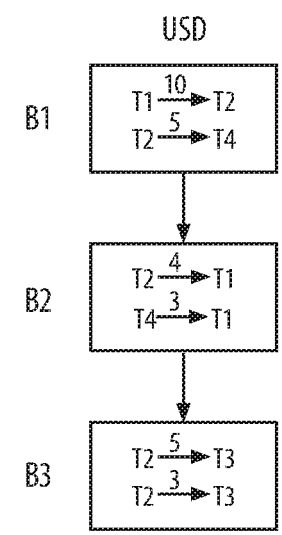
FIG. 26 illustrates data used in an atomic swap.

FIG. 26 illustrates an output 2600 of a subtask related to a reconciliation report calculator and manager for net settlement movements. The following description will talk about only one ledger, but please take into account that this process is the same for each ledger. When the reconciliation report task starts, it generates several subtasks each subtask will process one ledger. Each subtask has a set of keys, each key is the combination of two trading counterparty entities ID. For example: T1-T2, T1-T3, etc. Each subtask will check in the database if there is mark for each key. If there is a mark, it will load the mark in memory and the next step of the subtask is to read blocks starting by the last block all the way down to the last marked block. The output 2600 of this subtask will be similar to the diagram shown in FIG. 26.

In one example, the above diagram in FIG. 26 is shown as part of a user interface involving the transaction. If in the above diagram, a user clicks on approve (the button with the the system will generate a mark in a custodian module database for the combination of T2-T1 at block B3. The "App" in FIG. 26 is shorthand for "Approve" in the UI. The "App" button can be used to approve the transactions meaning that they have already been transferred as part of the net settlement. The process basically takes the set of transactions giving rise to the net settlement movement out of the next run of the calculations and data set returned.

Figure 27:
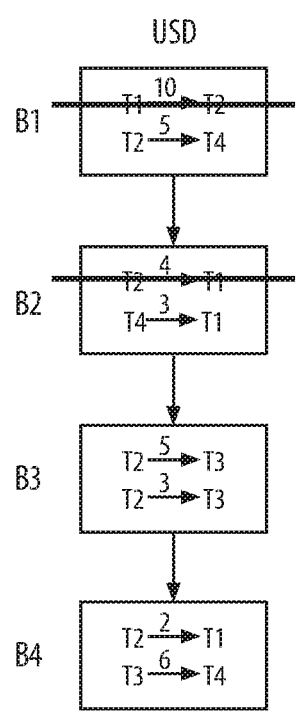
FIG. 27 illustrates data used in an atomic swap.

If the system runs the report again and there is a new block, then the result 2700 will be as is shown in FIG. 27. For the combination that has a mark at B3, the total is calculated only from the data in B4 and for the others combination the system calculates everything from block B1 to B4. Net settlement movements can be based on these calculations.

Figure 28:
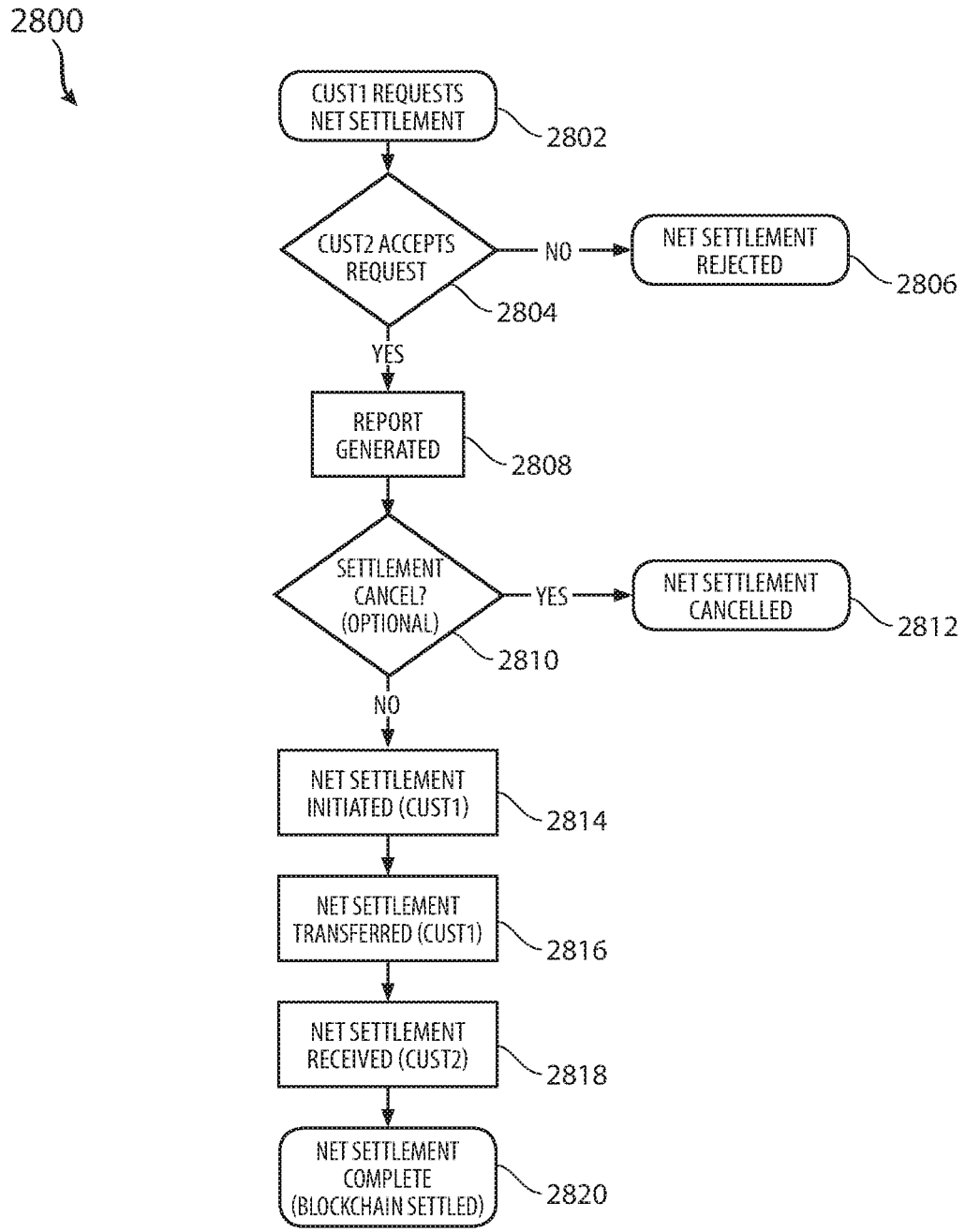
FIG. 28 illustrates a cross-custodian net settlement process flow.

FIG. 28 illustrates a cross-custodian net settlement flow 2800 with various steps. An example method can include one or more these steps in any order. Trader 1 (T1) having dollars and Trader 2 (T2) having bitcoin can start with balances (UTXOs on custodial blockchain ledger as previously described) at their own "home" custodians, Custodian 1 (CUST1) and Custodian 2 (CUST2) respectively. This process can apply to either a single custodial model (FIG. 29) or a multi-custodial model (FIG. 30). Trader 1 (CUST1) and Trader 2 (CUST2) trade on a network resulting in an atomic swap between T1 and T2 such that T1 now has ownership of assets on CUST2 BTC blockchain ledger and T2 now has ownership of assets on the CUST1 USD blockchain ledger. In other words, now they both have balances at their "non-home" custodian. A method can include receiving a request from CUST1 to CUST2 for an inter-custodian net settlement for any specified blockchain ledger and asset (2802) and determining whether CUST2 accepts the request for the inter-custodian net settlement (2804). If no, then the method include rejecting the net settlement request (2806). If CUST2 accepts the net settlement request, the method includes generating a report (2808). A net settlement calculator can be called, and resulting data is provided to both the custodians. Three levels of data and event triggers are produced through an API and/or UI. These levels are discussed more below. An optional step includes determining whether to cancel the settlement (2810). If the settlement is determined to be cancelled, the method includes cancelling the settlement (2812). If not, then the method includes initiating by CUST1 the net settlement (2814) and performing a transfer according to the net settlement associated with CUST1 (2816). CUST2 receives the net settlement (2818) and the method concludes with settling the blockchain and completing the net settlement (2820). The generation of a net settlement report is between CUST1 and CUST2. The same report is shown to both the custodians. When report is generated, balances of the traders involved in net settlement are marked as earmarked. Traders cannot use the net settlement funds for trading until net settlement is complete. Other details regarding what occurs during a net settlement are provided herein.

The report can have three level of information: A first level: DEBIT ACCOUNT—in which a custodian has to transfer money to other custodian (CUST2); NET SETTLEMENT AMOUNT—which involves how much CUST2 has to transfer to CUST1, i.e. 5 BTC; CANCEL button/function—which involves cancelling the net settlement; and START NET SETTLEMENT button/function—in which the CUST2 will press the button before transferring the funds to CUST1.

The second level of information can include the following: LEDGER—CUST1-BTC and CUST2-BTC ledgers were reconciled in below example; TOTAL SETTLEMENT QUANTITY—which is a total quantity to settle on a ledger.

The third level of information can include the following: SETTLEMENT BALANCES—which is a list of traders and their balances in non-home custodian ledger; TRANSACTIONS—which is a list of trades done by traders on non-home custodian ledger; TRADER ALLOCATION—which is account data of traders where settlement funds need to be deposited by home Custodian; and NET SETTLEMENT TX—which is a final net settlement coinbase and burn transactions to be performed on ledger.

After a report is generated, CUST1 or CUST2 can still CANCEL/REJECT the net settlement at step (2810). If CUST1 or CUST2 cancels the net settlement, CUST1 and CUST2 would have to start the net settlement process again. CUST2 initiates the public ledger/bank account net settlement process. In this example, CUST2 has to transfer net settlement amount to CUST1. In other words, as an example, 5 BTC. CUST2 can click on button "START NET SETTLEMENT". CUST2 completes the transfer of net settlement money on its end. CUST2 can click on a button "NET SETTLEMENT TRANSFERRED". In one aspect, CUST1 confirms that it received the funds on its account and clicks on net settlement received on Custodian UI.

As final step, the following list of special atomic transactions are performed on CUST1_BTC and CUST2_BTC ledgers: In a step (a), T1's BTC funds are burned on CUST2_BTC ledger. New BTC funds a coinbase transaction of the same amount for T1 and is created on the CUST1_BTC ledger. In a step (b), T2's BTC funds are burned on CUST1_BTC ledger. New BTC funds a coinbase transaction of same amount for T2's and is created on CUST2_BTC ledger. This completes the net settlement between CUST1 and CUST2 for the BTC ledger. Trader balances (asset ownership records) have been transferred to the home custodian for all affected public key addresses and their holders. After CUST1 and CUST2 settle both BTC and USD ledger, balances on T1 and T2 shows only home custodian balances. If the blockchain ledger does not exist for specified asset, one must be created in the custodian node, which can be done programmatically or using user interface, prior to receipt of assets.

Figure 29:
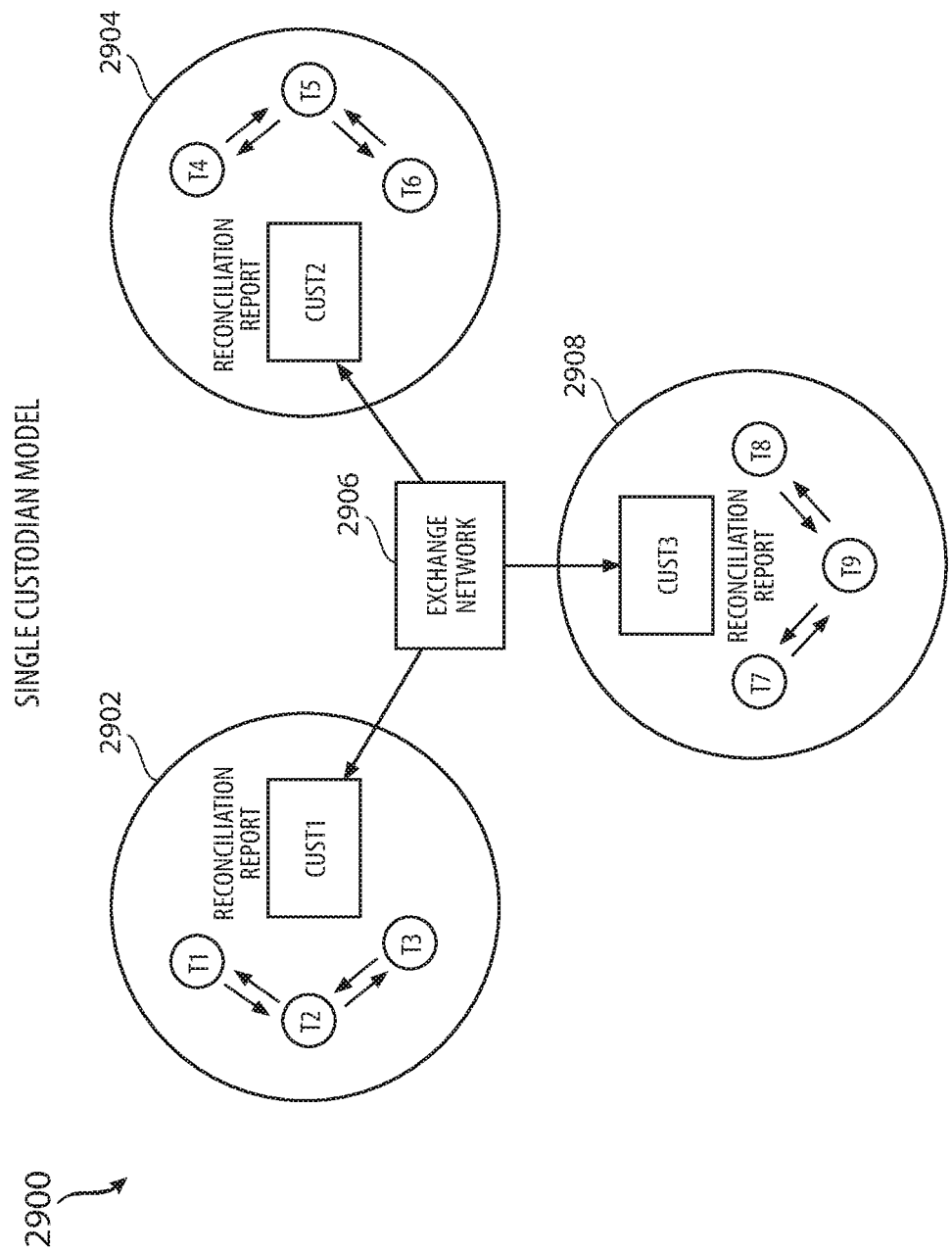
FIG. 29 illustrates a single custodian model.
Figure 30:
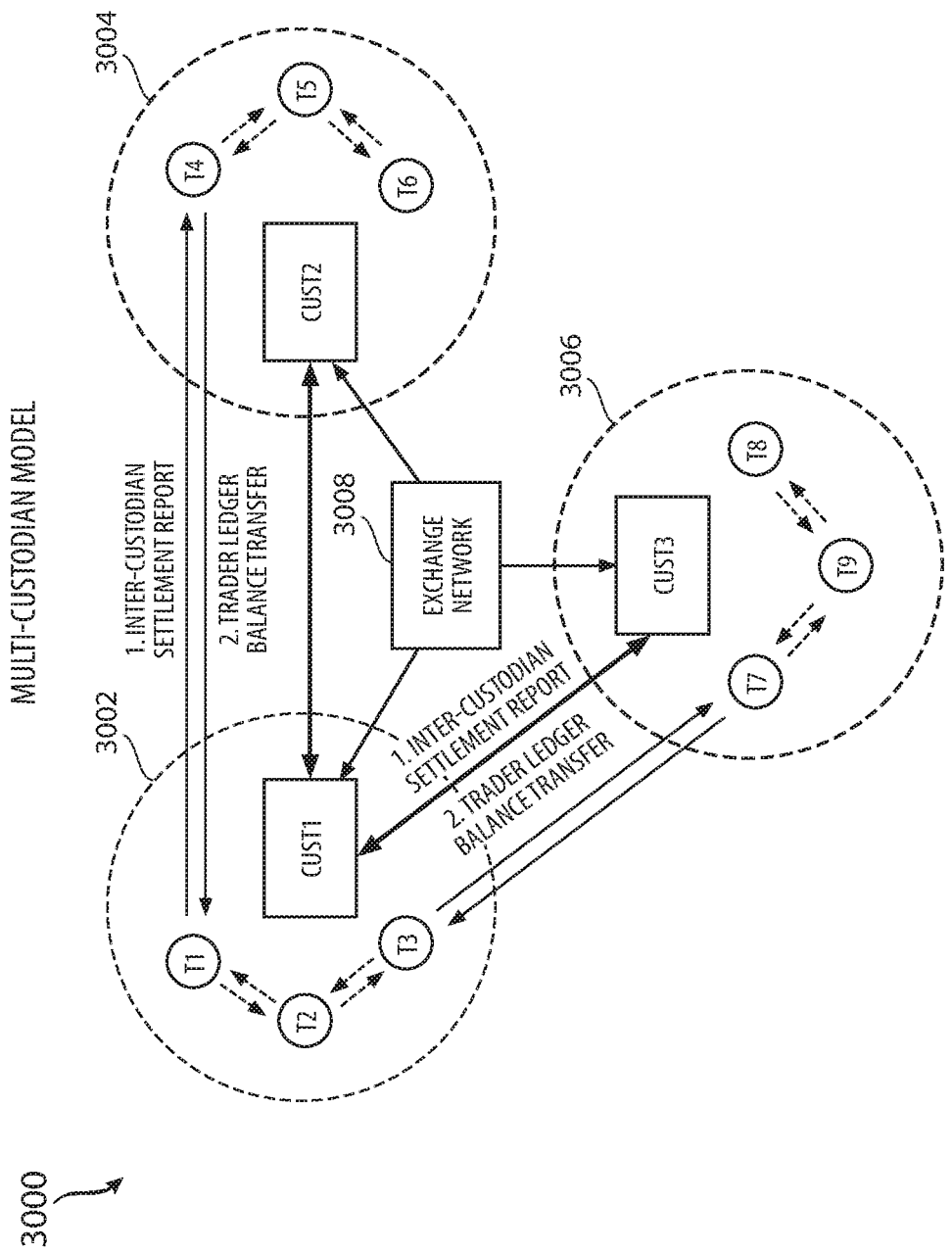
FIG. 30 illustrates a cross-custodial model.

FIG. 29 illustrates a single custodian model 2900. This structure can be used in various models described herein. A first custodian 2902, a second custodian 2904 and a third custodian 2908 can interact with the Exchange Platform 2906 to achieve trades according to the models disclosed herein.

FIG. 30 illustrates a multi-custodial model 3000 in which a first custodian 3002, a second custodian 3004, a third custodian 3006 and an Exchange Platform 3008 work together to perform the multi-custodial operations described above.

In a more complex case with many trader modules, the net settlement calculator could show something like the following output:

| Debit | Custodian | Asset | Quantity | Credit | Custodian |
|-------|-----------|-------|----------|--------|-----------|
| T1    | CUST1     | BTC   | 10       | T2     | CUST2     |
| T2    | CUST2     | USD   | 100k     | T1     | CUST1     |
| T3    | CUST2     | BTC   | 7        | T4     | CUST1     |
| T4    | CUST1     | USD   | 70k      | T3     | CUST2     |

A further example of net settlement is provided. Assume CUST1 owes CUST2 10 BTC and 70 k USD for all clients and CUST2 owes CUST1 7 BTC and 100 k USD for all clients. The Netted Quantity in BTC would be: 7 BTC can be reallocated (on custodial ledgers instead of sending full amounts). A Residual Quantity would be only 3 BTC that move from CUST1 to CUST2 for its clients. The Netted Quantity in USD would be 70 k USD that can be reallocated (on custodial ledgers instead of sending full amounts). The Residual Quantity in USD would be only 30 k USD that moves from CUST2 to CUST1 for its clients. Netting intra-custodian (between trading entities) and inter-custodian (between custodians on behalf of trading entities) can be bilateral or multi-lateral or combinations of the two.

The net settlement process can also be implemented in one of the following ways. A custodian or other process, e.g. a scheduler, can trigger the net settlement transaction process to begin. A governance node or its related processes can calculate and send transactions to the custodian to sign for each of the following: (1) for a netted quantity of each asset to be net settled to pay the netted quantity to the sending custodian's own public key address (i) with transaction linkages to the source public key addresses and transactions hashes that resulted in the specified quantities; (ii) with an allocation report/data including the split quantities and the destination client public key addresses and other client identifiers; (iii) with payment transactions from the custodian's public key address to the recipient public key addresses in the allocation report. In one aspect, the process pays to its address (custodian's own public key address) and then pays from this address to the recipient addresses in the allocation report, i.e. instead of a burn and coinbase set of transactions. In another aspect, (2) for a residual quantity of each asset to be net settled to pay the residual quantity to the custodian's own public key address (i) with transaction linkages to the source public key addresses and transactions hashes that resulted in the specified quantities; (ii) with an allocation report including the split quantities and the destination client public key addresses and other client identifiers; (iii) with the recipient custodian's public key address on the sending custodian. Asset ownership can move to this recipient custodian's public key address and then can be burned as part of the atomic transaction, or assets can be sent directly to the sending custodian's burn address.

As another aspect of item (2) above, the governance node or its related processes can calculate and send transactions to the custodian to sign for a residual quantity of each asset to be net settled to pay the residual quantity to the custodian's own public key address (iv) with corresponding digital assets held by the sending custodian paid into a smart contract address, where residual quantity in various assets can be loaded but not released without a digital signature from at least the receiving custodian confirming the quantities and allocation details and the governance node as validator (any signature scheme or validation scheme is permissible); and (v) with smart contract triggered/controlled/authorized movement of other non-digital assets over third-party systems such as ACH, FedWire, SWIFT or the like or instructions sent to third-party payment processor functions for assets not natively represented or transactable over the public blockchain ledger protocols (for example, USD before there are CBDC or if not using stable coins). This can optionally be a decentralized autonomous organization (DAO) or the like that will receive assets like USD and automatically acquire and return Stablecoin or mint Stablecoin as a bi-directional onramp/offramp of another asset like USD.

Alternatively, the transaction sent in item (2) above by governance node can be to send the quantities in (a) and (b) to the custodian's burn address (as it may do with redemption transactions described in detail elsewhere). Then the allocation report can be used to generate new issuance transactions onto the custodial ledgers for the public key addresses of the destination client public key addresses for (a) and (b) to create the asset ownership record on the custodial ledger.

In another aspect, net settlement movements at client account level can eventually be moved and hit the public ledger or client fiat accounts. These settlements can either be moved and marked as such at the time of the inter-custodian net settlement or may become part of the future net settlement movements between the custodial public key address and the client accounts in the intra-custodian net settlement report. All amounts that are the subject of inter-custodian net settlement are earmarked and not available for spending during the net settlement process.

Figure 31A:
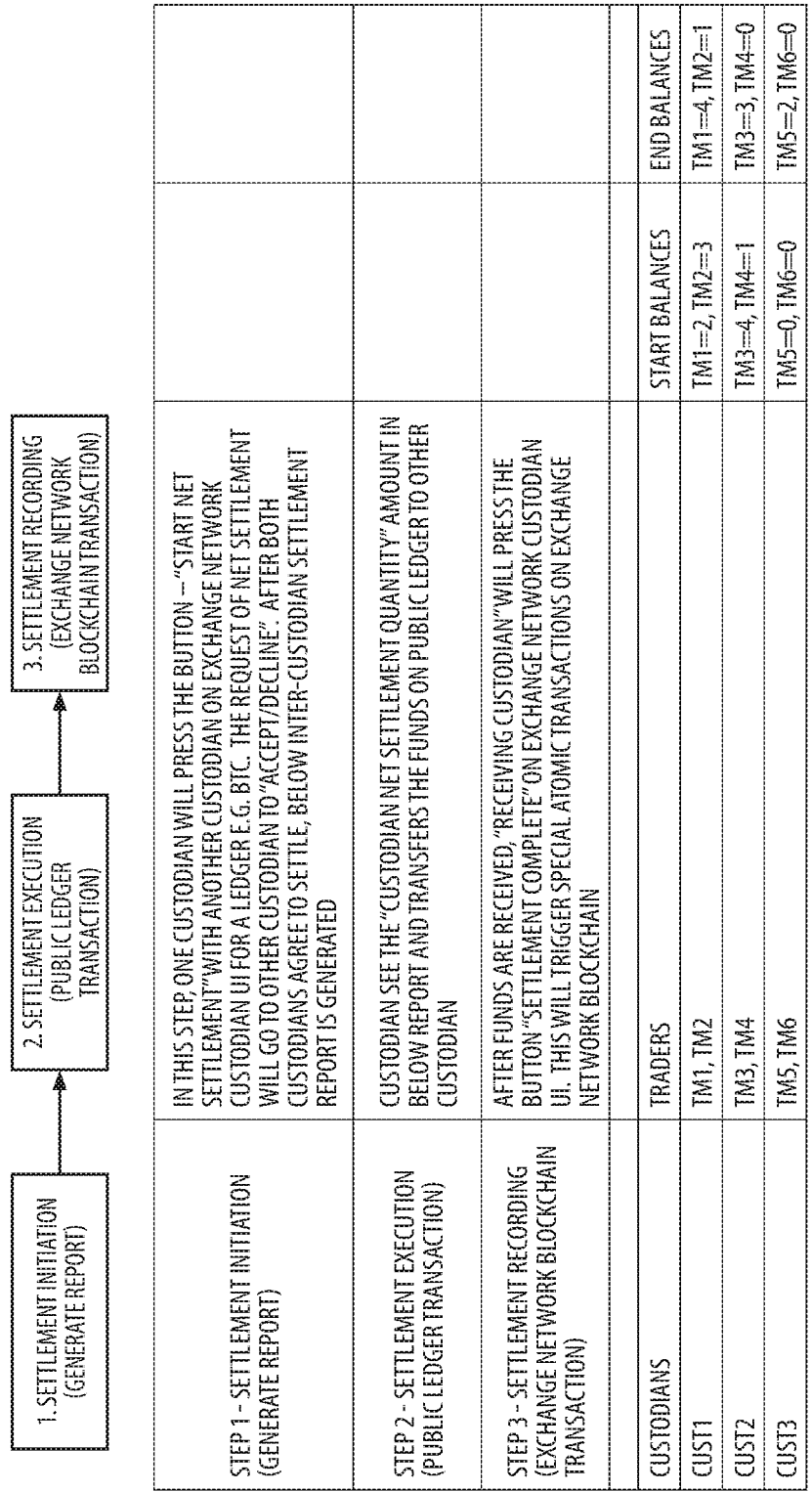

FIGS. 31A-31D illustrate the reports that can be generated as part of this process. The flow can include a first step of settlement initiation, a second step of settlement execution (public ledger transaction) and a third step of settlement recording (exchange blockchain transaction). FIG. 31A illustrates a first part of the report 3100 that lists and comments on the steps and outlines the custodians and traders, and start balances and end balances. FIG. 31B illustrates the data 3102 for a CUST1-CUST2 net settlement report. FIG. 31C illustrates an example report having data 3104 for a CUST1-CUST3 net settlement due report.

These steps will be discussed in more detail next. In a settlement initiation step, one custodian will press the button—"Start Net Settlement" with another custodian on a Custodian UI. The request of net settlement will go to other custodian to "Accept/Decline". After both custodians agree to settle, total settlement amount against different custodian ledgers is calculated and shown to both the custodians. For example, assume that Custodian 1 has three associated traders—Trader 1, Trader 2 and Trader 3 and Custodian 2 has three associated traders—Trader 4, Trader 5 and Trader 6. FIG. 31D shows the custodian 1 ledgers and the funds owed to custodian 2 in one table 3106. Another table 3108 shows the custodian 2 ledgers and the funds owed to custodian 1. A third table 3110 shows the net settlement amount of currency owed from CUST2 to CUST 1 in dollars, from CUST2 to CUST1 in BTC and from CUST1 to CUST2 in ETH. Above net settlement amount, corresponding ledgers and transactions will be shown to both the custodians. This report can be called custodian "Net Settlement Report". Custodians can also do settlement of each Crypto/Fiat offline. In a settlement execution step, below are proposed methods for settlement execution as mentioned in the start of the document: (1) Custodian account at common bank for net-settlement; (2) Custodian account at another Custodian's system; (3) Net settlement using a wallet, Stablecoin and smart contract; and (4) Net settlement using Curv/Ledger wallet, Stablecoin and smart contract.

In a settlement recording step, after assets are committed into transactions as described elsewhere and/or are received, notifications of the transactions will be authenticated and trigger a single atomic transaction covering an atomic transaction for the movement of residual quantities going both directions between CUST1 and CUST2 in any of the above described methods and the below two atomic transactions on an exchange platform to record special net settlement transaction as follows.

The two example transactions can include: Transaction 1—CUST1_USD Ledger=(T4 UTXO+T5 UTXO+T6 UTXO)->CUST2 UTXO; and Transaction 2—CUST2_USD Ledger=Coinbase Transaction->(T4 UTXO+T5 UTXO+T6 UTXO). In first transaction, on CUST1_USD ledger, UTXOs available to Custodian 2 traders—Trader 4, Trader 5 and Trader 6 are combined and assigned to Custodian 2 public key. In second Transaction, a coinbase transaction is made on CUST2_USD ledger and UTXO is assigned Trader 4, Trader 5 and Trader 6. Above two transactions achieve transfer of UTXOs from CUST1_USD ledger to CUST2_USD ledger, reflecting the cross-custodian net settlement on a blockchain as proof. Alternatively, a separate special blockchain ledger can be created on the governance node to record cross-custodian net settlement.

FIG. 31D illustrates example data in various tables 3106, 3108, 3110 in connection with a multi-custodial net settlement scenario.

Figure 32:
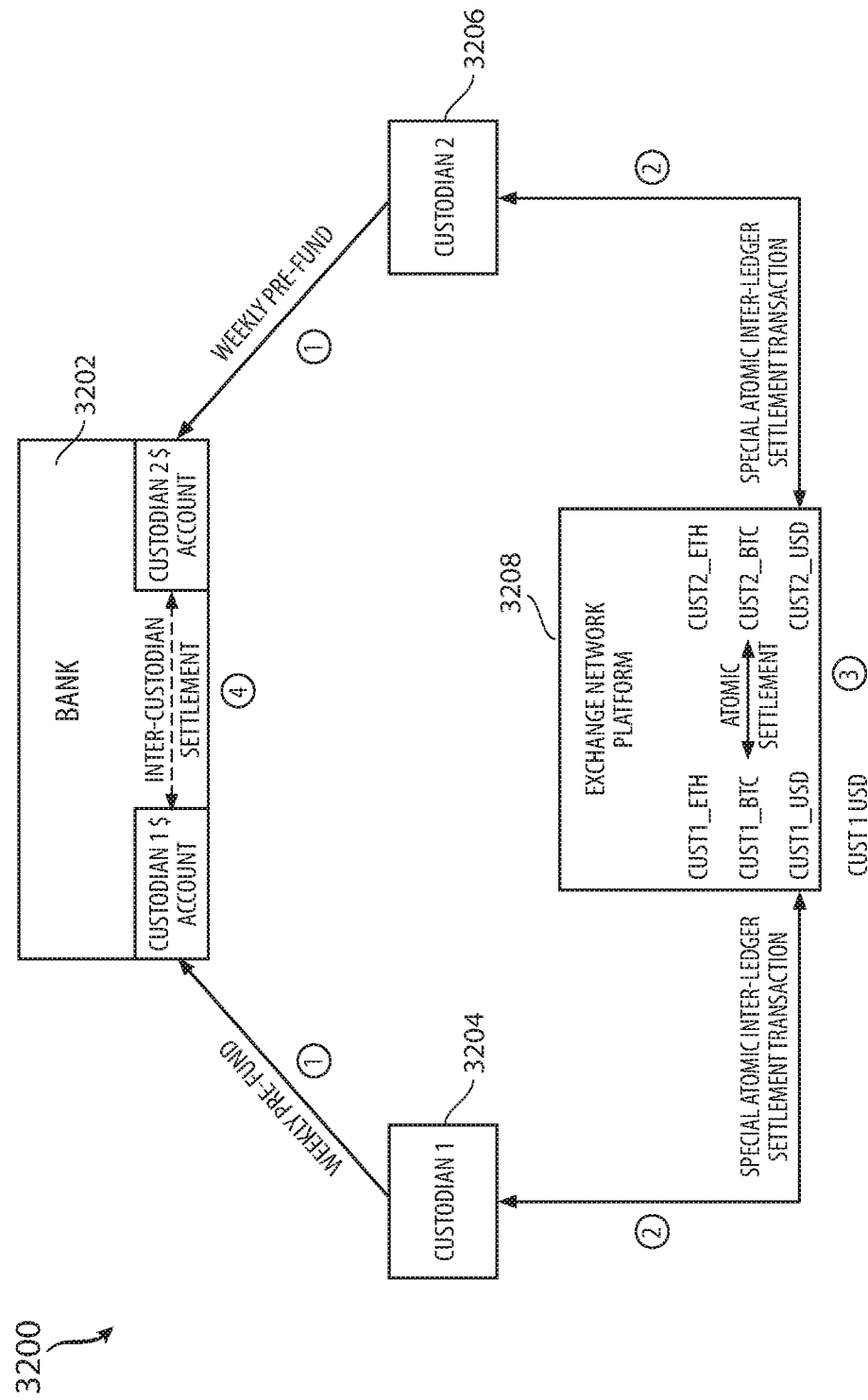
FIG. 32 illustrates an option of a custodian account at a common bank for net settlement.

FIG. 32 illustrates a cross-custodian net settlement solution 3200 for moving residual quantities. There are different options to achieve cross-custodian net settlement for Fiat/Crypto. Example options are: (1) Custodian accounts at common bank for net-settlement; (2) Custodian accounts at another Custodian; (3) Net settlement using a wallet, Stablecoin and smart contract; (4) Net settlement using third-party provided wallet like Curv/Ledger wallet, Stablecoin and smart contract. One option is shown in FIG. 32 for a custodian account at a common bank for net-settlement. In this approach, custodians will have account at a common bank. For the final settlement, custodian will send funds to another custodian account in the same bank.

An example workflow can be as follows. Custodian 1 3204 and Custodian 2 3206 will have account at a common bank 3202. This account will be used by custodian for final settlement. The account can hold funds in Fiat. Custodians will pre-fund the account. See step 1 in FIG. 32. An account could be identified as a ledger entry in a database or any other ledger type that contains data that represents asset data including an asset type, quantity and ownership data (among other data) with logical and other wrappers that support changes to the data itself (such as changing the ownership data) or otherwise operating on this data through an API and other intermediate processes with conditional logic such as a Smart Contract as commonly referred to in Ethereum terminology or the like.

The account "wrapper" or API layer can be include the following configuration and functions: (1) Connects to API of a governance node; (2) Receives transaction proposal including at least data including an asset type, residual quantity of net settlement amounts due between any two parties with full allocation splits, netted quantities transactions details as they are prepped for completion of the atomic reallocation with full allocation splits; (4) Causes lock on residual quantities asset balance in account; may move the assets to special account for application of the lock and the transfer automation; (5) Confirms that all other netted quantities transactions are prepared, signatures valid and assets committed in time-lock transaction with a shared secret or similar methodology (can also perform its own signature validations); (6) Sends confirmation data including at least the asset type, amount, transaction identifier of the current transaction; (7) Receives transaction confirmation details including at least the transaction identifier or hash and any other output data; and (8) Performs an atomic transaction such as the current implementation of the two-phase commit described herein will trigger the transaction finality In step 2 of FIG. 32, Custodian 1 3204 triggers net settlement request to Custodian 2 3206 by sending event notifications to the governance node 3208. Custodian 2 3206 will be notified of the request and can accept/deny the settlement request based on any logical test. In step 3, after both custodians notify the governance node 3208 to create the net settlement transaction, a special atomic multi-ledger settlement transaction is calculated and recorded by the governance node 3208. Net settlement job calculates how much Custodian 1 3204 owes to Custodian 3206 or vice-versa. Net settlement amount will be shown to custodians in both fiat and cryptocurrencies. E.g. USD, ETH, BTC, etc.

In step 4, after settlement amount with full allocation splits and user public key addresses and other data is shown to both custodians, Custodian 1 3204 and Custodian 2 3206 will notify the governance node 3208 to perform final net-settlement. In the bank 3202, Custodian 1 3204 will transfer the net settlement fiat amount into Custodian 2's 3206 account or vice-versa, which process can be automated and made atomic using Smart Contracts or other logic and API calls to the bank systems. After the transfer of funds in the Custodian 2's account, along with any other transactions that are part of the atomic transaction such as reallocation of netted quantities and/or settlement of other assets via smart contract or other means, net settlement is complete. Custodian 2 3206 will generate a notification to confirm the receipt of settlement amount and will perform any transactions related to the allocations to public key addresses or other ledger addresses.

Figure 33:
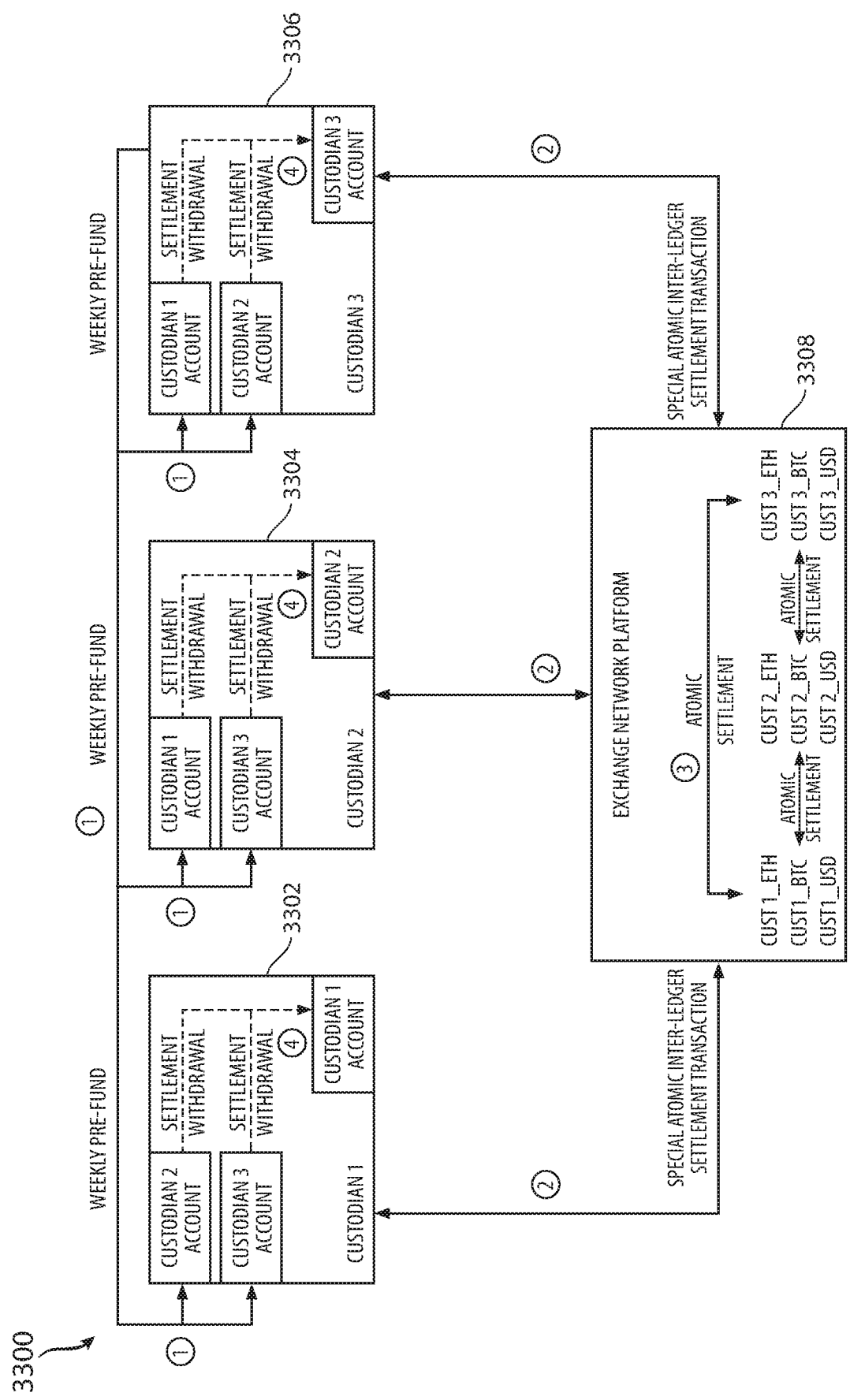
FIG. 33 illustrates an option for a custodian account at another custodian's system.

FIG. 33 illustrates another option in which the custodian account is at another custodian's system. In this approach, each Custodian 3302, 3304, 3306 will have account in another custodian's system. During cross-custodian net settlement, a receiving custodian will withdraw funds from sender custodian's account in receiving custodian's system.

The workflow for FIG. 33 is as follows. In step 1, each Custodian 3302, 3304, 3306 has account in other custodian's system. Each custodian will weekly/monthly pre-fund their account with funds which can be client omnibus or master-account/sub-account structure programmatically managed based on logical conditions. For example, Custodian 1 3302 will have account in Custodian 2 3304 and Custodian 3's 3306 system. Custodian 2 3304 will have account in Custodian 1 3302 and Custodian 3's 3306 system.

In step 2, Custodian 1 3302 triggers net settlement request to Custodian 2 3304 with notifications to the governance node 3208. Custodian 2 3304 accepts the settlement request.

In step 3, after both custodians show intent to settle, a special atomic multi-ledger settlement transaction is calculated and recorded at the governance node 2308. Net settlement job calculates how much Custodian 1 3302 owes to Custodian 2 3304 or vice-versa. Net settlement amount will be shown to custodians for all assets, e.g., USD, ETH, BTC etc. Finally, in step 4, after settlement amount is shown to both custodians, Custodian 1 3302 and Custodian 2 3304 will notify acceptance to perform final net-settlement. Custodian 1 3302 will withdraw settlement fiat amount from Custodian 2's 3304 account or vice-versa based on this proof of ownership change in the transaction at step 3. After withdrawing reallocation of funds is done, net settlement between custodians is complete.

Figure 34:
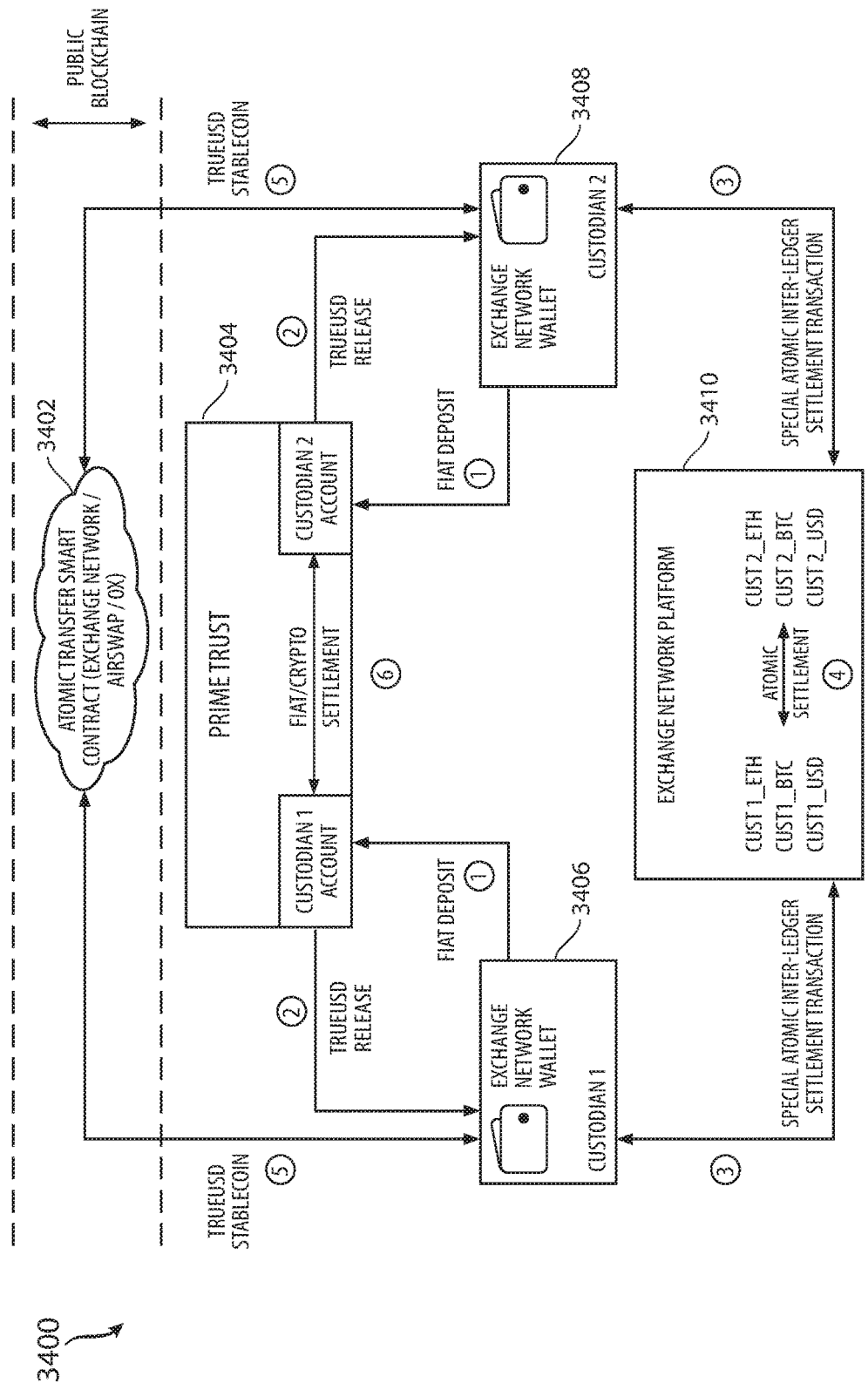
FIG. 34 illustrates a net settlement using a wallet, Stablecoin and smart contract.

Another option is shown in FIG. 34 and relates to net settlement using a wallet, Stablecoin and a smart contract. In this approach 3400, Custodians 3406, 3408 will have account at a prime trust 3404. After a Custodian 3404, 3408 deposits Fiat, the prime trust 3404 will release Stablecoin (TrueUSD) to the custodian's wallet (on-ramp). TrueUSD will be used for inter-custodian atomic settlement using an Ethereum smart contract. The Custodian 3406, 3408 can also deposit TrueUSD Stablecoin to Prime Trust 3404 to receive Fiat (off-ramp). The issuance of the Stablecoin such as TrueUSD can be automated by the primary issuer using a smart contract, where receipt of USD on account automatically creates issuance or transfer of already issued Stablecoin to the wallet.

This solution may require an open source wallet to be installed by Custodians 3406, 3408 as is shown in FIG. 34. The wallet can be developed and governed by the governance node 3410. The wallet can expose APIs that can be called by the governance node 3410 on the exchange platform. A benefit of this approach is the possibility of complete net settlement automation. There is no manual movement of funds required for settlement, nor any Fiat account. Furthermore, the wallet can hold any ERC-20 token and use it for atomic wallet-to-wallet transfer/settlement, this includes ERC-20 based securities, bonds, shares etc. In one aspect, a USD-pegged Stablecoin can be used for settlement in first phase of use. In the future, more Fiat pegged Stablecoins can be supported e.g. Euro, YEN, GBP, etc.

The various steps of the process shown in FIG. 34 are outlined next. In a first step, Custodian 1 3406 and Custodian 2 3408 will have account with Prime Trust 3404. Custodians will transfer/crypto/fiat into Prime Trust 3404. In step 2, after receiving Fiat, the Prime Trust 34040 will release TrueUSD Stablecoin into Custodian's wallet 3406, 3408. With Stablecoin into the wallet, each Custodian is enabled to do inter-custodian settlement.

In a third step, Custodian 1 3406 triggers net settlement request to Custodian 2 3408 on the exchange network platform 3410. Custodian 2 3408 accepts the settlement request. In a fourth step, after both custodians show intent to settle, a special atomic multi-ledger settlement transaction 3402 is calculated and recorded at the platform 3410. A net settlement job calculates how much Custodian 1 owes to Custodian 2 or vice-versa. The net settlement amount will be calculated in both fiat and crypto. E.g. USD, ETH, BTC, etc.

In a fifth step, after settlement amount is shown to both custodians, Custodian 1 3406 and Custodian 2 3408 will press button on a Custodian UI to perform final net-settlement. The platform 3410 will trigger an API call to the wallet for signing the transaction with a private key and submitting on Ethereum public ledger using the smart contract 3402. The smart contract 3402 will atomically transfer TrueUSD from Custodian 1 wallet 3406 into Custodian 2 wallet 3408 or vice-versa. This will complete the custodian net settlement. Alternatively, Custodian 1 3406 and Custodian 2 3408 can do final Fiat/Crypto settlement between their accounts on Prime Trust 3404. This settlement can possibly be automated using API calls from platform 3410 to Prime Trust Account 3404.

Figure 35:
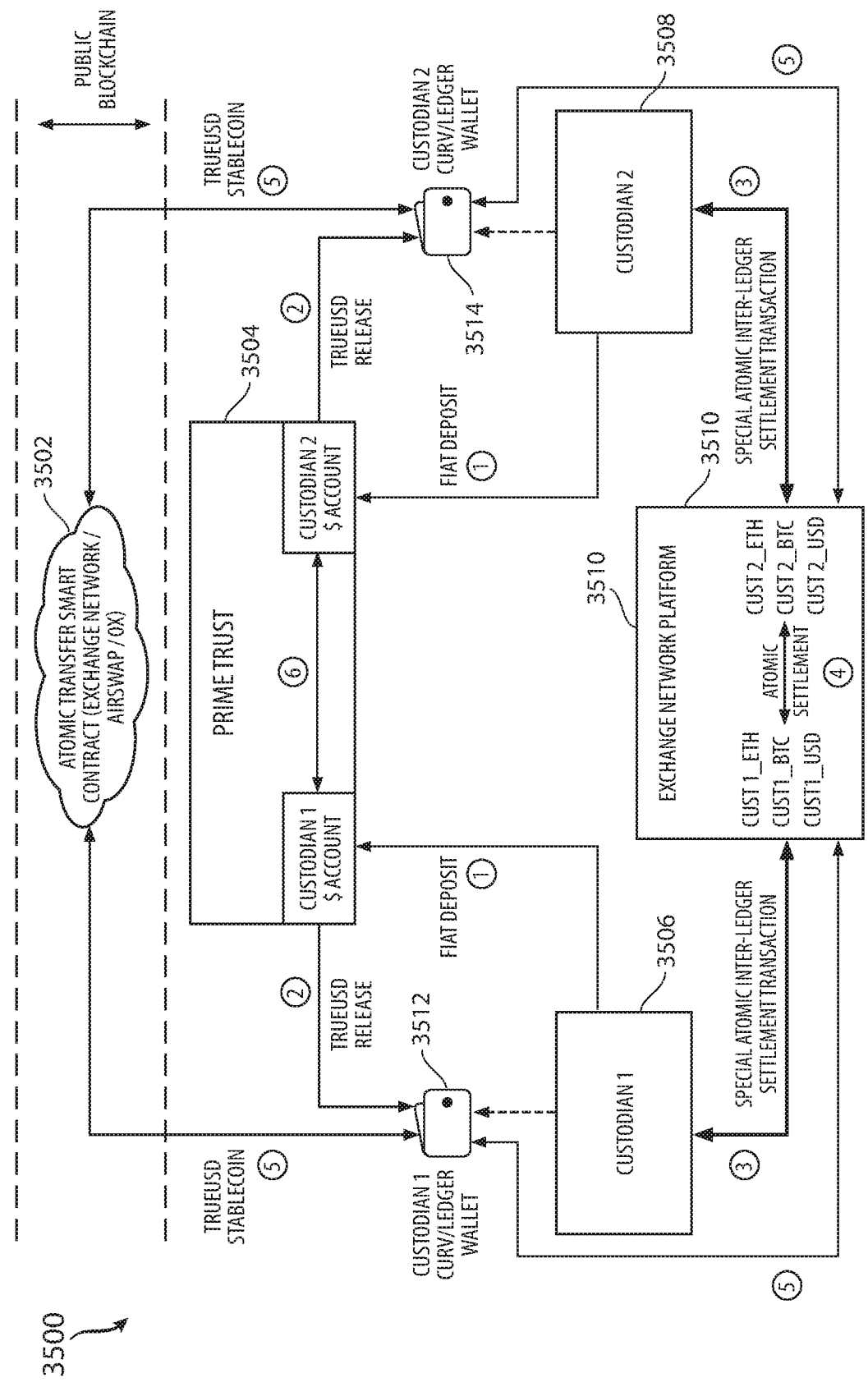
FIG. 35 illustrates a net settlement using a wallet, Stablecoin and smart contract.

FIG. 35 illustrates another option 3500 for net settlement using a Curv/Ledger Wallet, Stablecoin and smart contract. This approach is similar to FIG. 34 mentioned above, instead of a wallet, Custodians can have account on API based Curv/Ledger wallet or any third-party wallet not controlled or operated by the governance node 3510. Any ERC-20 supported Ethereum wallet or wallet supporting any other protocol should support allowance( ) and order signing feature for below smart contract based wallet-to-wallet atomic transfer to work. The five steps disclosed herein are similar to those discussed above relative to FIG. 34 with the change in the use of the Curv/Ledger wallet 3512, 3514.

Another aspect of this disclosure relates to the introduction of a virtual custodian. This document contains design for two solutions: (1) In one aspect, the solution completely replaces a traditional custodian entity with a virtual custodian. Ethereum smart contract or Wyre wallet can hold trader's collateral acting as the virtual custodian. Locked collateral in smart contract or Wyre wallet is immediately tokenized on blockchain ledgers and available for trading. This structure can enable quick atomic settlement of trade between traders using Wyre Wallet and/or Smart Contract.

The virtual custodian solution is useful for traders who do not have relation with any Custodian and want to trade with others who have assets on certain blockchain ledgers without giving up control over their assets. For this design, the inventors have considered Ethereum smart contract and Wyre wallet. The Ethereum smart contract is Turing complete. Other smart contracts can be considered as well. There are other Wyre wallet alternatives as well.

The virtual custodian can be used in below three main scenarios on the platform: (1) Trader 1 having collateral locked in smart contract virtual custodian, trades with Trader 2 having a traditional Custodian; (2) Trader 1 and Trader 2 both use smart contract virtual custodian trading Crypto (Ether or ERC-20 compatible token); (3) Trader 1 and Trader 2 both use Wyre account and share the API keys with a governance node module to trade over other interconnected modules. There are other scenarios that are possible: (1) Trader 1 having Wyre wallet can trade with Trader 2 having collateral locked in the smart contract virtual custodian; and (2) Trader 1 having Wyre wallet can trade with Trader 2 having relation with the traditional custodian.

Figure 36:
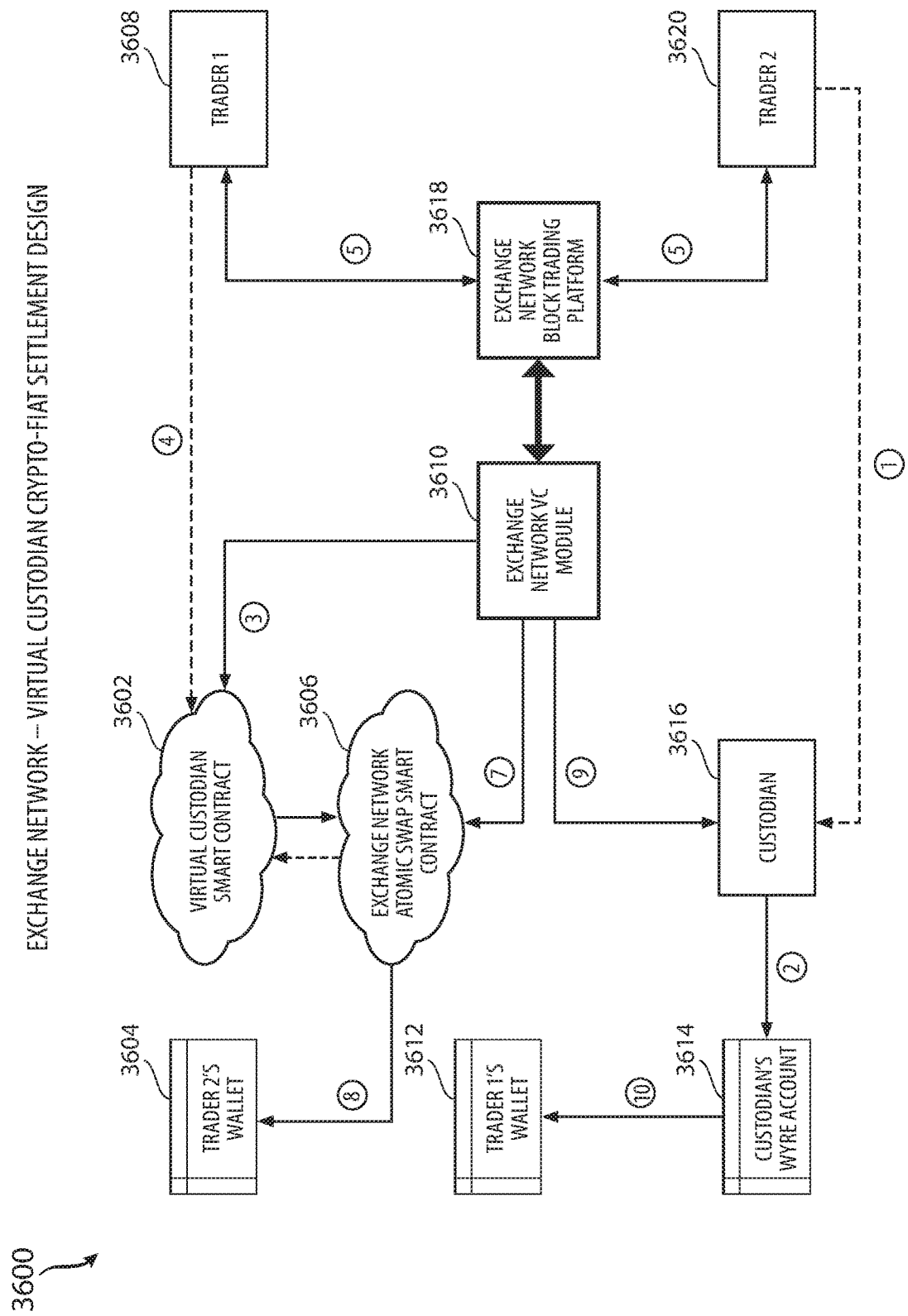
FIG. 36 illustrates a virtual custodian crypto-fiat settlement design.

FIG. 36 illustrates a virtual custodian crypto-fiat settlement design 3600. Trader 1 3608 has collateral locked in smart contract virtual custodian 3602, trades with Trader 2 3620 having traditional Custodian 3616. The following steps as shown in FIG. 36 can occur. In step 1, Trader 2 3620 deposits collateral to a Custodian 3616 using bank wire transfer. For example, $1 M can be transferred from Trader 2 3620 to Custodian 3616. On receiving collateral by Custodian 3616, entry is made into C-USD ledger on the block trading platform 3618 to record Trader 2's collateral, such as. Trader2->$1 M. In step 2, Custodian 3616 has a Wyre account (or other type of account) which is pre-filled by custodian on weekly basis, such as $5 M pre-filled weekly. Custodian 3616 uses the Wyre account for settlement with other custodian/traders. The Custodian 3616 can also use a DAPP or other form of decentralized autonomous program that can trustlessly receive funds and remit funds and/or issue or acquire stable coins that can be delivered.

In step 3, the Trader 1 3608 registers with the governance node 3618 without any custodian. The "Exchange VC module" 3610 can be controlled by the governance node 3618 and can launch the Virtual Custodian Smart Contract 3602 for Trader 1 3608 to deposit collateral. In step 4, Trader 1 3608 deposits collateral into the Virtual Custodian Smart Contract 3602. E.g. Trader 1 3608 transfers 1000 Ethers into the Virtual Custodian Smart Contract 3602. On deposit of collateral, entry is made into VC-ETH ledger which can be part of the VC-Module 3610 and/or the governance node 3618 and/or a supporting Custodian node 3616 or other network node or nodes (e.g., any type of blockchain ledger or network or governance or consensus driven ledger system) to record Trader 1's collateral. For example, Trader 1->1000 ETH. Trader 1 3608 can redeem the Ethers anytime from Trader UI, as long as the ethers are not locked as part of atomic swap trading 3606.

Step 5 includes the Trader 1 3608 and Trader 2 3620 trading on the platform 3618 provided or connected trading platforms using tokenized collateral. For example, Trader 1 gets $1500 from Trader 2 for selling 5 Ethers. This transaction is recorded on both internal ledgers VC-ETH and C-USD using the atomic swap process 3606 disclosed herein. In step 6, after the trade is initialized on internal ledger, Ethers corresponding to trade are transferred from Trader 1's smart contract to the governance node atomic swap smart contract 3606. In above example, 5 Ethers will be transferred to atomic swap smart contract. This transfer will be recorded in the Ethereum public ledger. The Ether transfer to the atomic swap smart contract is time bound. If Trader 1 and Trader 2 together do not show intention to settle in certain predefined time window e.g. 1-hour window, then Ethers from atomic smart contract 3606 will automatically go back to Trader 1's VC smart contract 3602. Ethers available in Trader 1's VC smart contract 3602 can be redeemed by Trader 1 anytime. Ethers moved to the atomic swap smart contract 3606 are locked for settlement and not available from redeem.

In step 7, the governance node VC module 3610 triggers the atomic swap inside the atomic swap smart contract 3606. This trigger can happen after both Trader 1 3608 and Trader 2 3620 show intention to settle the trade which can be automated based on a trade match execution message or other workflow. In step 8, the atomic swap smart contract 3606 transfers Ethers into Trader 2's wallet 3604. This transfer of Ethers is recorded on public ledger. In step 9, as part of the atomic swap, the governance node VC module 3610 sends a trigger to Custodian module 3616 to initiate Wyre transfer 3614 to Trader 1's Wallet 3612. In step 10, fiat is transferred from Custodian's Wyre account 3614 into Trader 1's wallet 3612. In above example, $1500 will be transferred from Custodian's Wyre account 3614 into Trader 1's wallet 3612.

Even though the platform will deploy the Virtual Custodian 3610 and the atomic swap smart contracts 3606, the governance node cannot drain the Ethers deposited into smart contracts into its own wallet/account. The platform will not be custodian in the above use case. Smart contracts deployed in public ledger will work as self-sustained custodians. Incoming Ethers in the virtual custodian smart contract 3602 will only move in following ways: (1) Redeemable back by the trader who deposited Ethers and (2) Transferable to an atomic swap smart contract on trade happening on the platform provided or connected to the trading platform.

An atomic swap smart contract can be configured with the logic to move Ethers as follows: (1) Back to sending address on timeout, i.e., virtual custodian smart contract; or (2) Other trader's wallet on settlement (atomic swap). Optional additional steps to improve atomic swap smart contract's security can include, for Trader 1 to settle and unlock cryptocurrencies from Smart Contract, the following being passed to the smart contract on Trader 1's behalf: (1) Trader 2's secret keyword can be exchanged with Trader 1 automatically and programmatically and (2) Trader 2's secret keyword signed with Trader 1 private key. This will confirm that Trader 1 is really the person who received Trader 2's secret keyword.

A similar process can be applied for Trader 2's settlement. Only when both Trader 1 and Trader 2 correctly pass a secret phrase to the smart contract, will the atomic swap process start. Otherwise, after a timeout interval, cryptocurrency from the atomic smart contract will roll back to a trader's collateral smart contract.

Then following parameters can apply. A claim_phase can be the NEW_OWNER_SIG of secret keyword+secret keyword. A refund_condition can be, for example, a timeout ( ). A redeem_condition can be a claim_phase OR a refund condition.

Figure 37:
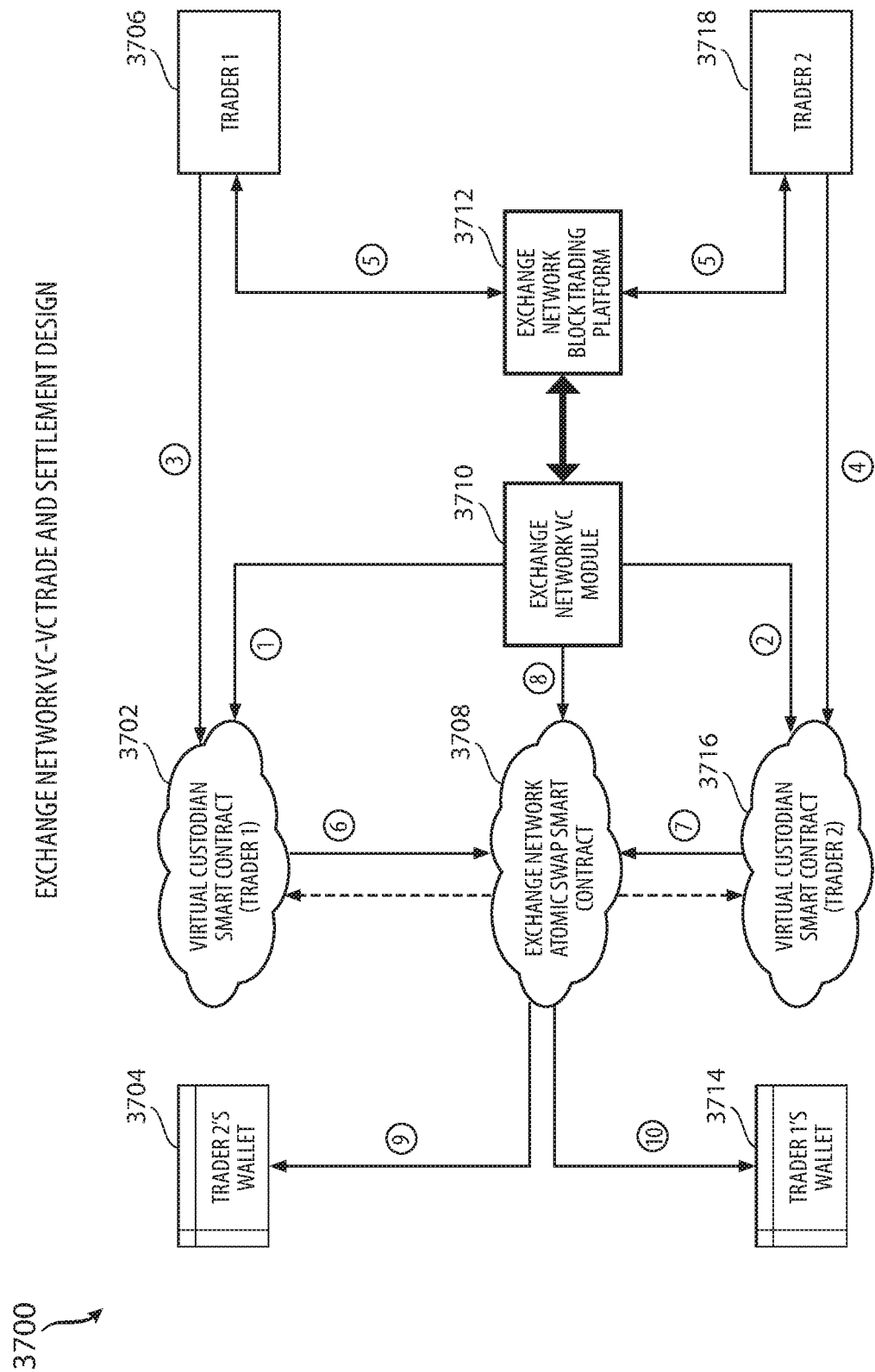
FIG. 37 illustrates a virtual custodian to virtual custodian trade and settlement design.

FIG. 37 illustrates Trader 1 and Trader 2 both using a smart contract virtual custodian cryptocurrency such as Ether or an ERC-20 compatible token. A virtual custodian can completely replace the need for a traditional custodian. Both traders can use the smart contract virtual custodian. Below is the sequence of steps for complete trading and settlement using the virtual custodian. With this solution, Ethereum or any ERC-20 compatible token can be traded and settled using the virtual custodian smart contract.

In step 1, Trader 1 3706 registers on the platform governance node or exchange network 3712 without any custodian. The governance node VC module 3710 launches a virtual custodian smart contract 3702 for Trader 1 3706 to deposit collateral. In step 2, Trader 2 3718 registers on the platform governance node 3712 without any custodian. The VC module 3710 launches a virtual custodian smart contract for Trader 2 3716 to deposit collateral. In step 3, Trader 1 3706 deposits collateral into the virtual custodian smart contract 3702. For example, Trader 1 transfers 1000 Ethers into virtual custodian smart contract 3702. On deposit of collateral from Trader 1 3706 into the virtual custodian smart contract 3702, entry is made into VC-ETH ledger which can be part of the VC-Module 3710 and/or the governance node 3712 and/or a supporting custodian node or other network node or nodes (e.g., any type of blockchain ledger or network or governance or consensus driven ledger system) to record Trader 1's collateral. For example, Trader 1->1000 ETH.

In step 4, Trader 2 3718 deposits collateral into the virtual custodian smart contract 3716. For example, Trader 2 transfers 1000 ZRX (ERC-20) into the virtual custodian smart contract 3716. On deposit of collateral from Trader 2 3718 into the virtual custodian smart contract 3716, entry is made into VC-ZRC ledger which can be part of the VC-Module 3710 and/or the governance node 3712 and/or a supporting custodian node or other network node or nodes (e.g., any type of blockchain ledger or network or governance or consensus driven ledger system) record Trader 2's collateral. For example, Trader 2->1000 ZRX.

In step 5, Trader 1 3706 and Trader 2 3718 trade on the provided or connected trading platform 3712 using tokenized collateral. For example, Trader 1 gets 100 ZRX from Trader 2 for selling 100 Ethers. This transaction is recorded on both internal ledgers VC-ETH and VC-ZRX.

In step 6, after the trade is initialized on the internal ledger, Ethers corresponding to the trade are transferred from Trader 1's smart contract 3702 to the atomic swap smart contract 3708. In above example, 100 Ethers will be transferred to the atomic swap smart contract 3708. This transfer can be recorded in the Ethereum public ledger. Ether transfer to atomic swap smart contract is time bound. Therefore, if Trader 1 and Trader 2 together do not show intention to settle trade in certain predefined time interval e.g. 1-hour window, then Ethers and ZRX from the atomic smart contract 3708 will automatically go back Trader 1 and Trader 2's virtual custodian smart contracts 3702, 3716. Ethers available in Trader 1's virtual custodian smart contract 3702 can be redeemed by Trader 1 3706 anytime. Ethers moved to the atomic swap smart contract 3708 are locked for settlement not available from redeem.

In step 7, ZRX (ERC-20) corresponding to the trade are transferred from Trader 2's smart contract 3716 to the atomic swap smart contract 3708. In above example, 100 ZRX will be transferred to the atomic swap smart contract 3708. In step 8, the governance node VC module 3710 sends a trigger message to the atomic swap contract 3708 to start the atomic swap process.

In step 9, the atomic swap contract 3708 transfers Ethers into Trader 2's wallet 3704. This transfer of Ethers is recorded on a public ledger. In step 10, the atomic swap contract 3708 transfers ZRX into Trader 1's wallet 3714. This transfer of ZRX is recorded on the public ledger as well.

Figure 38:
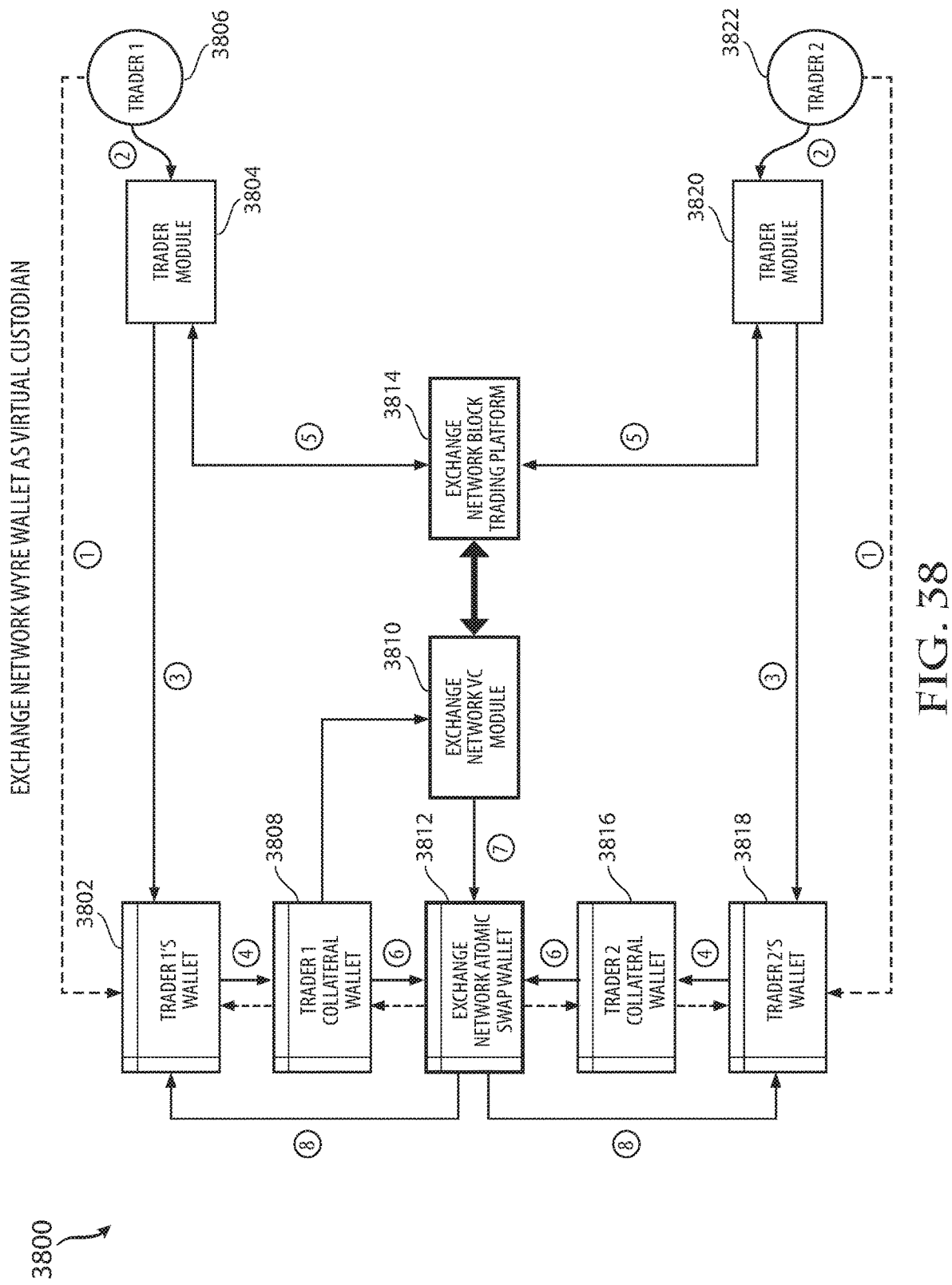
FIG. 38 illustrates a particular wallet as a virtual custodian.

FIG. 38 illustrates another option 3800 where both Trader 1 and Trader 2 use a Wyre account and share the API keys with the trader module to trade on the platform provided or connected. In this case, the Wyre wallet acts as a virtual custodian. The Wyre wallet can be used as virtual custodian to lock collateral. Below is an example sequence of steps for complete trading and settlement using a Wyre wallet as a virtual custodian. In step 1, Trader 1 3806 and Trader 2 3822 each create an account with Wyre 3802, 3818 and deposit Fiat/Crypto. The Wyre wallet supports many currencies such as the US Dollar, Bitcoin, Ether, the Australian Dollar, the Euro, the Hong Kong Dollar and the British Pound. In step 2, Trader 1 3806 and Trader 2 3822 register with a governance node or exchange network block trading platform 3814 and share their Wyre wallet API key. API keys are encrypted and saved in the trader module 3804, 3820 and can be hosted by a trader or an exchange and can manage private keys if not delegated.

In step 3, Trader 1 3806 and Trader 2 3822 use the trader modules 3804, 3820 to transfer Fiat/crypto as collateral to a collateral wallet 3808, 3816. For example, Trader 1 transfers 1000 Ethers into Trader 1's collateral wallet 3808. Trader 2 transfers 1000 USD into Trader 2's collateral wallet 3816. In step 4, the collateral locked in the Wyre wallet is immediately tokenized in the VC-Module 3810 and/or the governance node 3814 and/or a supporting custodian node or other network node or nodes (e.g., any type of blockchain ledger or network or governance or consensus driven ledger system). In step 5, Trader 1 3806 and Trader 2 3822 trade on the trading platform 3814 using tokenized collateral. For example, Trader 1 gets tokenized 100 USD from Trader 2 for selling 100 tokenized Ethers. This transaction is recorded on both internal ledgers VC-ETH and VC-USD.

In step 6, after the trade is initialized on internal ledger, USD and ETH corresponding to trade are transferred from Trader 1 and Trader 2's collateral wallets 3808, 3816 to an atomic swap wallet 3812. In above example, 100 USD and 100 ETH will be transferred to the atomic swap wallet. The USD and ETH transfer to the atomic swap wallet 3812 can be, for example, time bound. In this scenario, if Trader 1 and Trader 2 together do not show intention to settle in certain predefined time window e.g. 1-hour window, then USD and ETH locked in the atomic swap wallet 3812 will go back to Trader 1 and Trader 2's collateral wallet 3808, 3816.

In step 7, the VC Module 3810 starts the atomic swap inside the atomic swap wallet 3812. In step 8, during the atomic swap, fiat/crypto are directly transferred from the atomic swap wallet 3812 to the respective Trader's personal wallet 3802, 3818. Unlike smart contracts, the Wyre API will transfer settlement funds instantly. There is no mining required.

Figure 39:
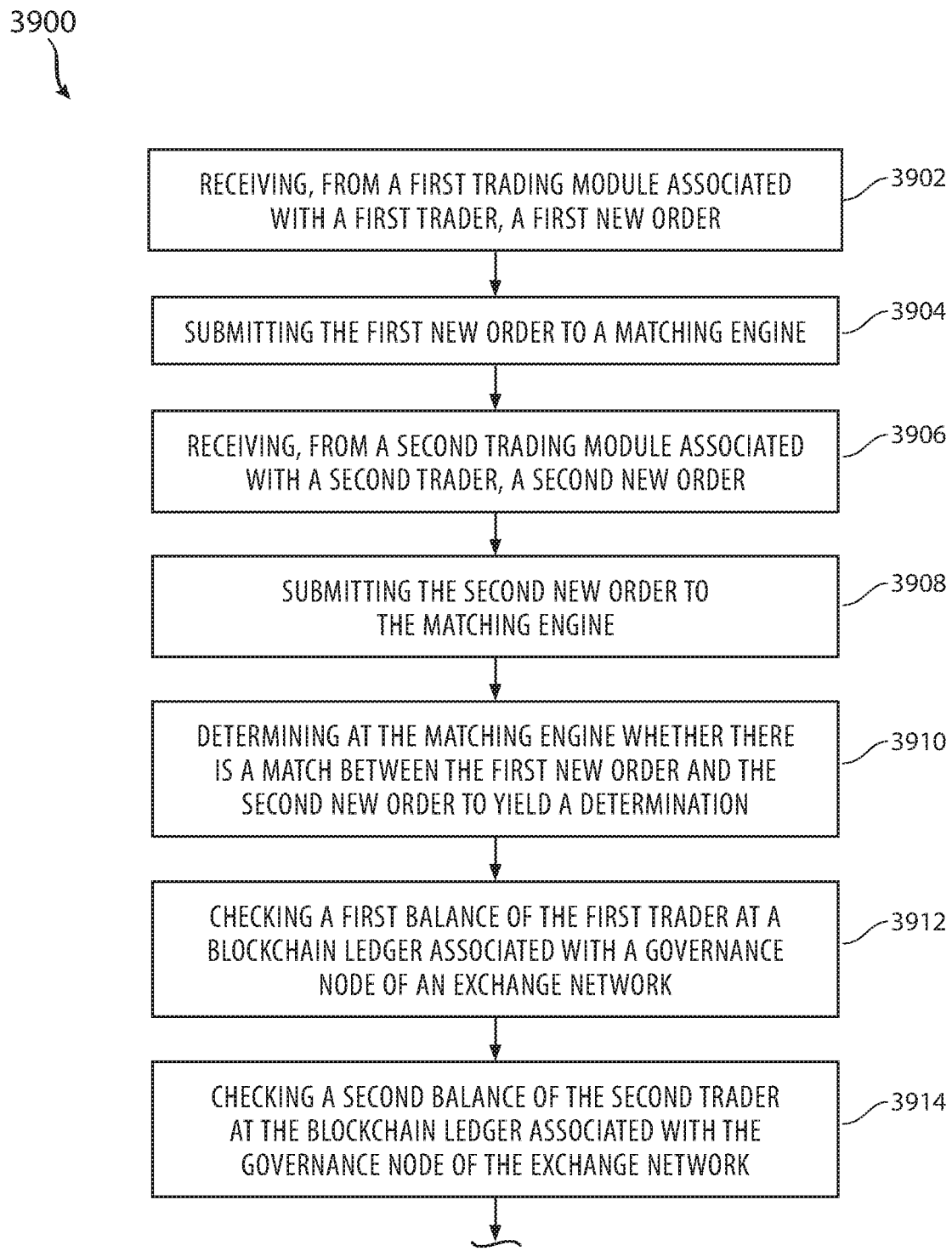
FIG. 39 illustrates a method example.
Figure 39:
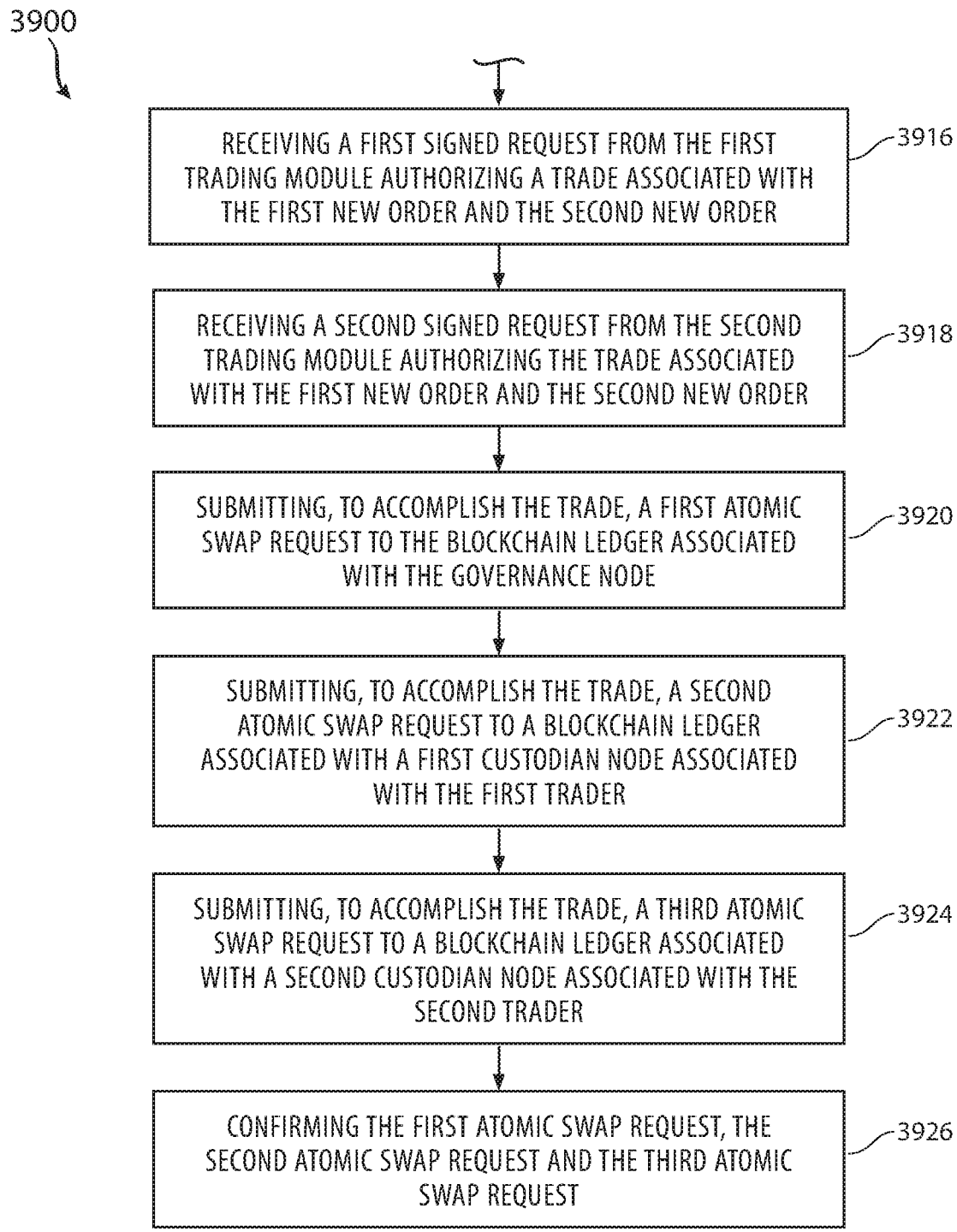

FIG. 39 illustrates an example method 3900 related to using atomic swaps for trades. The method can include receiving, from a first trading module associated with a first trader, a first new order (3902), submitting the first new order to a matching engine (3904), receiving, from a second trading module associated with a second trader, a second new order (3906), submitting the second new order to the matching engine (3908), and determining at the matching engine whether there is a match between the first new order and the second new order to yield a determination (3910).

If the determination is a match, the method further can include checking a first balance of the first trader at a blockchain ledger associated with a governance node of an exchange network (3912), checking a second balance of the second trader at the blockchain ledger associated with the governance node of the exchange network (3914), receiving a first signed request from the first trading module authorizing a trade associated with the first new order and the second new order (3916), receiving a second signed request from the second trading module authorizing the trade associated with the first new order and the second new order (3918), submitting, to accomplish the trade, a first atomic swap request to the blockchain ledger associated with the governance node (3920), submitting, to accomplish the trade, a second atomic swap request to a blockchain ledger associated with a first custodian node associated with the first trader (3922), submitting, to accomplish the trade, a third atomic swap request to a blockchain ledger associated with a second custodian node associated with the second trader (3924), and confirming the first atomic swap request, the second atomic swap request and the third atomic swap request (3926). The method can include any one or more of these steps in any order.

The settlement process include a cross-custodian net settlement approach in which net settlement amounts due are calculated for all users in each asset between any two custodian modules and their related blockchain ledgers. In a full allocation report, all users, all assets, and all related UTXOs and proofs are calculated to obtain netted quantities and residual quantities. The system can load residual quantities into smart contracts or otherwise create movement instructions over other non-blockchain ledger rails. The system creates atomic transactions that burn and reallocate netted quantities and can invoke a smart contract or other traditional rail payment processes.

Methods according to the above-described examples can be implemented using computer-executable instructions that are stored or otherwise available from computer readable media. Such instructions can include, for example, instructions and data that cause or otherwise configure a general purpose computer, special purpose computer, or special purpose processing device to perform a certain function or group of functions. Such instructions can include, for example, instructions and data that cause or otherwise configure a general purpose computer to perform a certain function or group of functions, and thereby turning the general purpose computer into a special purpose computer configured accordingly. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Any feature described in any embodiment or example can be combinable with any other feature of any other example or embodiment. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Any example provided herein can include an element or concept that can be used in any other example or embodiment. The various concepts can be mixed and matched between different example platforms or methods disclosed herein.

Claim language reciting "at least one of" refers to at least one of a set and indicates that one member of the set or multiple members of the set satisfy the claim. For example, claim language reciting "at least one of A and B" means A, B, or A and B.

Statement Bank

Statement 1. A method of trading assets, the method including one or more of the following steps in any order: creating, via a custodian module operating on behalf of a custodian entity, a plurality of blockchain-based ledgers, the plurality of blockchain-based ledgers comprising at least a blockchain-based ledger associated with the custodial entity and associated with an asset type, wherein the blockchain-based ledger is generated with an asset genesis block that comprises a signature of a hash digest of raw data for the asset genesis block, the signature being generated by a central administration module separate from the custodian module; receiving, at the custodian entity, collateral from a client, the collateral being of the asset type; maintaining the collateral in a custodial ledger of the custodian entity; receiving, from the client and at the custodian module, a request for a reservation of assets representing at least a portion of the collateral; verifying, by the custodian module, an authenticity of the client and the request by mapping personal details received with the request against the custodial ledger, the custodial ledger identifying an asset as available for the reservation to yield a verification; when the verification indicates that the asset is available for the reservation, approving the request by issuing a token to the client; and generating a new block on the blockchain-based ledger that identifies the client and the collateral associated with the token.

Statement 2. The method of trading assets of Statement 1, further comprising: creating, via the custodian module operating on behalf of the custodian entity, an additional blockchain-based ledger associated with the custodial entity and associated with an additional asset type, wherein the additional blockchain-based ledger is generated with an additional asset genesis block that comprises an additional signature of an additional hash digest of additional raw data for the additional asset genesis block, the additional signature being generated by a central administration module separate from the custodian module; receiving, at the custodian entity operating the custodian module, additional collateral from an additional client, the additional collateral being of the additional asset type; maintaining the additional collateral in a custodial ledger of the custodian entity; receiving, from the additional client and at the custodian module, an additional request for an additional reservation of additional assets representing at least a portion of the additional collateral; verifying, by the custodian module, an authenticity of the additional client and the additional request by mapping additional personal details received with the additional request against the custodial ledger, the custodial ledger identifying an additional asset as available for reservation to yield an additional verification; when the additional verification indicates that the additional asset is available for an additional reservation, approving the additional request by issuing an additional token to the additional client; and generating an additional new block on an additional blockchain-based ledger that identifies the additional client and the additional collateral associated with the additional token.

Statement 3. The method of trading assets of any preceding statement, further comprising: following a trade between the client and the additional client, the trade comprising a trade of at least a portion of the asset for a portion of the additional asset, to yield traded additional client assets of the asset type and traded client assets of the additional asset type: generating a new block on the blockchain-based ledger that represents the traded additional client assets of the asset type; and generating a new block on the additional blockchain-based ledger that represents the traded client assets of the additional asset type.

Statement 4. The method of trading assets of any preceding statement 3, further comprising: following a redemption request received at the custodial entity from the additional client to redeem the additional token: burning the additional token; and transferring the traded additional client assets of the asset type from the custodial ledger to the additional client.

Statement 5. The method of trading assets of any preceding statement, further comprising: following a redemption request received at the custodial entity from the client to redeem the token: burning the token; and transferring the client assets of the additional asset type from the custodial ledger to the client.

Statement 6. The method of trading assets of any preceding statement, wherein the asset type comprises a fiat currency and the additional asset type comprises a crypto-currency.

Statement 7. The method of trading assets of any preceding statement, wherein the blockchain-based ledger comprises a first ledger for a first asset type and the additional blockchain-based ledger for a second asset type.

Statement 8. The method of trading assets of any preceding statement, wherein the blockchain-based ledger and the additional blockchain-based ledger are each separate from the custodian module and are generated with the asset genesis block and the additional asset genesis block, respectively, that comprises a respective signature associated with the custodian module that attests to its validity on a network.

Statement 9. The method of trading assets of any preceding statement, wherein the blockchain-based ledger and the additional blockchain-based ledger each resides on a blockchain network.

Statement 10. The method of trading assets of any preceding statement, wherein burning the additional client assets of the asset type from the blockchain-based ledger comprises transferring the additional token to a burn wallet.

Statement 11. The method of trading assets of any preceding statement, wherein burning the client assets of the additional asset type from the additional blockchain-based ledger comprises transferring the token to a burn wallet.

Statement 12. The method of trading assets of any preceding statement, wherein the redemption request received at the custodial entity from the additional client to redeem the additional token comprises encrypted metadata utilized a custodian redemption public key as indicated in the additional asset genesis block.

Statement 13. The method of trading assets of any preceding statement, wherein the redemption request received at the custodial entity from the client to redeem the token comprises encrypted metadata utilized a custodian redemption public key as indicated in the asset genesis block.

Statement 14. The method of trading assets of any preceding statement, wherein burning the additional token occurs according to steps comprising: after required due diligence by the custodian entity, reassigning ownership of the additional token to a burn account.

Statement 15. The method of trading assets of any preceding statement, wherein burning the token occurs according to steps comprising: after required due diligence by the custodian entity, reassigning ownership of the token to a burn account.

Statement 16. The method of claim 1, wherein the asset genesis block further comprises redemption conditions for the client to redeem the collateral.

Statement 17. The method of claim 16, wherein the redemption conditions comprise at least one or more of a name, an address, an email address, a phone number, biometric data, and social media data.

Statement 18. The method of trading assets of any preceding statement, wherein the asset genesis block further comprises a first identification of the custodian entity and a second identification of the asset type.

Statement 19. The method of trading assets of any preceding statement, wherein issuing the token to the client mirrors actions on the custodial ledger.

Statement 20. The method of trading assets of any preceding statement, the method further comprising: providing one or more of a web-based user interface to access functions performed by the custodian module and an application programming interface to access functions performed by the custodian module.

I claim:

1. A system comprising:
   one or more processors; and
   a computer-readable storage device storing instructions which, when executed by the one or more processors, operate a custodian module that holds customer tokens for processing a transaction associated with the customer tokens and to redeem the customer tokens, wherein a customer is independent of an operator of custodian module and wherein the customer owns the customer tokens and wherein the instructions further cause the one or more processors to perform operations comprising:
   creating, via the custodian module, a respective blockchain ledger on a respective blockchain node of a blockchain network, the blockchain network comprising a plurality of distributed nodes communicating via a computer network, and
   operating a consensus algorithm to record transactions across a distributed blockchain ledger configured across the plurality of distributed nodes to render the transactions as permanent and unalterable on the distributed blockchain ledger, wherein the distributed blockchain ledger comprises the distributed blockchain ledger and wherein the blockchain network comprises:
   one or more governance modules with a governance module blockchain node; a plurality of custodian modules with a custodial module blockchain node;
   a plurality of blockchain ledgers per custodian module;
   a plurality of trader modules; and
   a peer-to-peer messaging capability, wherein the blockchain network implements the consensus algorithm and uses a transaction broadcasting protocol and a privacy level;
   receiving, via the custodian module, a request to tokenize assets;
   tokenizing, via the custodian module and based on the request and according to the consensus algorithm, the assets onto the distributed blockchain ledger to yield the customer tokens;
   receiving, via the custodian module, a redemption request;
   burning, via the custodian module and based on the redemption request and according to the consensus algorithm, the customer tokens off the distributed blockchain ledger such that the customer tokens are unspendable;
   performing, via the custodian module, an atomic transaction commitment as part of a two-phase commit process across two different custodians that triggers a transaction finality;
   performing, via the custodian module, a net settlement computation based on trading transactions in blocks, the net settlement computation further comprising net settlement movements comprising instructions to outside services separate from the custodian module;
   reading, via a trader module for interacting with the custodian module via a wallet and operating on a trader device, unspent transaction outputs and sums for balances;
   enabling, via the trader module, access to traders to an order entry system;
   performing, via the order entry system, a real-time pretrade credit check;
   entering, via the order entry system, bids and offers or request for quote or otherwise negotiating pricing;
   submitting, via the order entry system, orders to a matching engine that matches trades:
   initiating, via the trader module, issuance and redemption requests to the custodian module;
   managing, via the trader module, a public key and a private key for the traders;
   receiving, via an atomic swap module configured on an atomic swap compute device, transactions from the matching engine;
   obtaining, via the atomic swap module, a signing of the transactions with the private key to yield signed transactions;
   adding, via the atomic swap module, the signed transactions to a mempool;
   ensuring, via the atomic swap module, that an atomic swap occurs that changes ownership of assets concurrently with two respective distributed blockchain ledgers to yield a trade execution;
   notifying, via the atomic swap module, the matching engine or other systems of a successful or failed trade execution;
   calculating, via a cross-custodian net settlement module configured on a cross-custodian net settlement compute device, net settlement amounts due for all users in each asset between any two separate custodian modules and their related separate distributed blockchain ledgers;
   generating, via the cross-custodian net settlement module and based on the net settlement amounts, a full allocation report for all users, all assets all related the unspent transaction outputs and proofs, the full allocation report comprising netted quantities and residual quantities;
   loading, via the cross-custodian net settlement module, the residual quantities into a blockchain-based smart contract or otherwise creating movement instructions over non-blockchain ledger rails; and
   creating, via the cross-custodian net settlement module, an atomic transaction that burns and reallocates the netted quantities and invokes the blockchain-based smart contract or other traditional rail payments.

2. The system of claim 1, wherein the computer-readable storage device stores additional instructions which, when executed by the one or more processors, cause the one or more processors to perform operations comprising:
   performing arbitrary payment transactions between blockchain ledger addresses.

3. The system of claim 1, wherein the consensus algorithm comprises on of a just-in-time consensus algorithm.

4. The system of claim 1, wherein the computer-readable storage device stores additional instructions which, when executed by the one or more processors, cause the one or more processors to perform operations comprising:
performing, via the atomic swap module, a credit check against an unspent output set totals for users in question; and
receiving, via the atomic swap module, as blockchain transactions or creating blockchain transactions that spend the unspent output associated with the users in question.

5. The system of claim 1, wherein obtaining the signing of the transactions with the private key as performed by the atomic swap module occurs via (1) the trader module performing a delegated signing with a supplied private key from the customer; or
(2) sending the transactions to the trader module for signing by the private key.

6. The system of claim 1, wherein ensuring that the atomic swap changes ownership of the assets as performed by the atomic swap module further comprises calling a governance blockchain node which validates transactions and changes status of mempool transactions and invoking a two-phase commit protocol with custodial distributed blockchain ledgers related to affected unspent output.

7. The system of claim 1, wherein the computer-readable storage device stores additional instructions which, when executed by the one or more processors, cause the one or more processors to perform operations comprising:
connecting, via the order entry system, to a credit engine and margin engine and performing calculations for determining a client buying power.

8. The system of claim 7, wherein the computer-readable storage device stores additional instructions which, when executed by the one or more processors, cause the one or more processors to perform operations comprising:
performing, via the order entry system, one-way payment orders.

9. The system of claim 1, wherein the computer-readable storage device stores additional instructions which, when executed by the one or more processors, cause the one or more processors to perform operations comprising:
receiving, via the matching engine, quotes and orders from third parties; and
executing, via the matching engine, order matches in lit book or dark book or both.

10. The system of claim 9, wherein the computer-readable storage device stores additional instructions which, when executed by the one or more processors, cause the one or more processors to perform operations comprising:
maintaining, via the matching engine, and publishing an order book; and
aggregating, via the matching engine, outside order books and routing orders to the outside order books for execution.

11. The system of claim 1, wherein the computer-readable storage device stores additional instructions which, when executed by the one or more processors, cause the one or more processors to perform operations further comprising:
interacting, via a virtual custodian module and via a wallet, with the blockchain-based smart contract for time-locked transactions related to an atomic swap; and
facilitating, via the virtual custodian module, the atomic swap between smart contract-held assets and the custodian module with assets on distributed blockchain ledgers.

12. The system of claim 1, wherein the computer-readable storage device stores additional instructions which, when executed by the one or more processors, cause the one or more processors to perform operations comprising:
lending as an on-chain reposition transaction wherein the on-chain reposition transaction that is expected to be and can be forced to be unwound with a countervailing transaction based on collateral and risk rules.

13. The system of claim 12, wherein the computer-readable storage device stores additional instructions which, when executed by the one or more processors, cause the one or more processors to perform operations comprising:
performing programmatic intraday borrowing based on preset rules and preferences managed within the trader module.

14. The system of claim 13, wherein the computer-readable storage device stores additional instructions which, when executed by the one or more processors, cause the one or more processors to perform operations comprising:
executing on the blockchain network between assets on different distributed blockchain ledgers at one of more custodian modules.

15. The system of claim 1, wherein the system is integrated with a decentralized exchange and both puts liquidity into the decentralized exchange and takes liquidity off of the decentralized exchange.

16. The system of claim 15, wherein the computer-readable storage device stores additional instructions which, when executed by the one or more processors, cause the one or more processors to perform operations comprising:
maintaining atomic swaps between the blockchain-based smart contract and the distributed blockchain ledger.

17. A method to operate a custodian module operating on a custodian compute device that holds customer tokens for processing a transaction associated with the customer tokens and to redeem the customer tokens, the method comprising:
creating a respective blockchain ledger on a respective blockchain node of a blockchain network, the blockchain network comprising a plurality of distributed nodes communicating via a computer network, and
operating a consensus algorithm to record transactions across a distributed blockchain ledger configured across the plurality of distributed nodes to render the transactions as permanent and unalterable on the distributed blockchain ledger, wherein the distributed blockchain ledger comprises the distributed blockchain ledger and wherein a customer is independent of an operator of the custodian module and wherein the customer owns the customer tokens and wherein the blockchain network comprises:
one or more governance modules with a governance module blockchain node;
a plurality of custodian modules with a custodial module blockchain node;
a plurality of blockchain ledgers per custodian module; a plurality of trader modules; and a peer-to-peer messaging capability, wherein the blockchain network implements the consensus algorithm and uses a transaction broadcasting protocol and a privacy level;
receiving, via the custodian module operating on the custodian compute device, a request to tokenize assets;
tokenizing, via the custodian module and based on the request and according to the consensus algorithm, the assets onto the distributed blockchain ledger to yield the customer tokens;
receiving, via the custodian module, a redemption request;

burning, via the custodian module and based on the redemption request and according to the consensus algorithm, the customer tokens off the distributed blockchain ledger such that the customer tokens are unspendable;

performing, via the custodian module, an atomic transaction commitment as part of a two-phase commit process across two different custodians that triggers a transaction finality;

performing, via the custodian module, a net settlement computation based on trading transactions in blocks, the net settlement computation further comprising net settlement movements comprising instructions to outside services separate from the custodian module;

reading, via a trader module for interacting with the custodian module via a wallet and operating on a trader device, unspent transaction outputs and sums for balances;

enabling, via the trader module, access to traders to an order entry system;

performing, via the order entry system, a real-time pre-trade credit check;

entering, via the order entry system, bids and offers or request for quote or otherwise negotiating pricing;

submitting, via the order entry system, orders to a matching engine that matches trades;

initiating, via the trader module, issuance and redemption requests to the custodian module; and managing, via the trader module, a public key and a private key for the traders;

receiving, via an atomic swap module configured on an atomic swap compute device, transactions from the matching engine;

obtaining, via the atomic swap module, a signing of the transactions with the private key to yield signed transactions;

adding, via the atomic swap module, the signed transactions to a mempool;

ensuring, via the atomic swap module, that an atomic swap occurs that changes ownership of assets concurrently with two respective distributed blockchain ledgers to yield a trade execution;

notifying, via the atomic swap module, the matching engine or other systems of a successful or failed trade execution;

calculating, via a cross-custodian net settlement module configured on a cross-custodian net settlement compute device, net settlement amounts due for all users in each asset between any two separate custodian modules and their related separate distributed blockchain ledgers;

generating, via the cross-custodian net settlement module and based on the net settlement amounts, a full allocation report for all users, all assets all related unspent transaction outputs and proofs, the full allocation report comprising netted quantities and residual quantities;

loading, via the cross-custodian net settlement module, the residual quantities into a blockchain-based smart contract or otherwise creating movement instructions over non-blockchain ledger rails; and creating, via the cross-custodian net settlement module, an atomic transaction that burns and reallocates the netted quantities and invokes the blockchain-based smart contract or other traditional rail payments.

18. A non-transitory computer-readable storage device storing instructions which, when executed by one or more processors, cause the one or more processors to perform operations to operate a custodian module operating on a custodian compute device that holds customer tokens for processing a transaction associated with the customer tokens and to redeem the customer tokens, the operations comprising:

creating a respective blockchain ledger on a respective blockchain node of a blockchain network, the blockchain network comprising a plurality of distributed nodes communicating via a computer network, and operating a consensus algorithm to record transactions across a distributed blockchain ledger configured across the plurality of distributed nodes to render the transactions as permanent and unalterable on the distributed blockchain ledger, wherein the distributed blockchain ledger comprises the distributed blockchain ledger and wherein a customer is independent of an operator of the custodian module and wherein the customer owns the customer tokens and wherein the blockchain network comprises: one or more governance modules with a governance module blockchain node;

a plurality of custodian modules with a custodial module blockchain node;

a plurality of blockchain ledgers per custodian module;

a plurality of trader modules; and a peer-to-peer messaging capability, wherein the blockchain network implements the consensus algorithm and uses a transaction broadcasting protocol and a privacy level;

receiving, via the custodian module operating on the custodian compute device, a request to tokenize assets;

tokenizing, via the custodian module and based on the request and according to the consensus algorithm, the assets onto the distributed blockchain ledger to yield the customer tokens;

receiving, via the custodian module, a redemption request;

burning, via the custodian module and based on the redemption request and according to the consensus algorithm, the customer tokens off the distributed blockchain ledger such that the customer tokens are unspendable;

performing, via the custodian module, an atomic transaction commitment as part of a two-phase commit process across two different custodians that triggers a transaction finality;

performing, via the custodian module, a net settlement computation based on trading transactions in blocks, the net settlement computation further comprising net settlement movements comprising instructions to outside services separate from the custodian module;

reading, via a trader module for interacting with the custodian module via a wallet and operating on a trader device, unspent transaction outputs and sums for balances;

enabling, via the trader module, access to traders to an order entry system;

performing, via the order entry system, a real-time pre-trade credit check;

entering, via the order entry system, bids and offers or request for quote or otherwise negotiating pricing;

submitting, via the order entry system, orders to a matching engine that matches trades:

initiating, via the trader module, issuance and redemption requests to the custodian module; and managing, via the trader module, a public key and a private key for the traders;

receiving, via an atomic swap module configured on an atomic swap compute device, transactions from the matching engine;

obtaining, via the atomic swap module, a signing of the transactions with the private key to yield signed transactions;

adding, via the atomic swap module, the signed transactions to a mempool;

ensuring, via the atomic swap module, that an atomic swap occurs that changes ownership of assets concurrently with two respective distributed blockchain ledgers to yield a trade execution;

notifying, via the atomic swap module, the matching engine or other systems of a successful or failed trade execution;

calculating, via a cross-custodian net settlement module configured on a cross-custodian net settlement compute device, net settlement amounts due for all users in each asset between any two separate custodian modules and their related separate distributed blockchain ledgers;

generating, via the cross-custodian net settlement module and based on the net settlement amounts, a full allocation report for all users, all assets all related unspent outputs and proofs, the full allocation report comprising netted quantities and residual quantities;

loading, via the cross-custodian net settlement module, the residual quantities into a blockchain-based smart contract or otherwise creating movement instructions over non-blockchain ledger rails; and creating, via the cross-custodian net settlement module, an atomic transaction that burns and reallocates the netted quantities and invokes the blockchain-based smart contract or other traditional rail payments.

* * * * *